United States Patent
Bertino

(10) Patent No.: US 10,506,769 B2
(45) Date of Patent: Dec. 17, 2019

(54) AGRICULTURAL MOTOR VEHICLE

(71) Applicant: INDÚSTRIAS REUNIDAS COLOMBO LTDA, Pindorama (BR)

(72) Inventor: Luiz Henrique Bertino, Pindorama (BR)

(73) Assignee: INDÚSTRIAS REUNIDAS COLOMBO LTDA, Pindorama (BR)

( * ) Notice: Subject to any disclaimer, the term of this patent is extended or adjusted under 35 U.S.C. 154(b) by 160 days.

(21) Appl. No.: 15/855,441

(22) Filed: Dec. 27, 2017

(65) Prior Publication Data
US 2018/0263198 A1 Sep. 20, 2018

(30) Foreign Application Priority Data
Mar. 17, 2017 (BR) .................. 10 2017 005429 2

(51) Int. Cl.
*A01D 41/00* (2006.01)
*A01D 51/00* (2006.01)
(Continued)

(52) U.S. Cl.
CPC ............ *A01G 18/70* (2018.02); *A01B 69/008* (2013.01); *A01D 41/02* (2013.01); *A01D 67/00* (2013.01);
(Continued)

(58) Field of Classification Search
CPC ...... A01B 59/03; A01B 69/008; A01D 34/04; A01D 61/008; A01D 41/00; A01D 41/12; A01D 41/127; A01D 41/1277; A01D 41/02; A01D 43/006; A01D 51/00; A01D 67/00; A01F 7/62; A01F 12/446; A01F 12/184;
(Continued)

(56) References Cited

U.S. PATENT DOCUMENTS 4,164,985 A * 8/1979 Bobard ................ A01B 59/043
172/439
4,266,625 A * 5/1981 Garner ................... B62D 11/04
172/272
(Continued)

FOREIGN PATENT DOCUMENTS

BR PI-7702491-5 1/1978
BR PI-7902586-2 7/1979
BR PI-0904513-9 4/2011

*Primary Examiner* — Robert E Pezzuto
(74) *Attorney, Agent, or Firm* — B. Aaron Schulman, Esq.; Stites & Harbison, PLLC

(57) ABSTRACT

An agricultural motor vehicle designed to receive various agricultural implements, having a monoblock chassis assembled over 4×4 traction wheels, with a vibrating screen inside the lower portion of the chassis and a rotating cleaning set assembled lengthwise above the vibrating screen. The front section of the chassis has a concentrating guiding roller assembled crosswise upon it, with a hydraulic set for activation and transmission assembled above, the set serving as a support platform for a cockpit made accessible via a passageway and stairs. At the end of the rotating cleaning set is assembled a ventilation box with a motor power set is located on its rear side, and two pulling sets for residue outlet. A gutter for collecting clean grain is located at the end of the vibrating screen, the edges of the collecting gutter interconnected to cup elevators which lead into a dumper.

16 Claims, 52 Drawing Sheets

(51) Int. Cl.
*A01G 18/70* (2018.01)
*A01D 41/02* (2006.01)
*A01D 67/00* (2006.01)
*A01B 69/04* (2006.01)
*B62D 49/06* (2006.01)

(52) U.S. Cl.
CPC ..... *B62D 49/06* (2013.01); *G05D 2201/0201* (2013.01)

(58) Field of Classification Search
CPC .......... A01F 12/10; A01F 12/22; A01F 15/04; A01F 15/0875; A01G 18/70; B60G 9/022; B62D 11/04; B62D 21/186; B62D 33/0617; B62D 49/06; B62D 46/065; B62D 49/02; B62D 49/0607
USPC ......... 56/10.1, 122; 172/114, 439, 292, 125, 172/245, 272; 180/6.48, 53.1, 234, 314, 180/327, 312; 280/408, 781, 834
See application file for complete search history.

(56) References Cited

U.S. PATENT DOCUMENTS

| | | | |
|---|---|---|---|
| 6,119,442 A * | 9/2000 | Hale | A01D 41/1277 56/10.2 H |
| 8,534,412 B2 * | 9/2013 | Huhn | B60G 9/022 180/312 |
| 9,949,433 B2 * | 4/2018 | Li | A01D 34/04 |
| 10,343,188 B2 * | 7/2019 | Ivanovich Orsyk | B07B 4/02 |

* cited by examiner

A-A

B-B

AGRICULTURAL MOTOR VEHICLE

FIELD OF THE INVENTION

The present Application relates generally to motor vehicles used in agriculture, and more particularly to a motor vehicle able to receive various implements at its front end that may be used for the harvesting, collecting and processing of a variety of agricultural products.

BACKGROUND OF THE INVENTION

There are currently a considerable variety of motor vehicles designed especially for use in the agricultural field. Generally speaking, these machines are based on a propulsion engine, usually diesel, having a variety of means to enable their front region to receive different agricultural implements. Thus, the same motor vehicle is able to perform different jobs for a wide range of crops, such as: harvest, collection, product cleaning processes and/or other services. This is seen in documents: PI 0904513-9 A2(Br), PI 7702491-5 B1 (Br), PI 7902586-2 (Br) and PI 7702491-5 (Br).

There is no doubt that some existing motor vehicles have the means for coupling different agricultural implements and performing a considerable variety of jobs with different crops. However, the existing motor vehicles are usually very complex machines, intended for large agricultural producers, and this kind of equipment is often inviable for some agricultural producers, especially those that are medium and smaller-sized. What is needed therefore is a simplified form of a compact agricultural motor vehicle, having the ability to attach and interchange a variety of agricultural implements to the vehicle, such that it is still able to perform a variety of different tasks, such as the harvesting, collection and processing of different kinds of grains and cereals. Such an agricultural motor vehicle is ideal for use by large, medium-sized and small producers.

SUMMARY OF THE INVENTION

The present invention refers to an agricultural motor vehicle designed to receive agricultural implements at its front part, with applied technical and functional enhancements allowing for different work implements to be coupled to the set. The motor vehicle of the present invention has an internal combustion engine, preferably with a diesel cycle, interconnected with hydraulic pumps with different capacities which activate various hydraulic cylinders and engines, so that all parts of the coupled implement and other implements integrated with the motor vehicle are activated by the same hydraulic system. This allows for the harvest, collection and processing of different kinds of grains and cereals, such as peanuts, soybeans, beans and others.

The present Application seeks to provide a compact motor vehicle based on a combustion engine, but having a simplified form to make use of the force produced by it. For this purpose, it is interconnected to hydraulic pumps which, also activate various hydraulic cylinders and engines, and therefore, all sets forming the motor vehicle are activated by the same system, allowing the vehicle to perform a variety of jobs, such as the harvesting, collection and processing of different kinds of grains and cereals.

The present invention also has a compact chassis, able to join all functional parts of the set, not only those which are permanent parts of the motor vehicle, but also those implements which are interchangeably attached and removed to perform different services, making the set ideal for use by large, medium-sized and small producers.

DETAILED DESCRIPTION OF THE INVENTION

Figure 1:
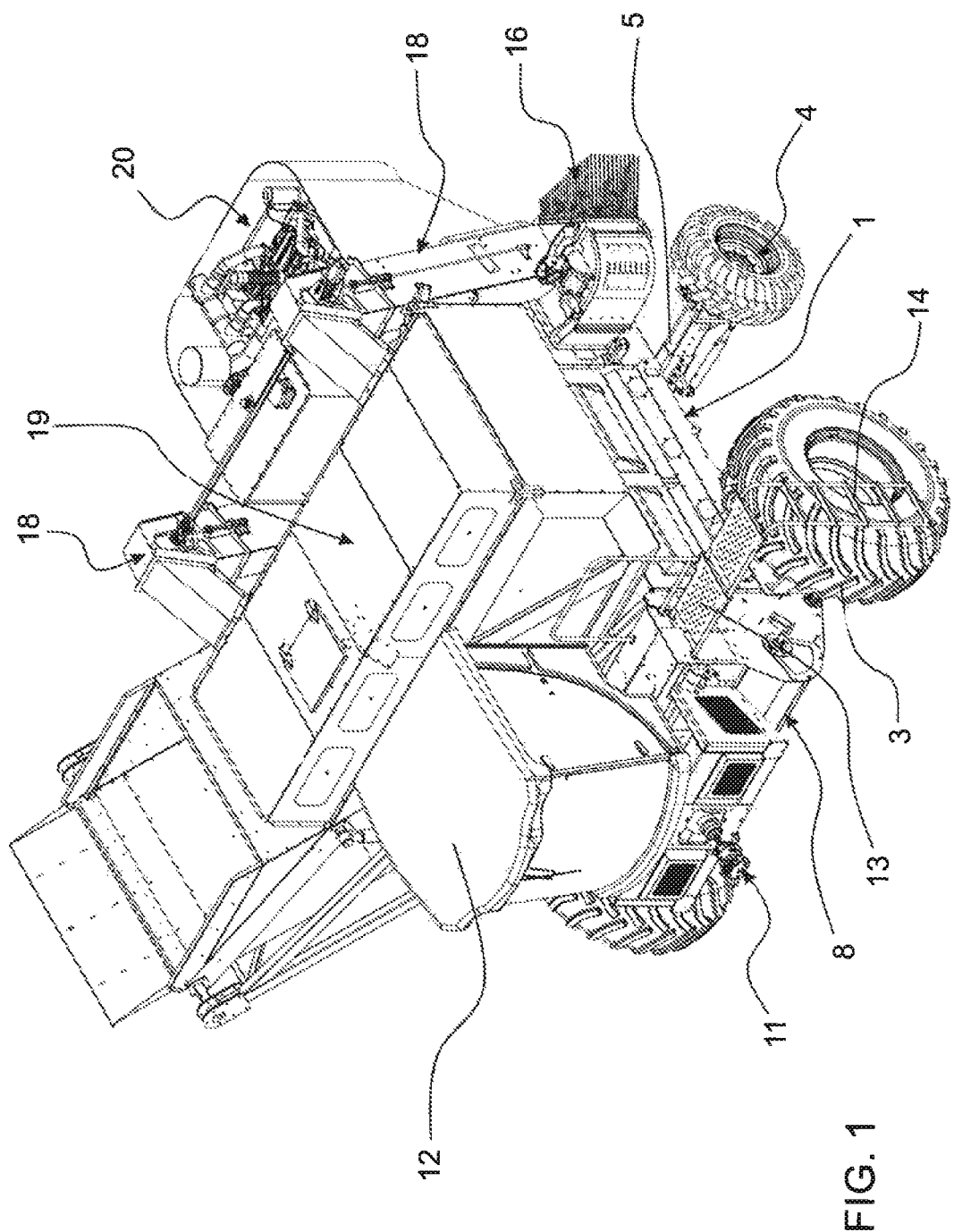
FIGS. 1 to 4 shows various isometric views at different angles of the motor vehicle, showing external details of the set as fully assembled.
Figure 2:
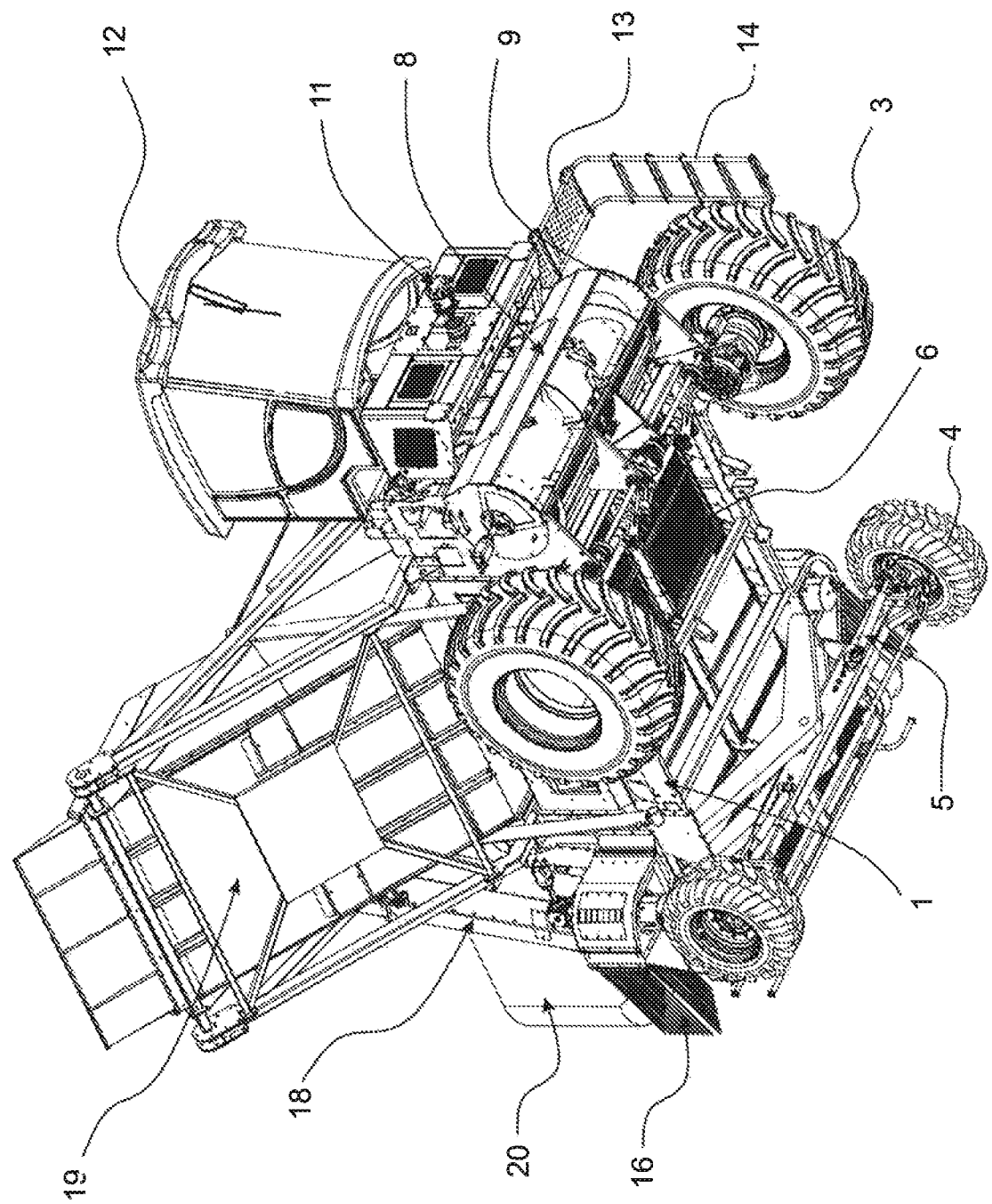
Figure 3:
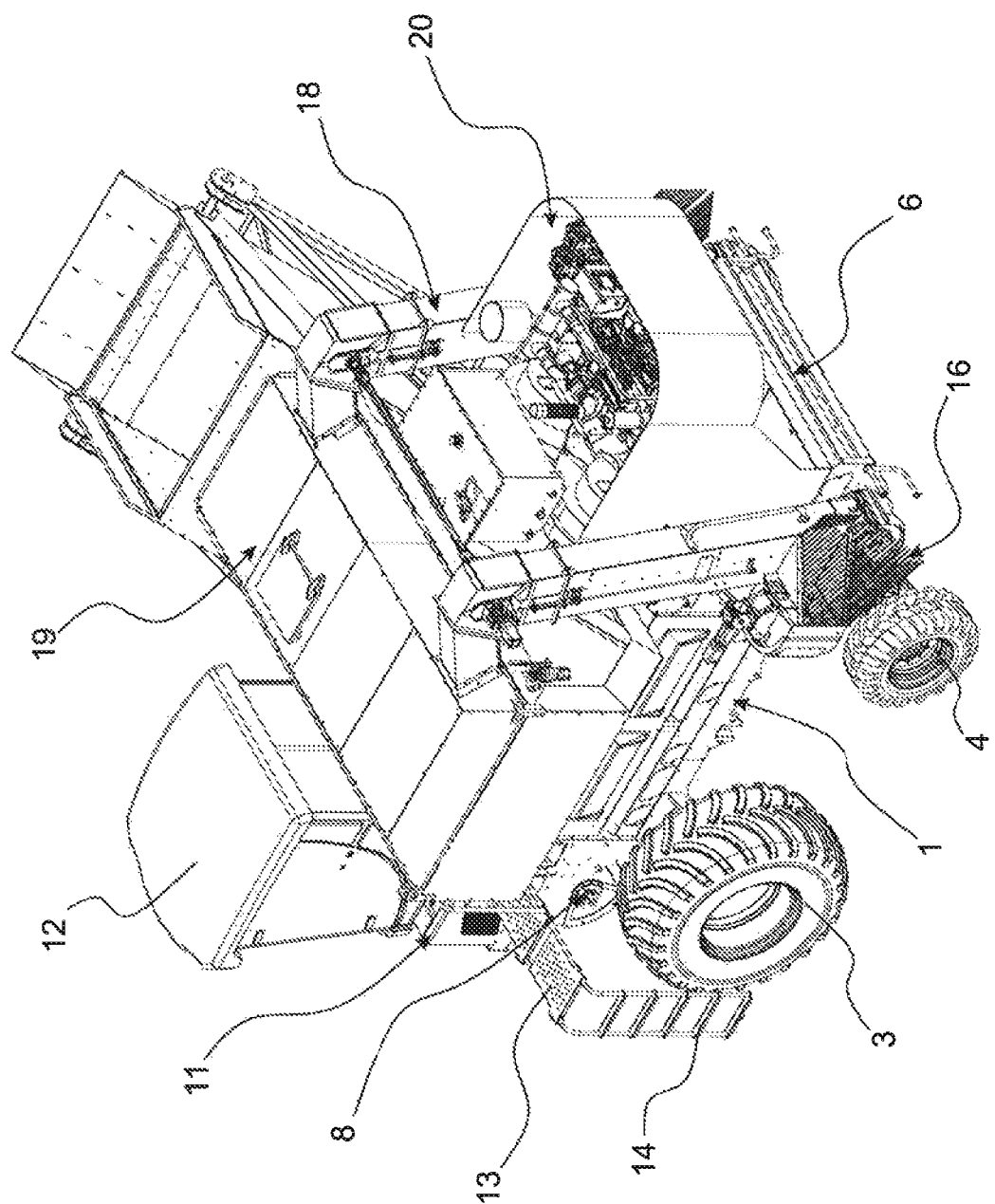
Figure 4:
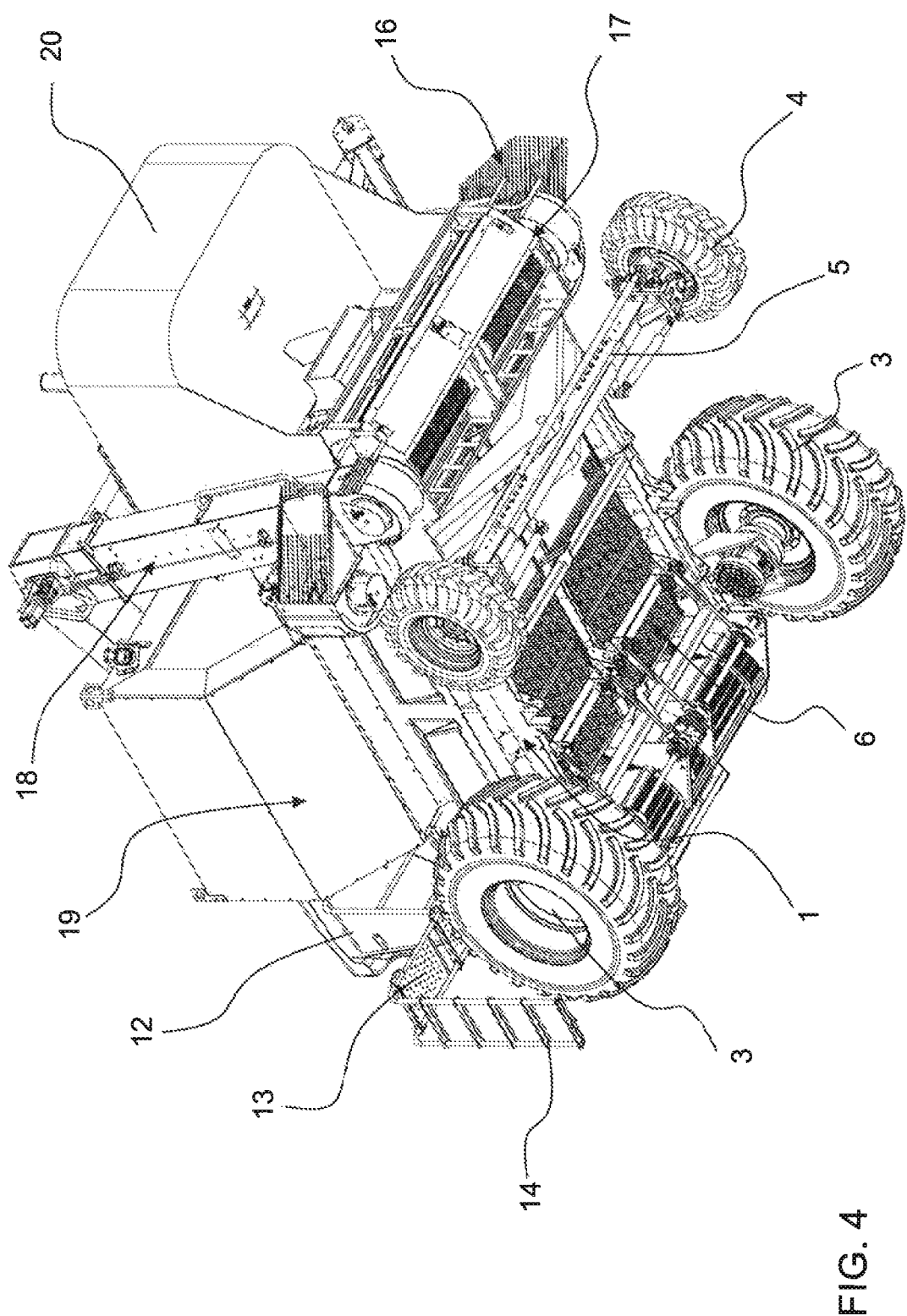
Figure 5:
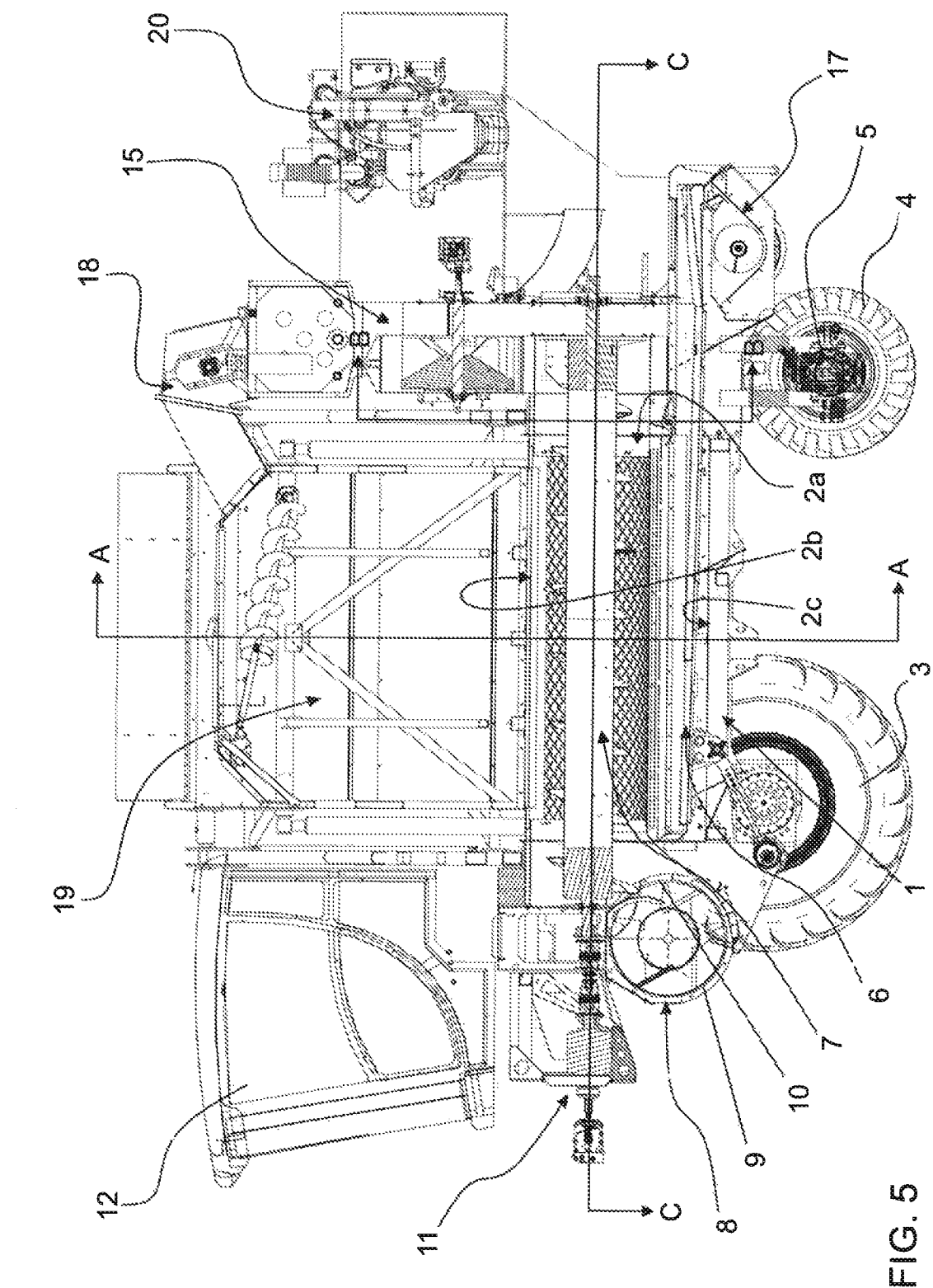
FIG. 5 shows a lengthwise cut view of the motor vehicle, highlighting its internal and external sets.
Figure 6:
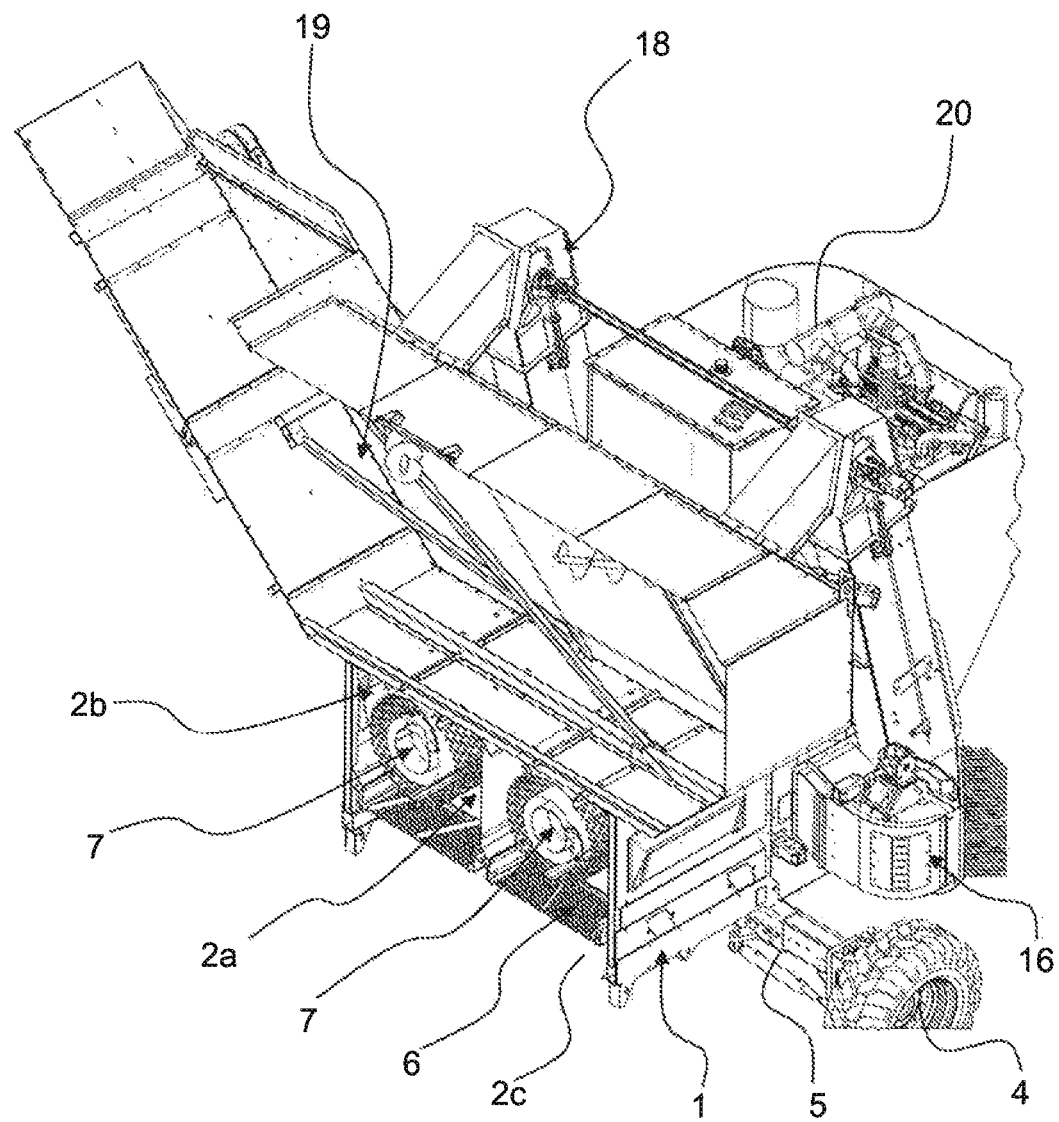
FIG. 6 shows an isometric view of the A-A cut as shown in FIG. 5.
Figure 7:
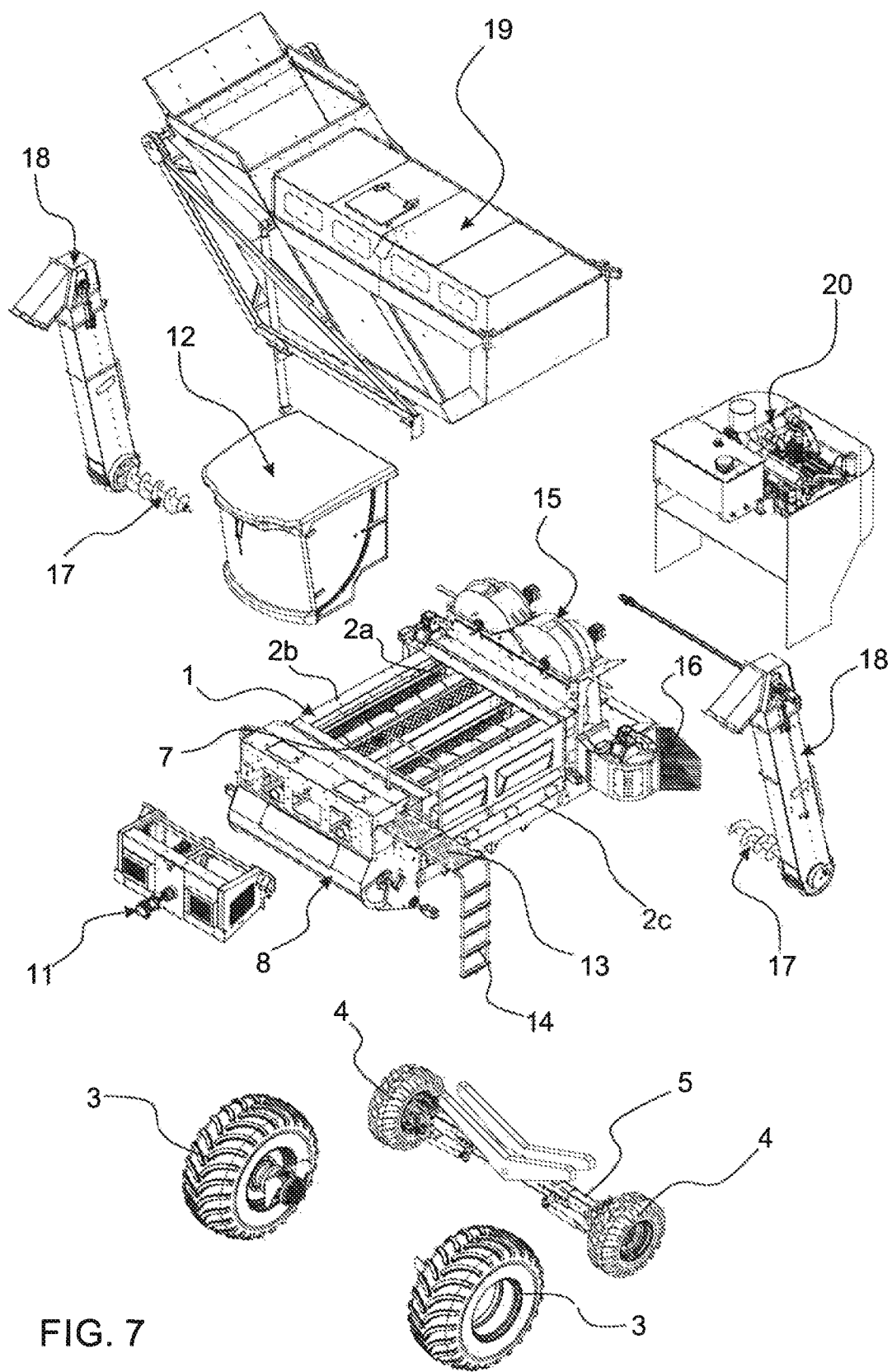
FIG. 7 shows a partially exploded perspective view, highlighting the different sets forming the motor vehicle.
Figure 8:
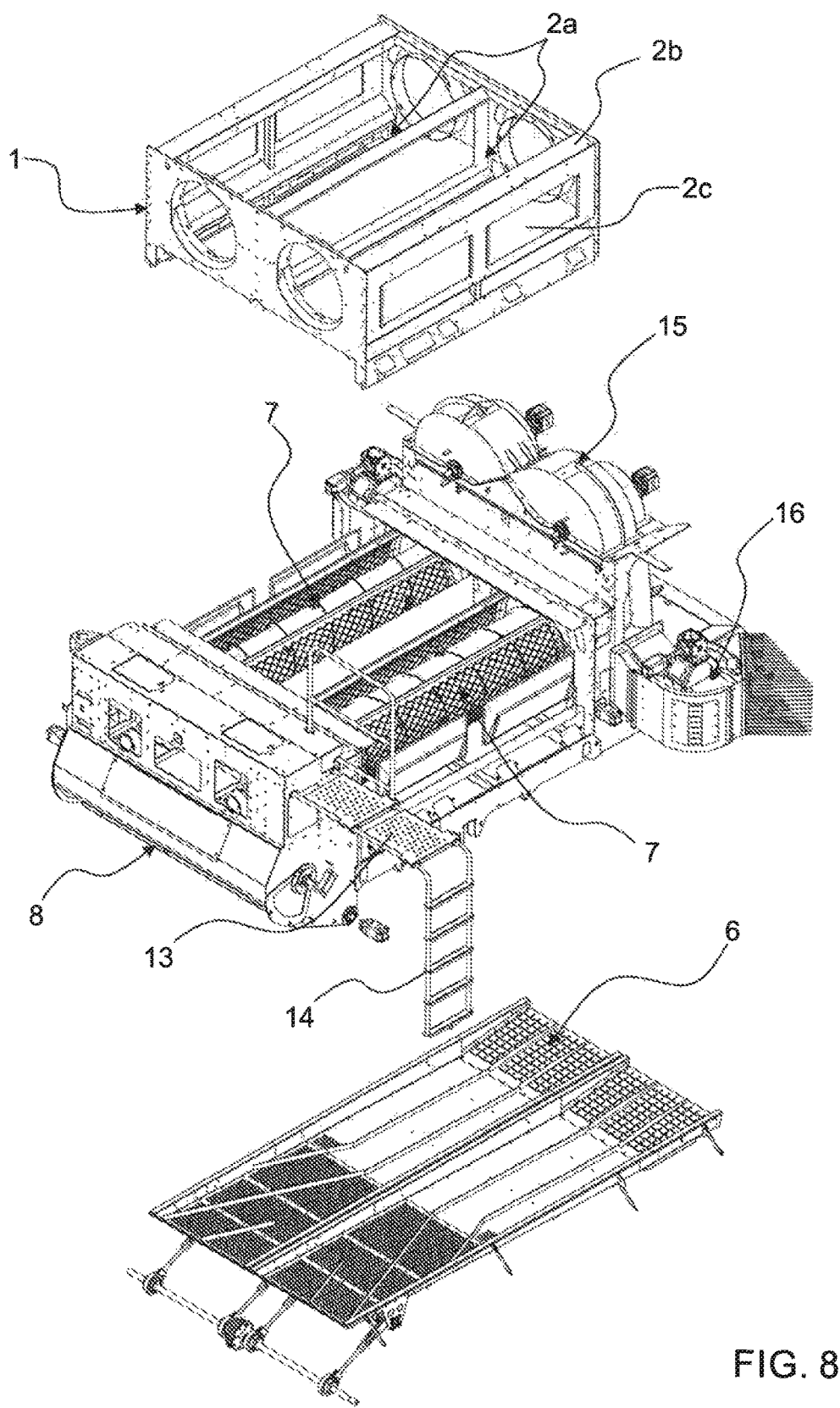
FIGS. 8 to 10 show exploded perspective views highlighting the chassis and various parts of the motor vehicle.

The invention will be described for the purposes of illustration only in connection with certain embodiments; however, it is to be understood that other objects and advantages of the present invention will be made apparent by the following description of the drawings according to the present Application. While a preferred embodiment is described, this is not intended to be limiting. Rather, the general principles set for herein are considered to be merely illustrative of the scope of the present invention and it is to be further understood that numerous changes may be made without straying from the scope of the present invention.

FIGS. 1 to 8 illustrate the agricultural motor vehicle of the present Application, comprising a monoblock chassis (1), forming a rectangular box, having intermediate spaces (2*a*) and two assembly planes, an upper assembly plane (2*b*) and a lower assembly plane (2*c*).

The chassis (1) is supported over 4×4 traction wheels, with two larger and independent front wheels (3) and two smaller rear wheels (4), the rear wheels connected by a corresponding axis (5). Inside the chassis (1) and forming its lower side or lower platform, a vibrating screen (6) is assembled for cleaning collected grains, the screen extending from the lower edge to the rear edge of the chassis (1).

Above the vibrating screen is assembled a double rotating cleaning set (7), formed of two lengthwise tunnels that also work as a screen, the tunnels extending along almost all the length of the vibrating screen (6) so that the material conducted inside and through the cleaning set may be separated. Branches, leaves and scrap larger than grains are retained and displaced towards the rear part of the machine, while grains and smaller particles, e.g. sand and earth, fall over the vibrating screen (6), where, subsequently, smaller particles than grains are directly thrown over the soil, while grains are retained and are displaced towards the rear part of the machine.

On the front section of the chassis (1), assembled crosswise, is a first rotating set defined as a concentrating guiding roller (8). The concentrating guiding roller is in the form of a crosswise tunnel, with the front and rear sides widely opened, the front opening forming an inlet opening (9) for the material to be processed, and the rear opening forming a rear outlet (10) which is in communication with the rotating cleaning set (7).

In the front section of the chassis (1) and above the transport guiding roller (8) is assembled a hydraulic activation and transmission set (11), which is coupled for activation of the rotating cleaning set (7). The hydraulic activation and transmission set (11) also serves as a support platform for assembling the cockpit (12). The cockpit has an aligned side door on its left-hand side allowing operator entry, with access to the door provided by a passageway (13) leading towards the door and a ladder (14) over the front left wheel providing access to the passageway.

On the rear edge of the chassis, at the end of the rotating cleaning set (7), another cleaning set is assembled, defined as a ventilation box (15), which serves to expel the separated residues. On the sides and next to the lower edges of the ventilation box (15) are assembled two impeller sets for the outlet of residues (16), one on each side.

At the end of the vibrating screen (6), and occupying its whole crosswise extension, is assembled a gutter for collection of clean grain (17), with the side edges of the collecting gutter for clean grain (17) linked to the lower edges of cup elevators (18), one on each side. The cup elevators are slightly frontward sloped and their upper edges lead to inside a dumper (19) for grain storage that is located crosswise over the chassis (1).

On the rear side of the ventilation box (15) is assembled a motor power set (20).

Figure 9:
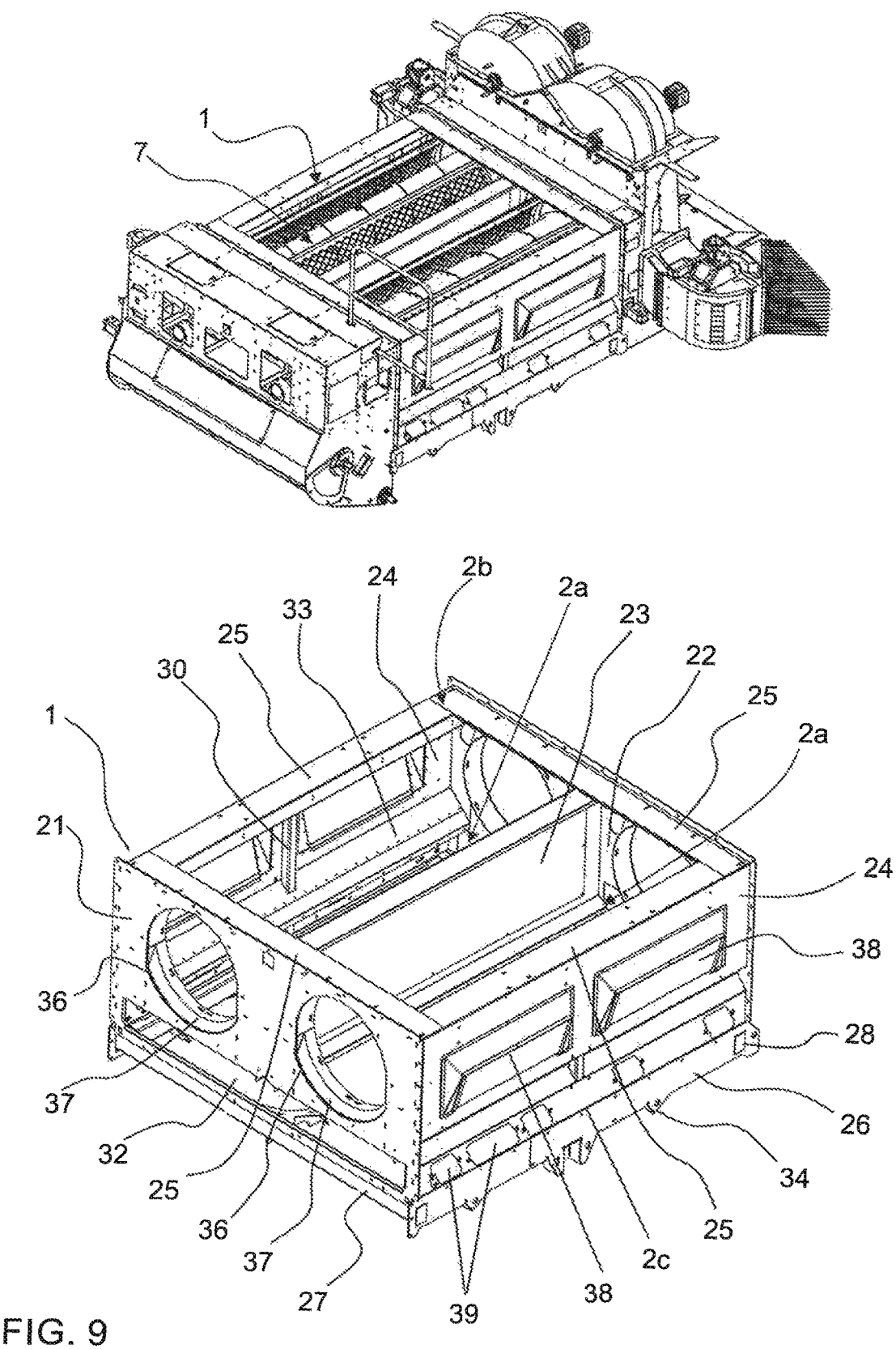
Figure 10:
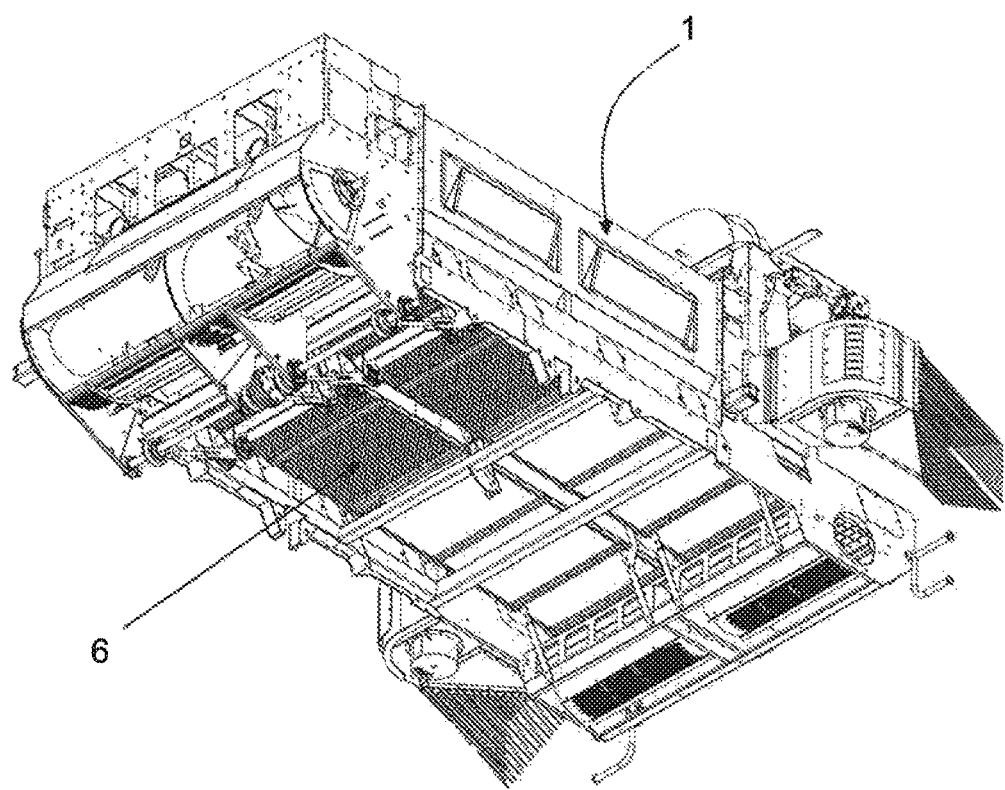
Figure 10:
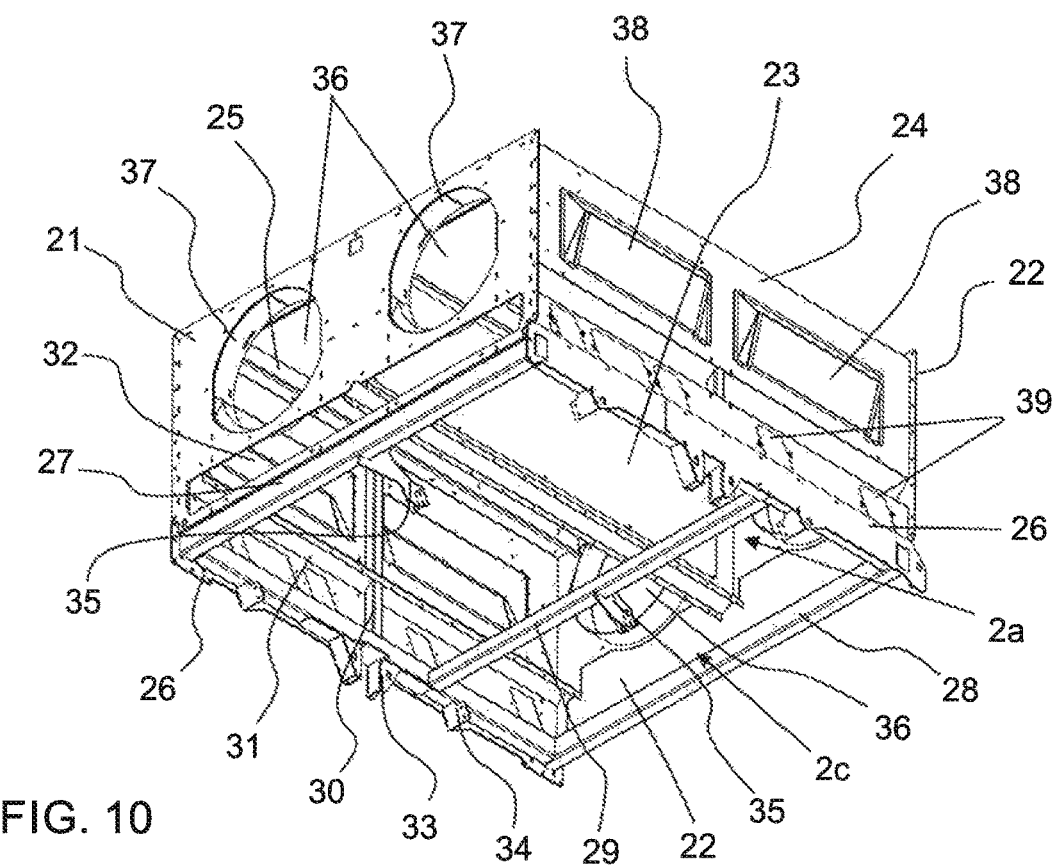

As seen in FIGS. 9 and 10, the monoblock chassis (1) has the form of a parallepipedal box, defined by different profiles and four plate panels, with one front panel (21), one rear panel (22), and two side panels (24), with one central intermediate panel (23), defining the intermediate spaces (2*a*). All four outer panels have their upper edges folded crosswise towards the inside, forming complementary profiles (25) configuring the upper assembly plane (2*b*), while, on the lower side of the chassis, all the panels are projected and combined to plate profiles, forming side stringers (26), a front crossbeam (27), a rear crossbeam (28) and an intermediate crossbeam (29). All the cross beams are attached to a complementary structure (30) located against the internal faces of the side panels (24), with two casings (31) located lengthwise and one on each side, forming between them and crossbeams (27), (28) and (29), the lower assembly plane (2*c*) for assembly of the vibrating screen (6).

Above the front crossbeam (27) and the rear crossbeam (28), the front panel (21) and the rear panel (22) have identical rectangular openings (32) extending themselves throughout the width of the chassis (1) and combined to different supports (33), (34) and (35), located under the side stringers (26) and crossbeams (27) and (29), where the assembly fittings of the vibrating screen (6) are formed. Above the rectangular openings (32), the front panel (21) and rear panel (22) both have identical circular openings (36), one beside the other, each with a circular inner collar (37) extending itself towards the inner part of the chassis and forming an assembly fitting for the double cleaning rotating set (7).

The side panels (24) have, on each side, two larger windows (38) and a multiplicity of other smaller windows (39) distributed next to their lower edges. All of the windows form an access to inside the chassis (1) in case of a need for preventive or corrective maintenance and/or other procedures for the proper operation of the internal sets.

Figure 11:
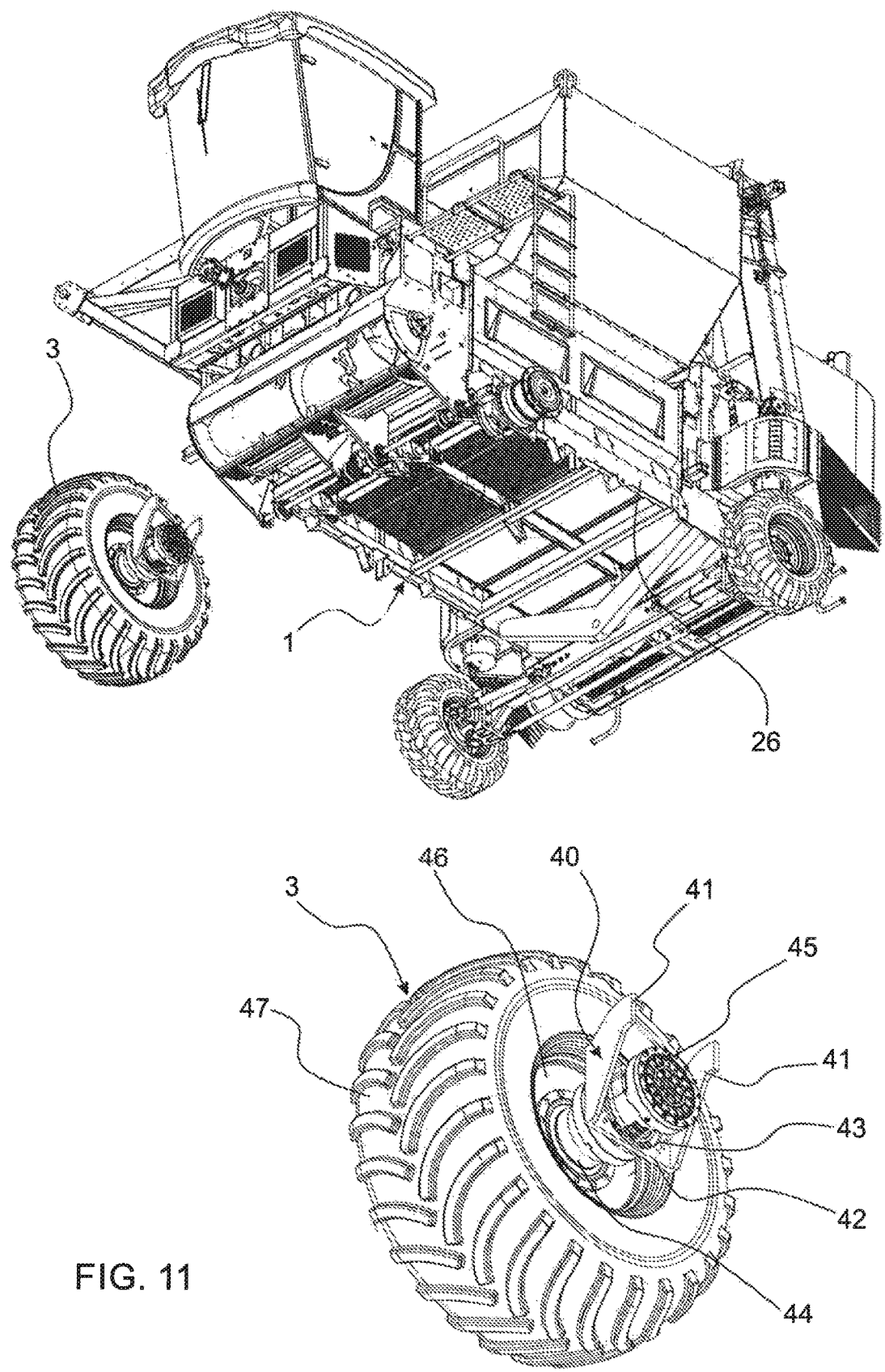
FIGS. 11 to 14 show different perspective views and enlarged details of the sets, and also show isometric views highlighting the wheels of the motor vehicle.

As can be seen in FIG. 11, the independent front wheels (3) each have a folded U-shaped plate support (40), the plate support having two arms (41), the upper edges of which are fixed to the respective side stringer (26) of the chassis (1), and the lower edges interconnected by a vertical plate (42), having a hollow (43) housing a hub and its respective axis (44). The hub is coupled from the inside to a hydraulic engine (45), and, from the opposed side, is coupled to the arc (46) of the tire (47).

Figure 12:
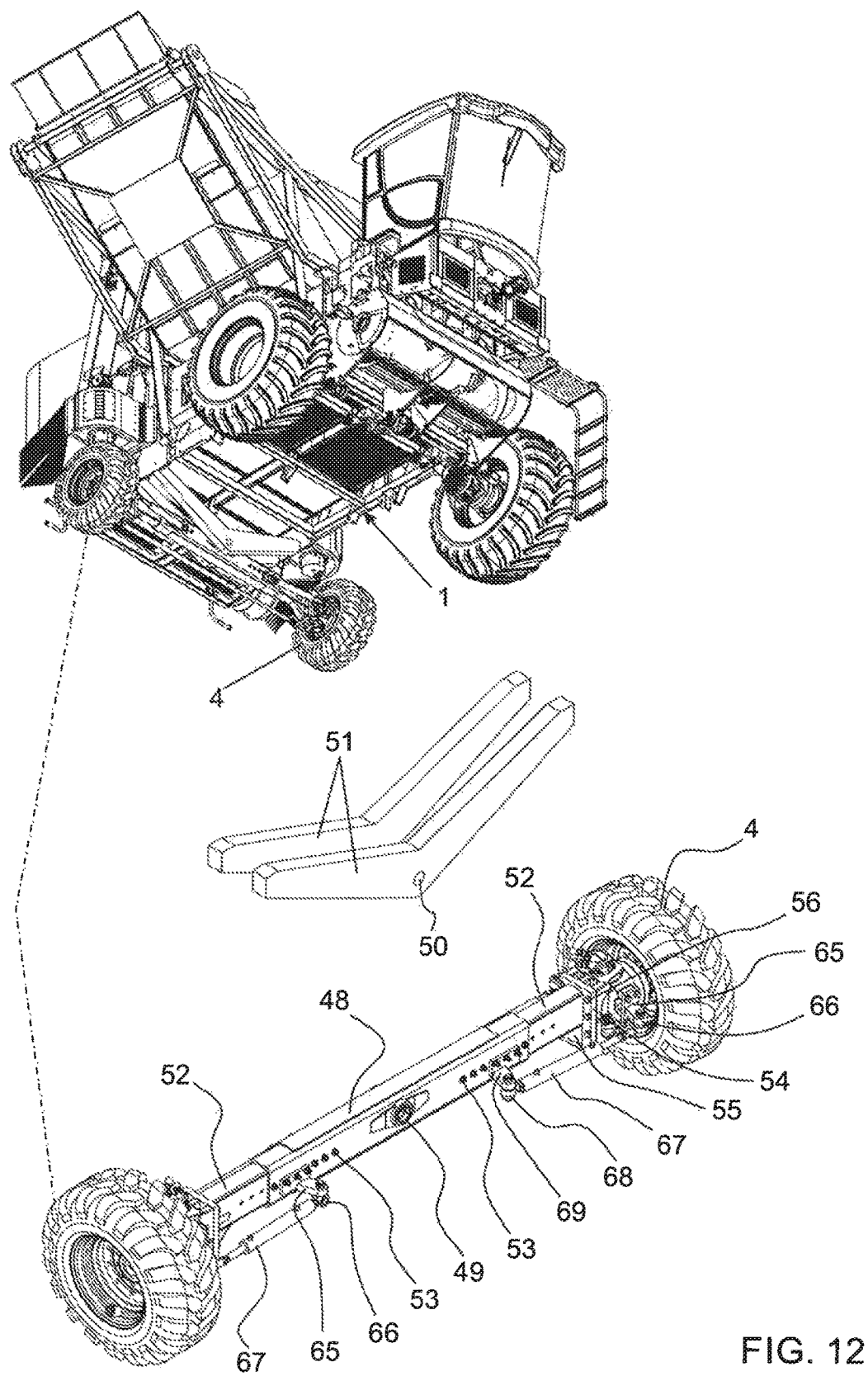
Figure 13:
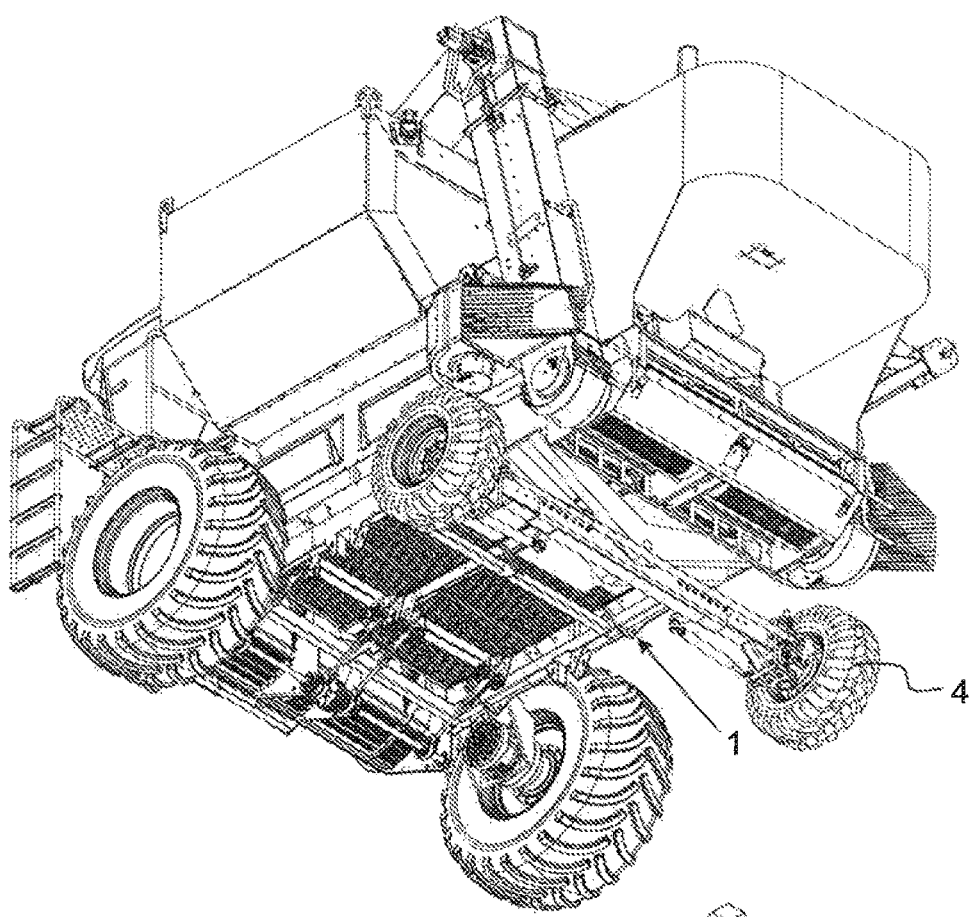
Figure 13:
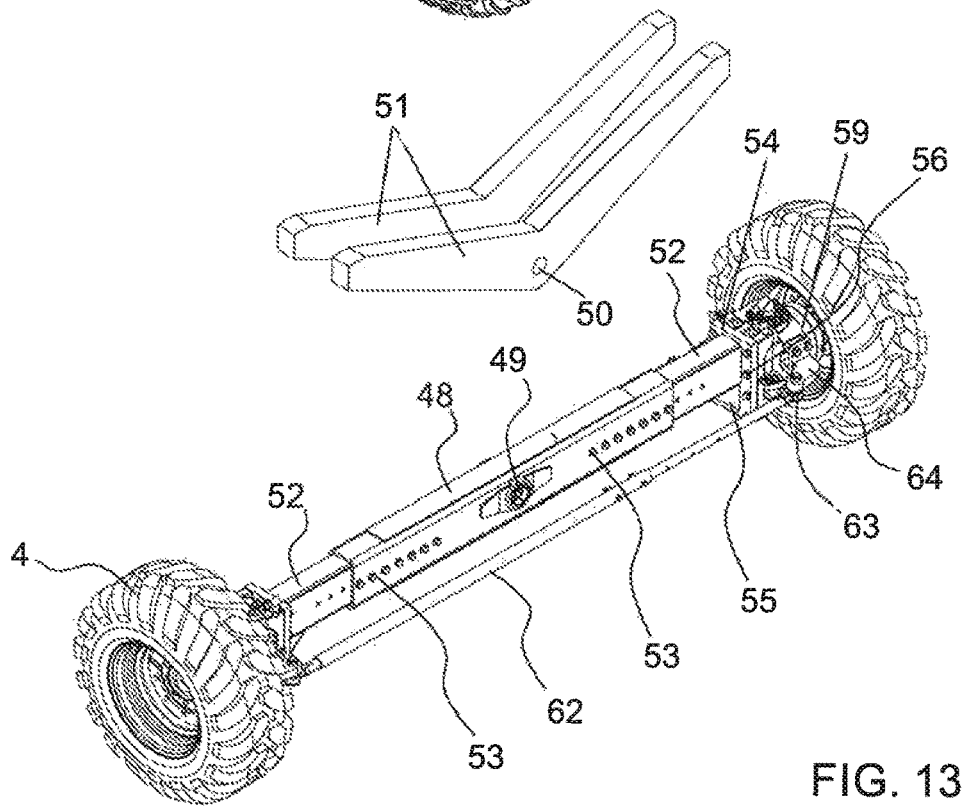
Figure 14:
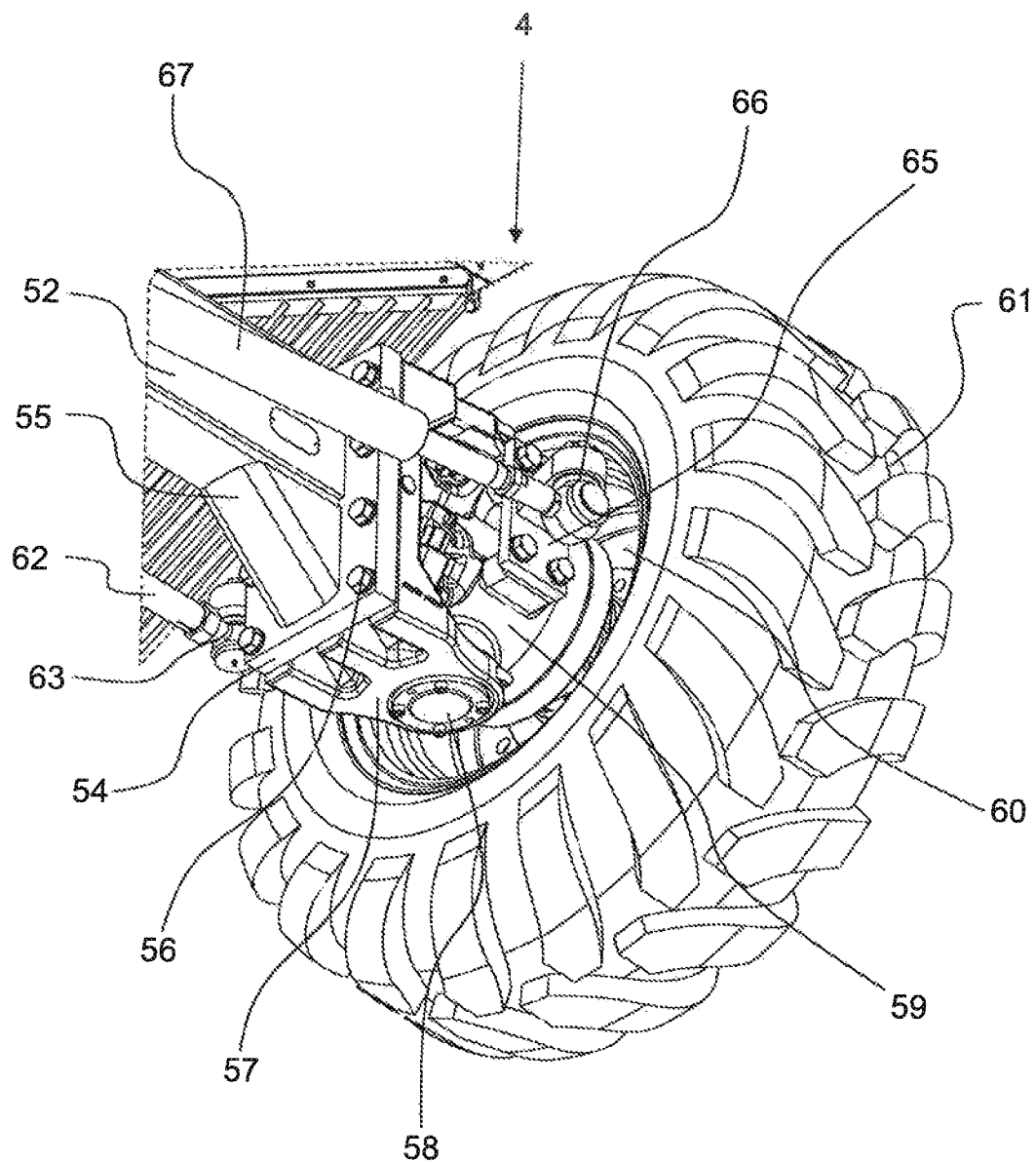

FIGS. 12 to 14 illustrate the smaller rear wheels (4) and their axis (5), the axis (5) formed by a central rectangular tube (48) with a central hinging point (49) for the equally central hollow vertex (50) of a pair of V-shaped rocker arms (51), the upper edges of which are rigidly fixed under the corresponding parts of the chassis (1). The central rectangular tube (48) telescopically receives two tips, also made of rectangular tubes (52), adjustably fixed to each other by rows of holes and screws (53). The distal edge of each tip (52) receives a vertical rectangular assembly plate (54) and a corresponding square reinforcement (55), upon which screws (56) fix a fork (57), the edges of which constitute hinging points (58) for the corresponding parts of a hydraulic engine (59) directly coupled to the arc (60) of the tire (61), providing for traction and drivability for each rear wheel (4), which are synchronized to each other by a stabilizing bar (62), whose edges move pivotably (63) over supports (64) fixed to the rear parts of the body integrating the hydraulic engine (59), while, on the front part, there are other supports (65) for pivoting (66) the edges of corresponding hydraulic cylinders (67), whose opposed edges are equally pivoted (68) on other supports (69) adjustably fixed to the rows of holes and screws (53). Consequently, the synchronized activation of the hydraulic cylinders (67) provide the means required for directing and driving the rear wheels (4).

Figure 15:
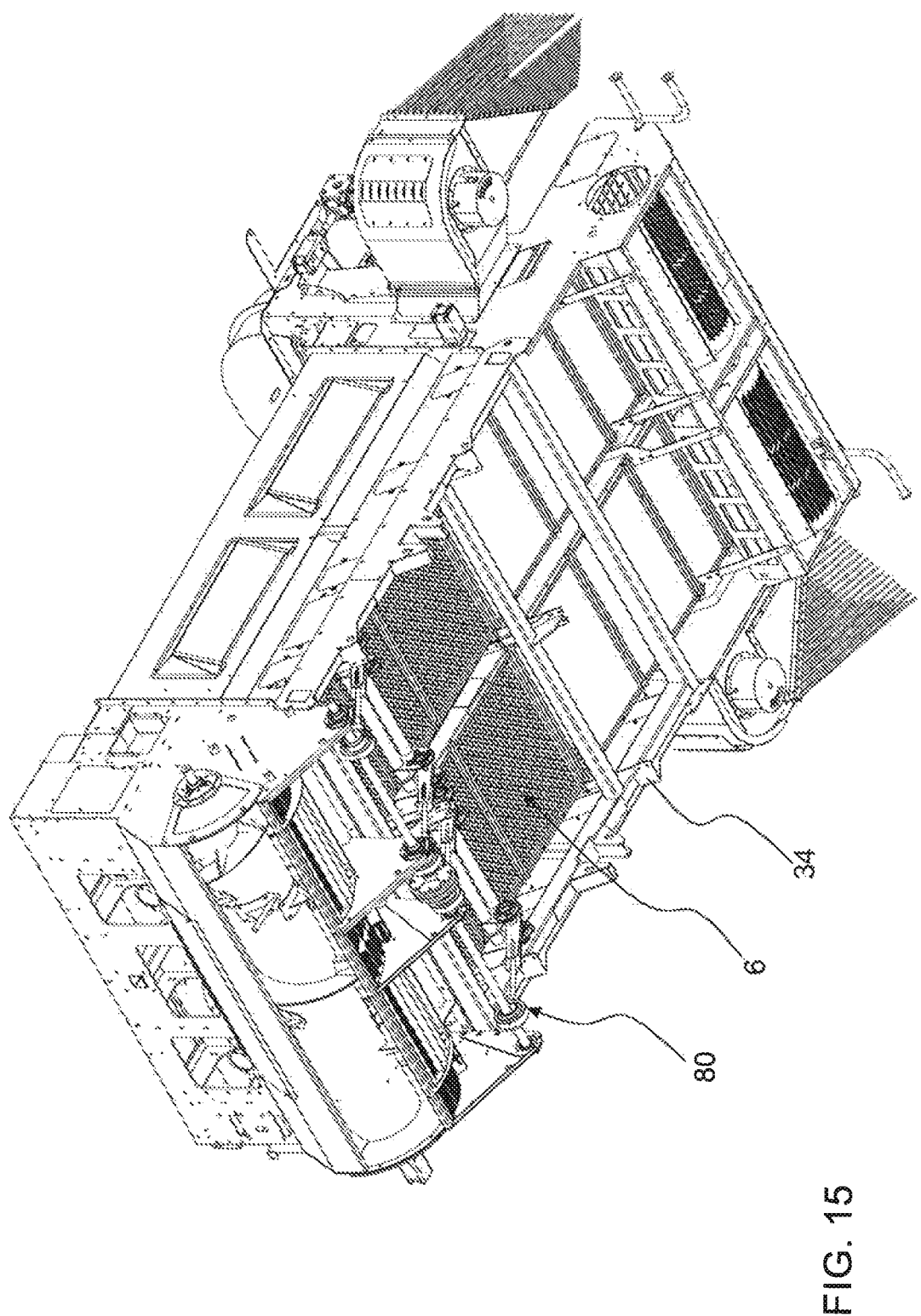
FIG. 15 shows a lower angled perspective view of the motor vehicle, highlighting the chassis and the vibrating screen assembled over it.
Figure 16:
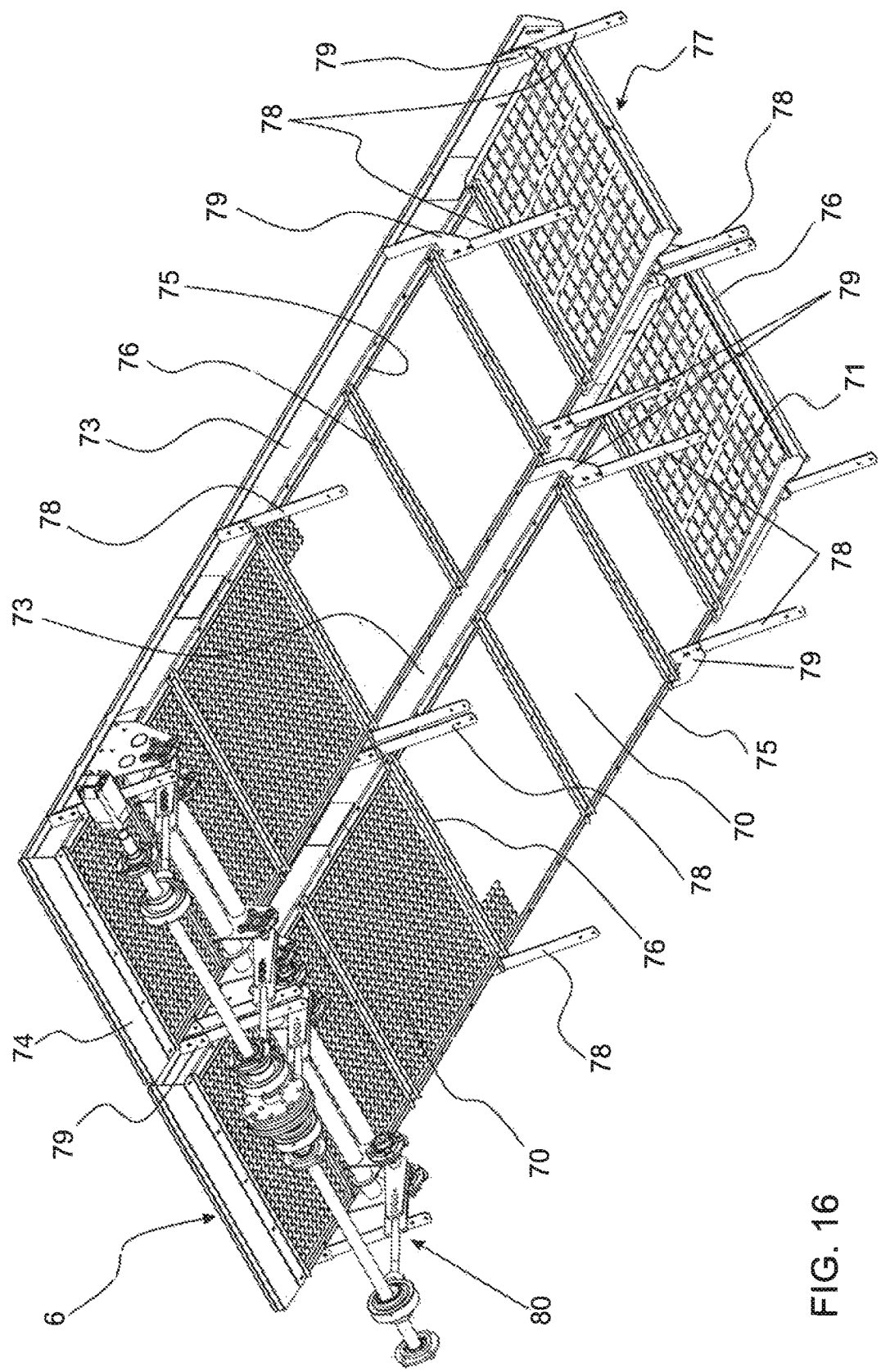
FIG. 16 shows a lower perspective angled view of the vibrating screen.
Figure 17:
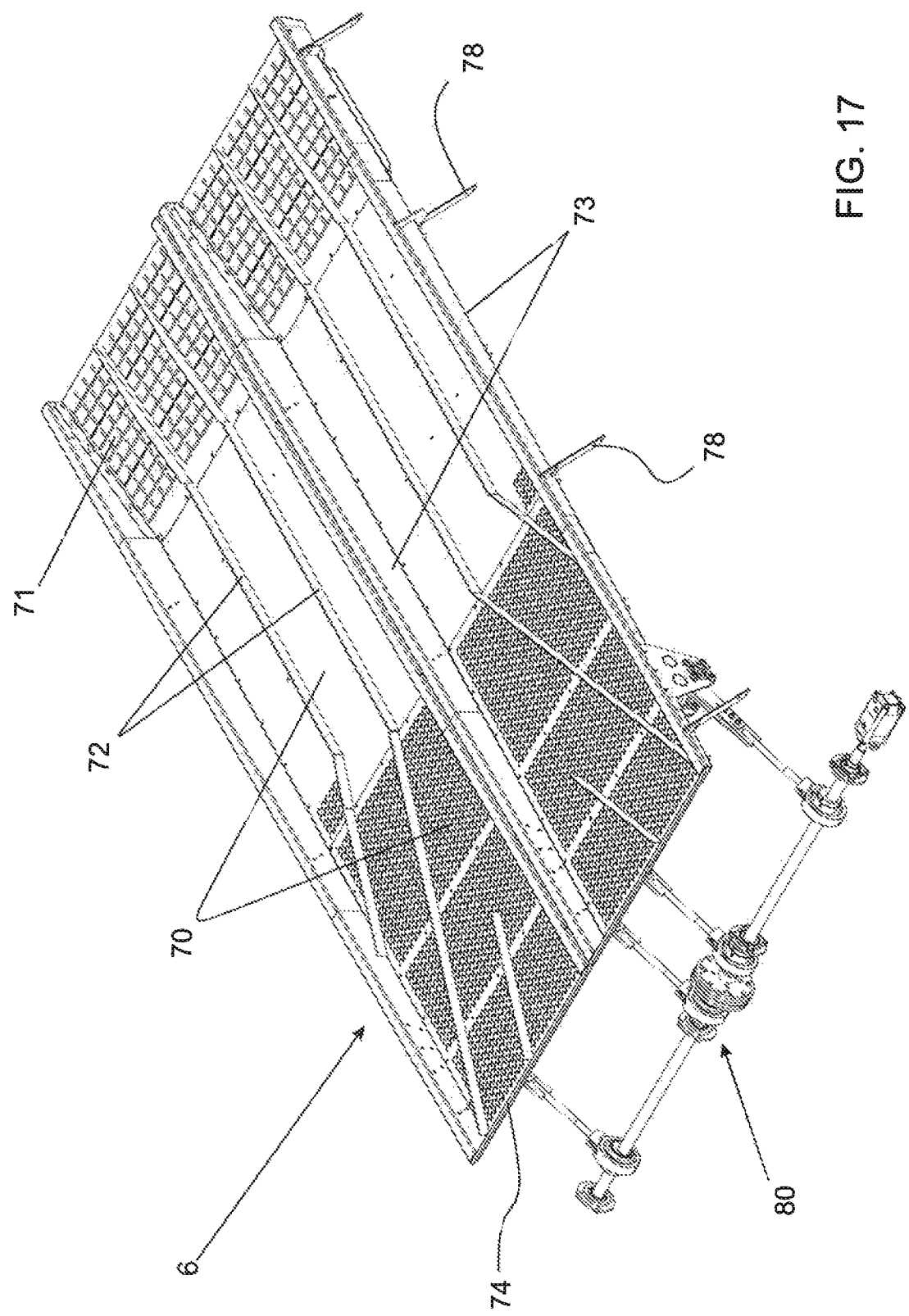
FIG. 17 shows an upper angle view of the vibrating screen.

FIGS. 15, 16 and 17 illustrate the details of the construction of the vibrating screen (6). The vibrating screen is a double screen, i.e. there are two units one next to the other, each unit having a plane defined by a set of double internal screens with different types of mesh (70) and (71), and also including three lengthwise rulers (72) towards each side, the rulers closest to the centre latter being substantially shorter than the others, with all rulers located in a horizontally sloping direction. All of the screens are structured within a frame having side walls (73), and a front wall (74), with no rear wall on the opposing side of the front wall. Under the screens (70), (71) and (72), all of the walls (73) and (74) receive lower lengthwise (75) and crosswise (76) structural complements, forming a lower structural frame (77). The lower structural frame has numerous blade springs (78) distributed solely or in pairs, with all blade springs projecting downwards with the same slope, and having their upper edges fixed to upper supports (79), while their lower edges are fixed to the supports (34) and other parts integrated with the chassis (1), to which the lower structural frame is also coupled by a vibrating set (80).

Figure 18:
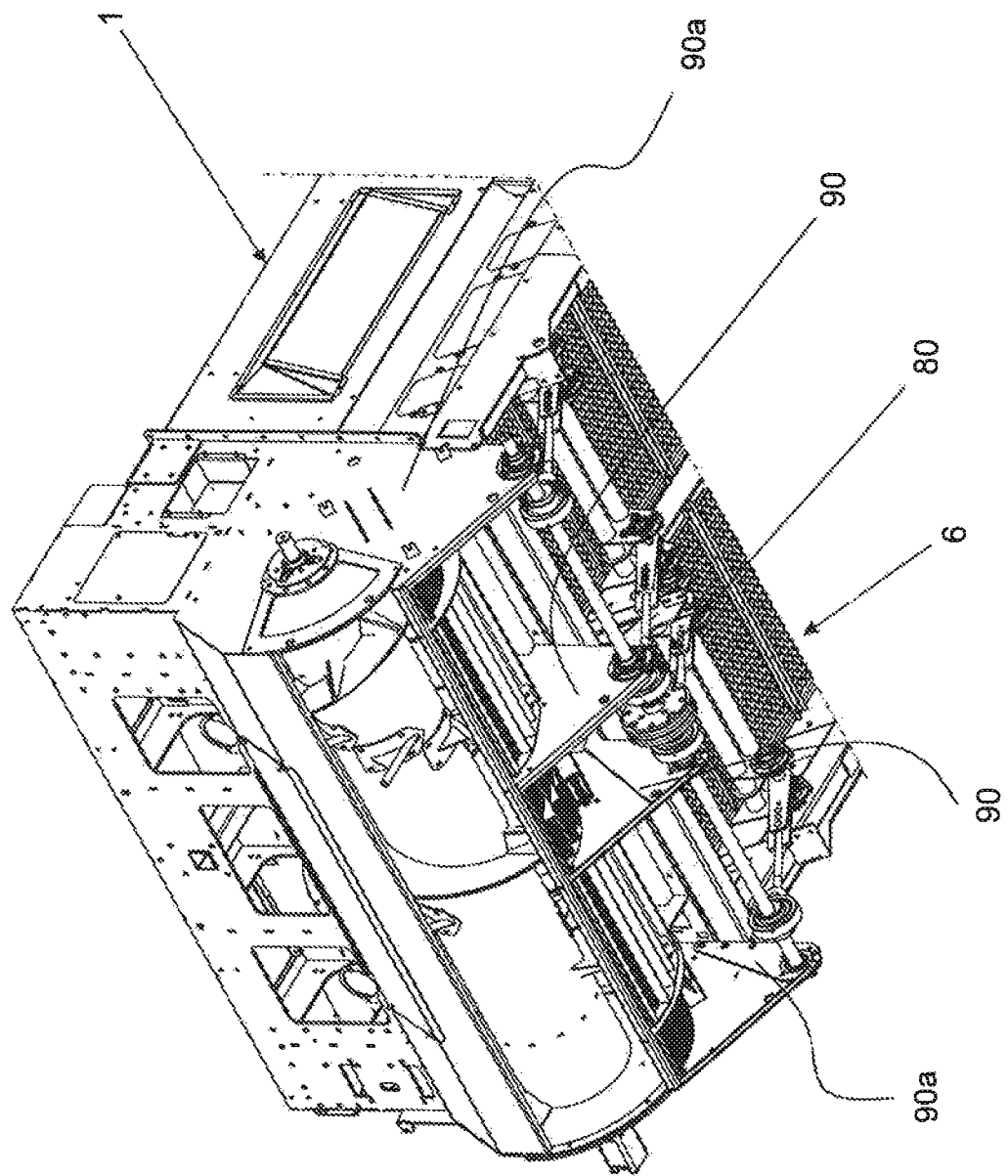
FIGS. 18 and 19 show perspective views of enlarged details of the vibrating screen, highlighting the vibrating set.
Figure 19:
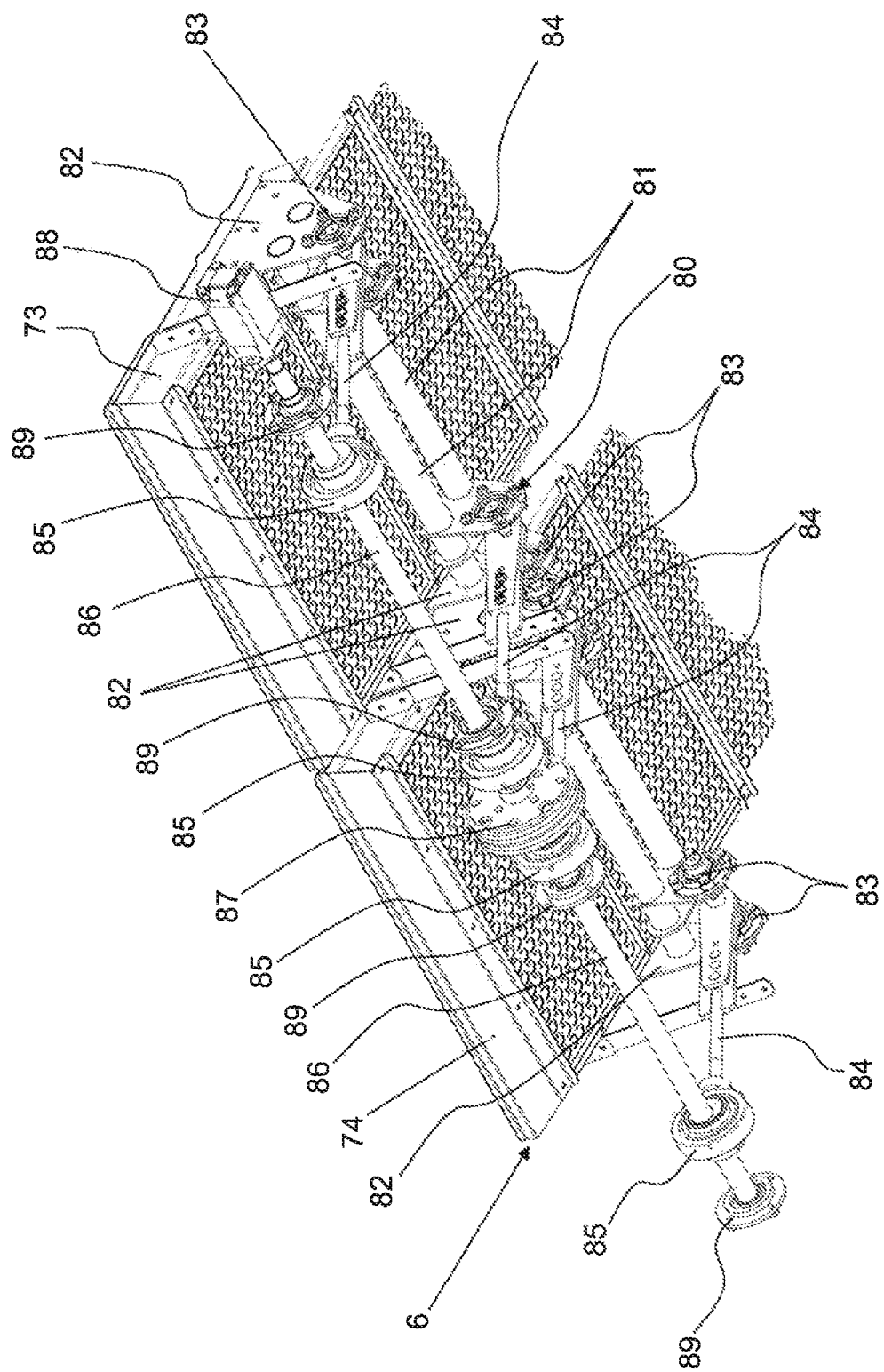

In FIGS. 18 and 19, the vibrating set (80) is shown in detail. It is assembled under and next to the front edge of the vibrating screen (6), and comprises two parallel and crosswise tubes (81) fixed to vertical supports (82). The upper edges of the vertical supports are fixed to the respective side walls (73) of the vibrating screen (6), while on their lower edges, all vertical supports are identically provided with bearings (83) on each side, to which the upper edges of connecting rods (84) of adjustable length are coupled. Each connecting rod has their lower edges connected to an eccentric bearing (85) located along a motor axis (86). The motor axis is comprised of two segments which are interconnected by a flange (87), with each end of each segment having an end bearing (89), with one terminal end of the motor axis coupled to a hydraulic engine (88). The end bearings (89) on the internal ends of the motor axis are fixed at their ends to internal supports (90), and at the external ends to external supports (90*a*) integrated at the sides and at the lower part of the concentrating guiding roller (8).

Figure 20:
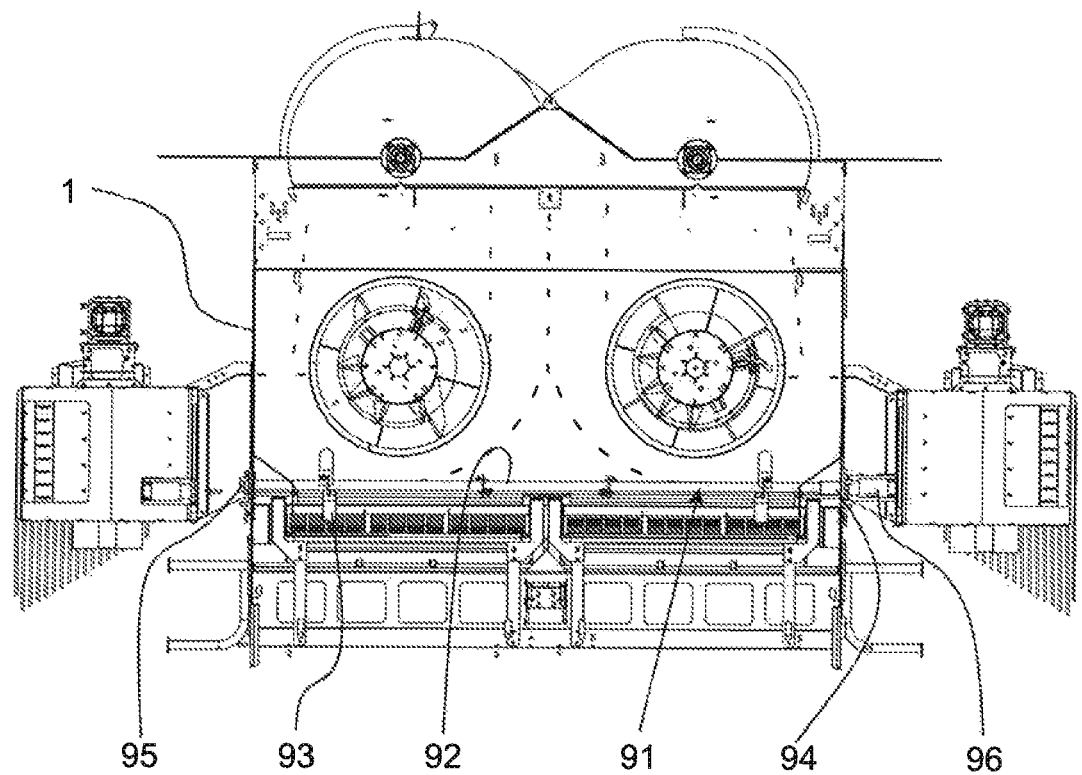
FIG. 20 shows a partial view of the crosswise cut B-B as shown in FIG. 5, and an enlarged detail view of the tangle-free axis.
Figure 20:
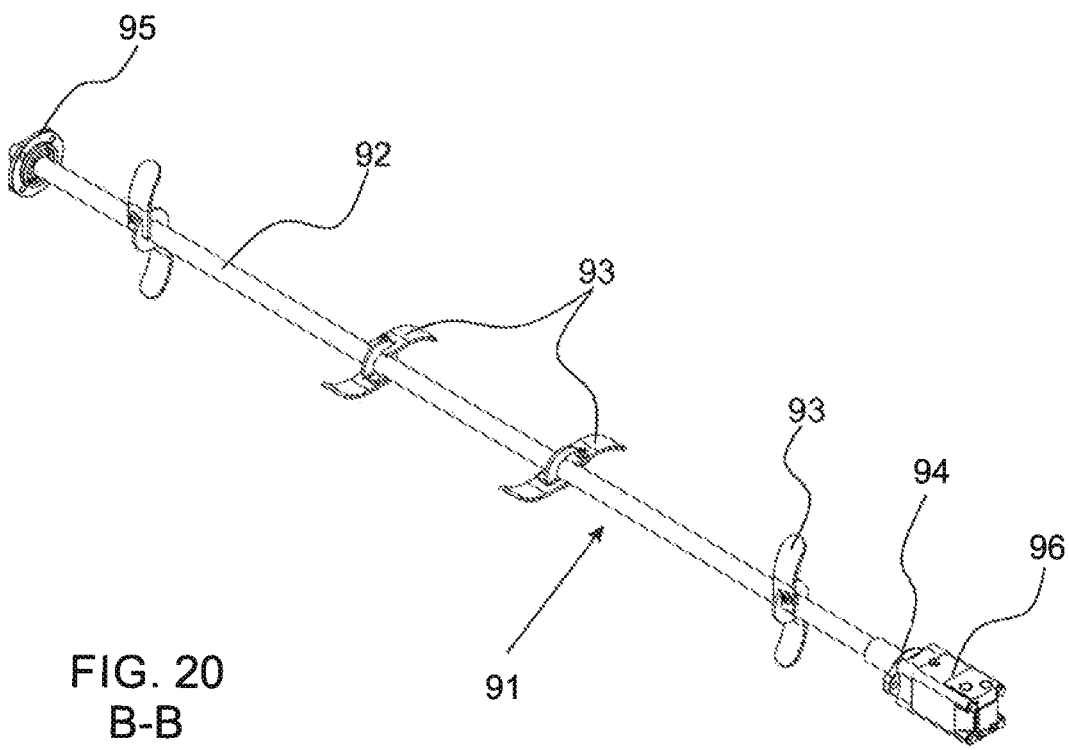

As shown in FIG. 20, a pushing set (91) for branches and leaves is assembled over the vibrating screen (6), formed by a crosswise axis (92) along which helixes (93) are provided, so as to push the material rearwards during the cleaning process. The crosswise axis (92) is rotatingly assembled jointly with bearings on the right (94) and left (95) ends fixed to the sides of the chassis (1), wherein the left end is also coupled to a hydraulic engine (96).

Figure 21:
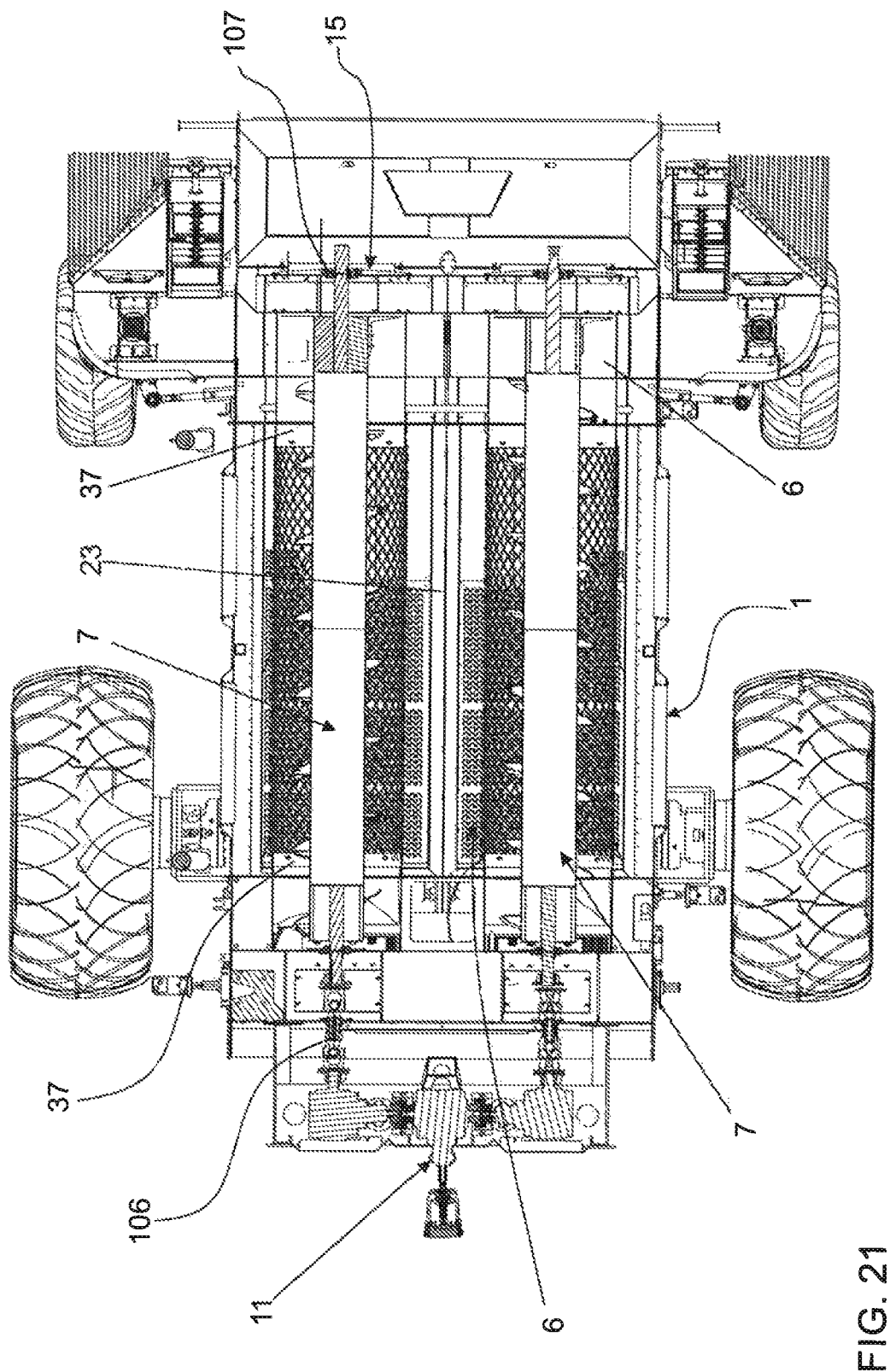
FIG. 21 shows the C-C cut as shown in FIG. 5, highlighting the activating set and the rotating cleaning set.
Figure 22:
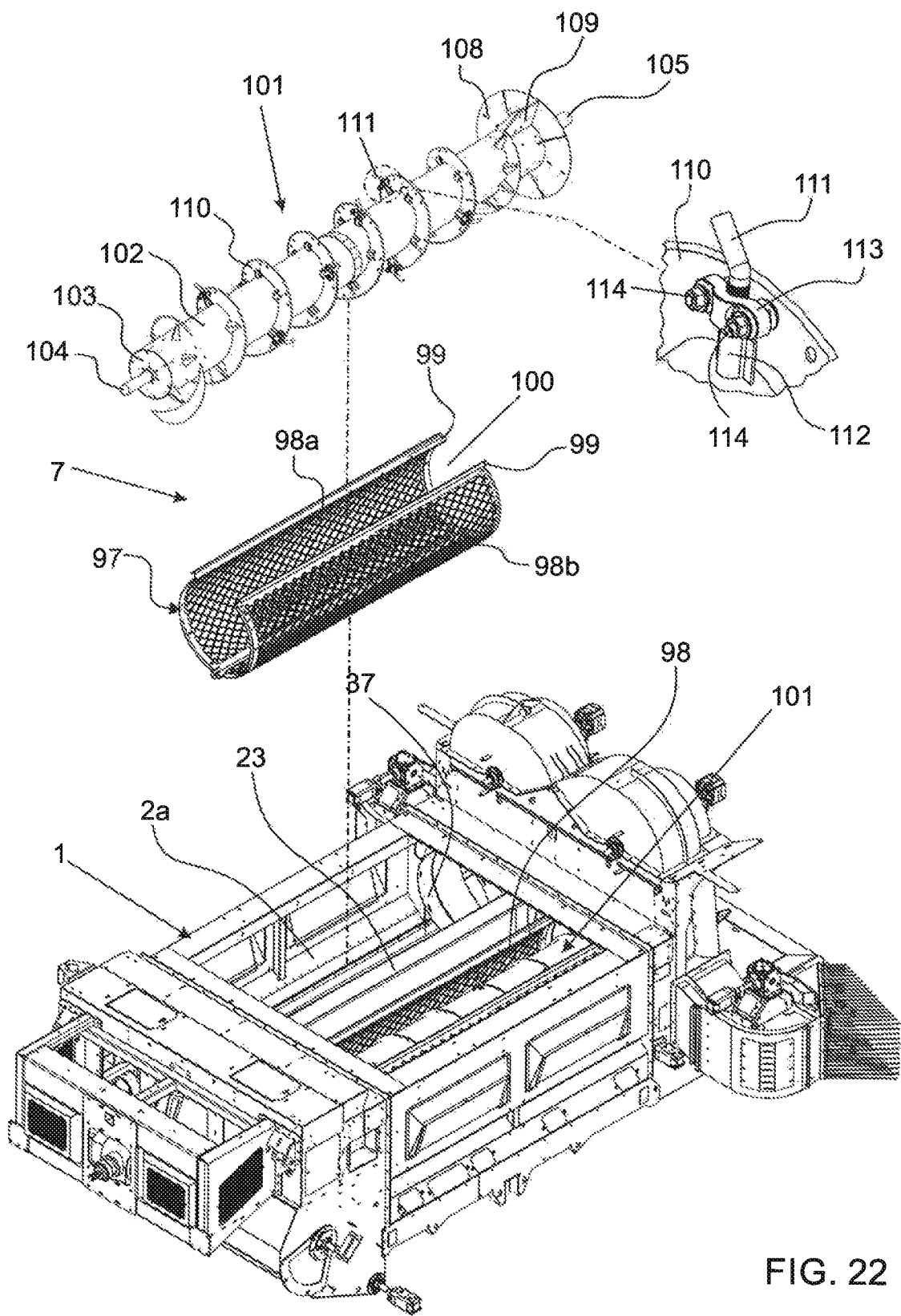
FIG. 22 shows an exploded perspective view of an enlarged detail, highlighting the chassis and the rotating cleaning set.
Figure 23:
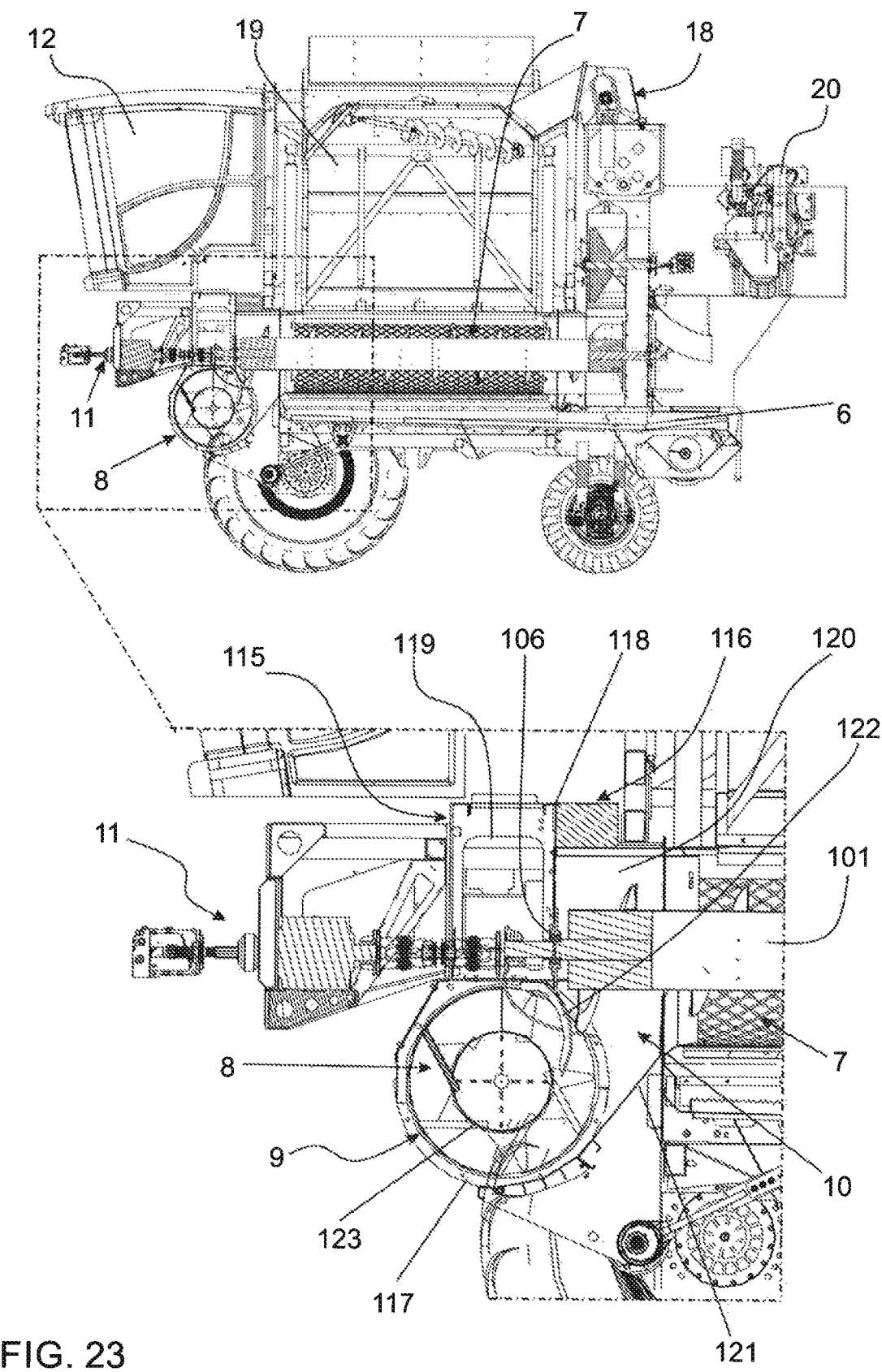
FIG. 23 shows a lengthwise cut view and its enlarged detail, highlighting the concentrating guiding roller.
Figure 24:
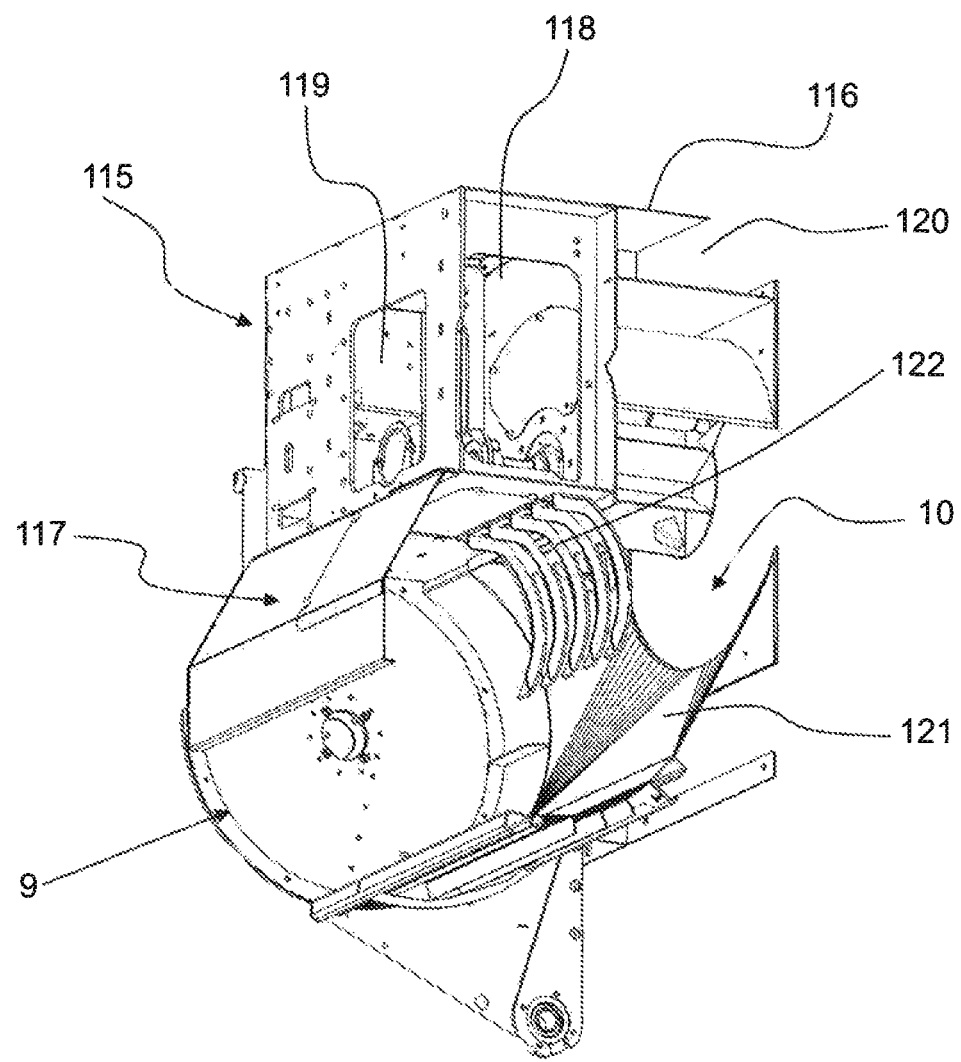
FIG. 24 shows an enlarged perspective and cut detailed view of the box housing the concentrating roller.
Figure 25:
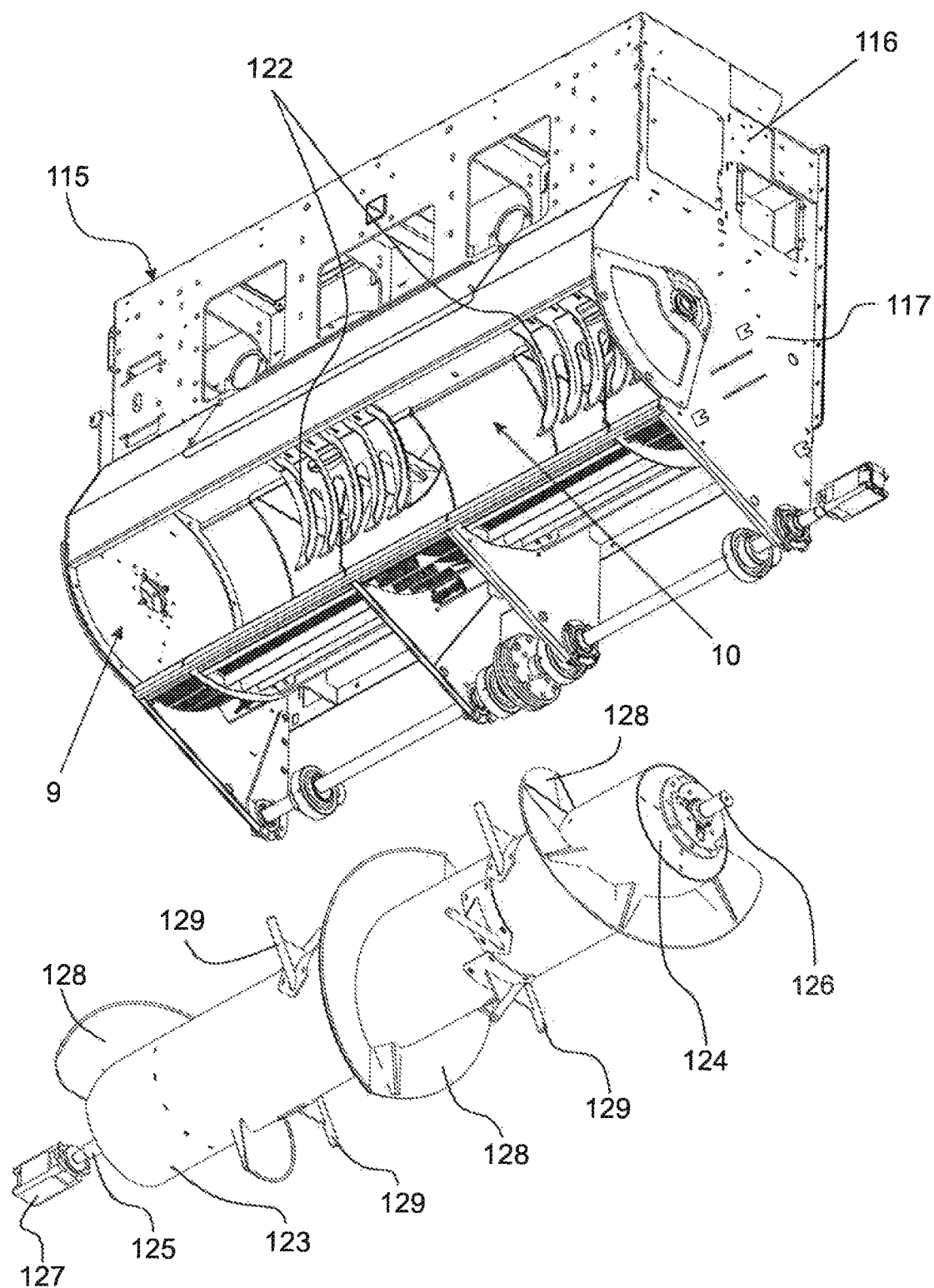
FIGS. 25 and 26 show isometric and exploded views of enlarged details, also highlighting the concentrating guiding roller.
Figure 26:
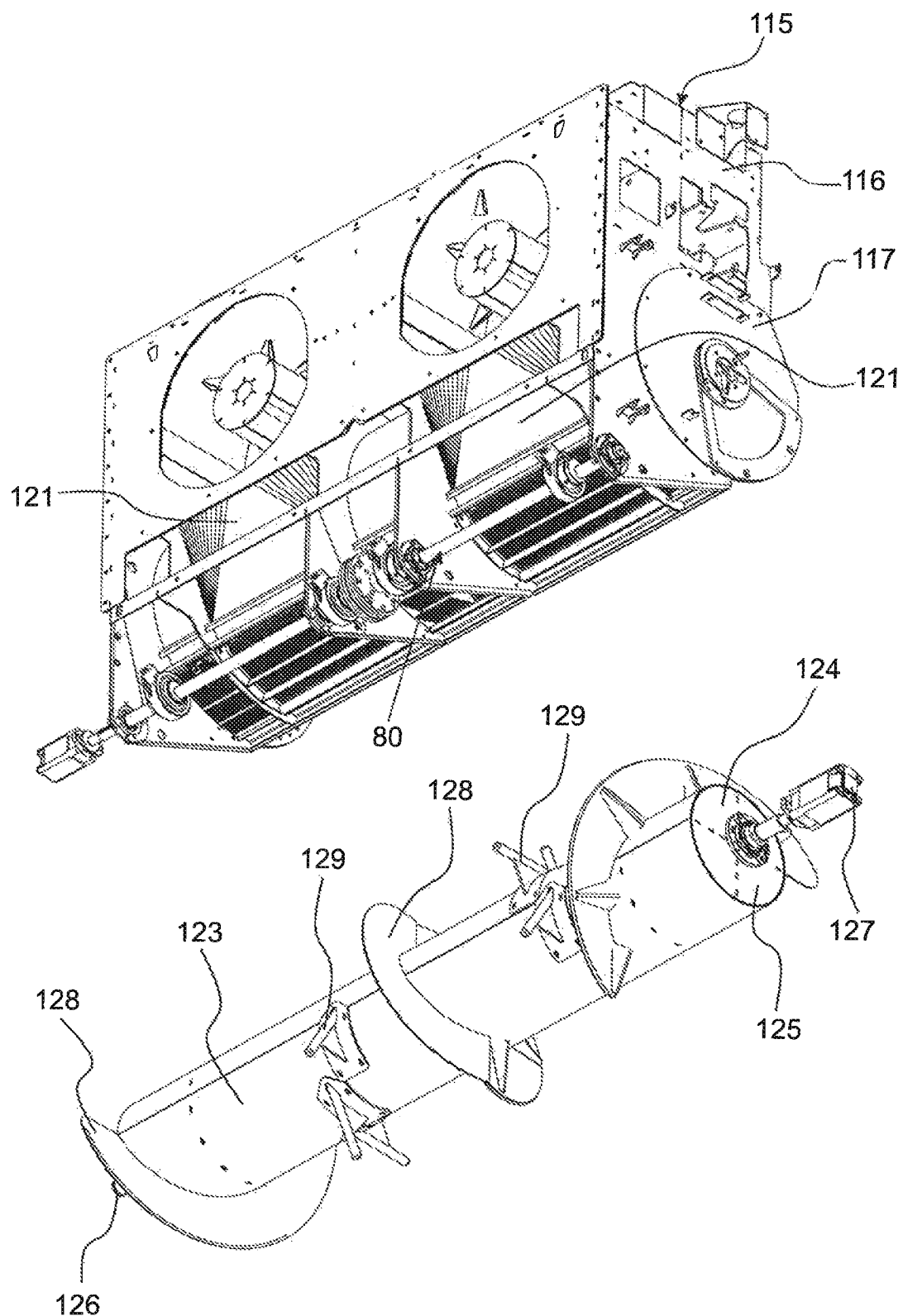

FIGS. 21 and 22 illustrate the details of the double rotating cleaning set (7), comprised of two identical units, assembled within the intermediate spaces (2*a*) adjacent to the intermediate wall (23) of the chassis (1). Each unit is formed by a bipartite (98*a*) and (98*b*) cylindrical screen (97), the semicircular parts being framed (99) and located against and alongside each other, forming an upper opening (100). The screen (97) has a sufficient mesh size to allow the passage of grains and other smaller particles to fall directly over the vibrating screen (6). The edges of the bipartite cylindrical screen (97) are located inside the circular inner collars (37) of the chassis (1), and form a housing tunnel for a striking roller (101).

The striking roller is formed by a tubular body (102) with blind flanges (103) and respective front axis (104) and rear axis tips (105). The front axis tip (104) receives a coupling (106) for connection to the hydraulic activation and transmission set (11), while the rear axis tip (105) has a bearing (107) on the corresponding internal wall of the ventilation box (15) and is preceded by a disc (108) having radial paddles (109), equally positioned on the lower internal part of the ventilation box (15). The tubular body (102) of the striking roller (101) has a helical dagger (110) provided along its external diameter, the dagger having a plurality of radial and angular fingers (111), each finger having a radial support (112) and a clamp (113) which, by means of screws, nuts and washers (114), adjustably fix each angular radial finger to the helical dagger (110).

The object of the striking roller set is to shake the material, loosening grains, while simultaneously promoting the frontwards displacement of the whole material. Therefore, grains and other particles with similar measurements pass through the cylindrical screens (97) and fall directly over the vibrating screen (6), while the rest of the material follows towards the rear part of the machine towards the ventilation box (15) for disposal.

In FIGS. 23 to 26 the concentrating guiding roller (8) is shown in detail. The concentrating guiding roller is formed by a box housing (115) running along the whole crosswise section of the chassis (1) and comprising two portions, an upper parallelepipedal portion (116) and a lower cylindrical portion (117). The upper parallelepipedal portion includes internal walls (118) dividing it into two compartments, a front compartment (119) and a rear (120) compartment. The rear compartment houses the couplings (106) of the striking rollers (101) for assembly, while the front compartment receives a part of the hydraulic set for activation and transmission (11).

The lower cylindrical portion (117) has two openings, an inlet opening (9) for entry of the material to be processed, and a rear outlet opening (10). The rear outlet has conversion walls (121) along the bottom, sloping upwards and ending in two circular nozzles, one aligned to each tunnel of the rotating cleaning set (7). Each nozzle is preceded by a fixed comb (122), which aligns with the cylindrical shape of the cylindrical portion (117). Preceding the fixed combs a tubular roller (123) is also assembled, closed by blind flanges (124) and their respective edges for the left axis (125) and right axis (126), the left axis coupled to a hydraulic engine (127), with both axes also borne on the side walls forming the lower cylindrical portion (117). The tubular roller (123) is also externally provided with inverse helicoids (128) and radial fingers (129), and consequently, all the material entering through the inlet opening (9) is thrown behind the tubular roller towards the inner side of the rotating cleaning set (7).

Figure 27:
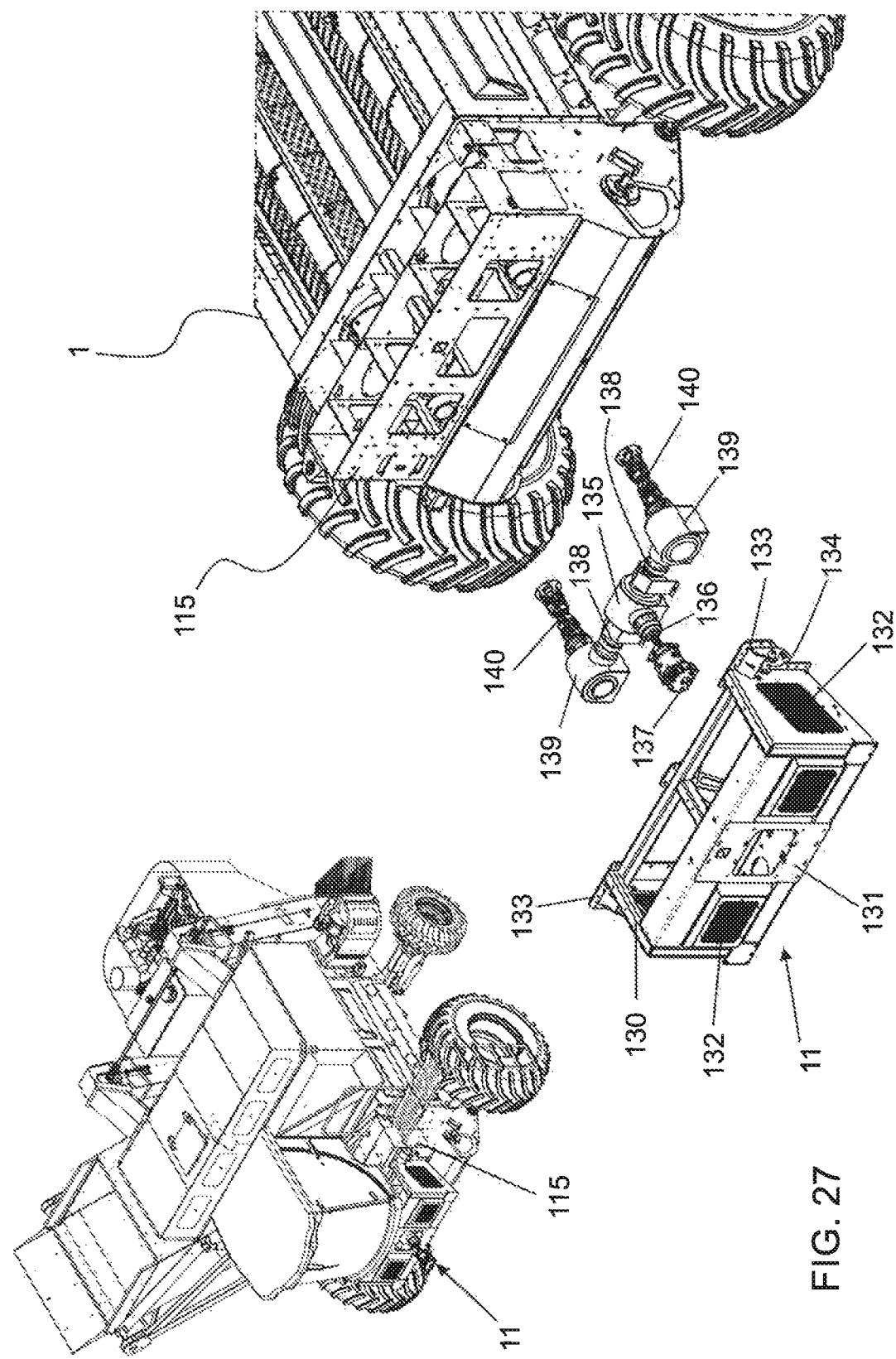
FIG. 27 shows a perspective view of the motor vehicle and an exploded enlarged detail view in perspective, highlighting the hydraulic transmission set and activating the cleaning rotating set.
Figure 28:
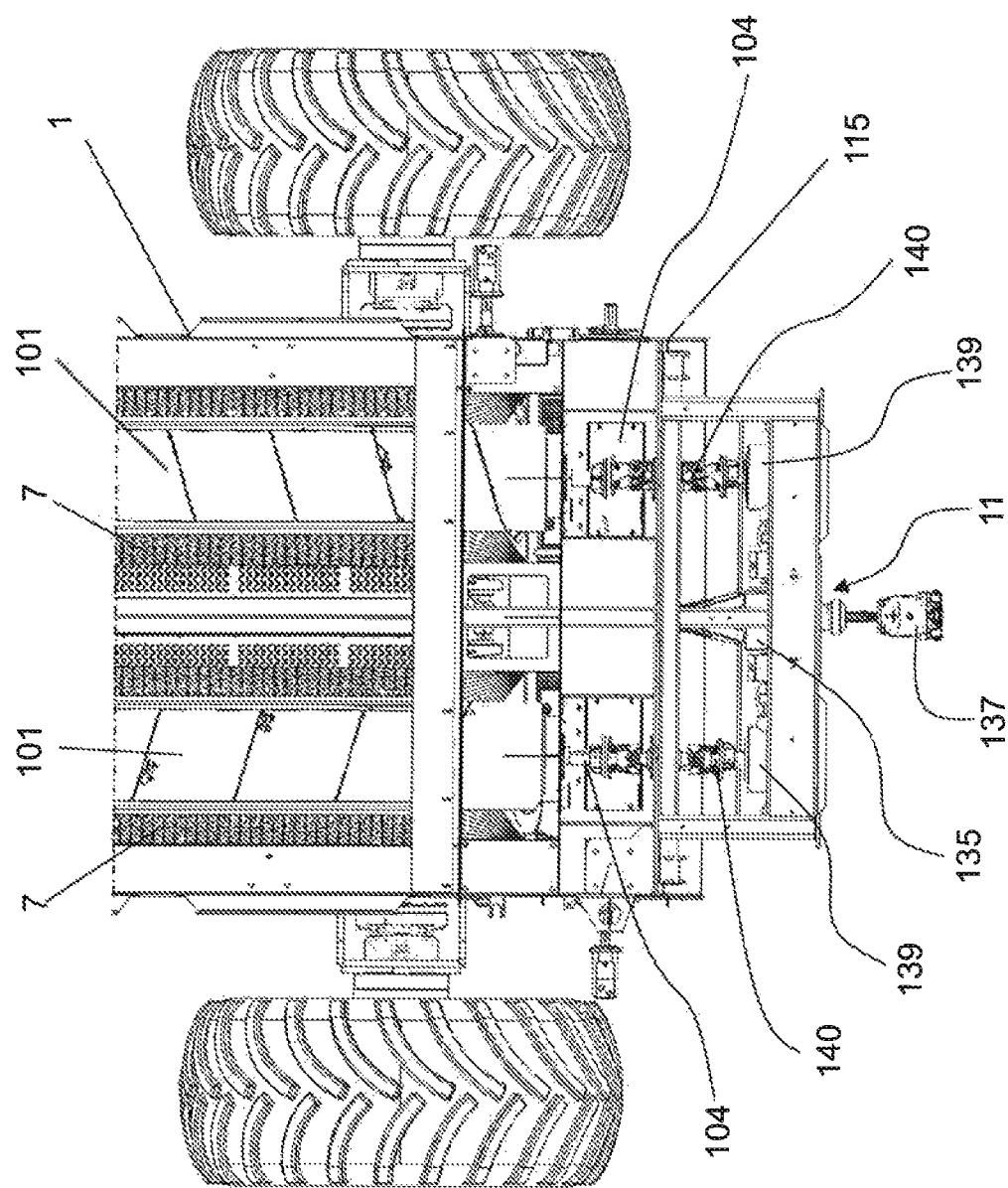
FIG. 28 shows an enlarged detail upper view, highlighting the hydraulic transmission set and the activation of the rotating cleaning set.
Figure 29:
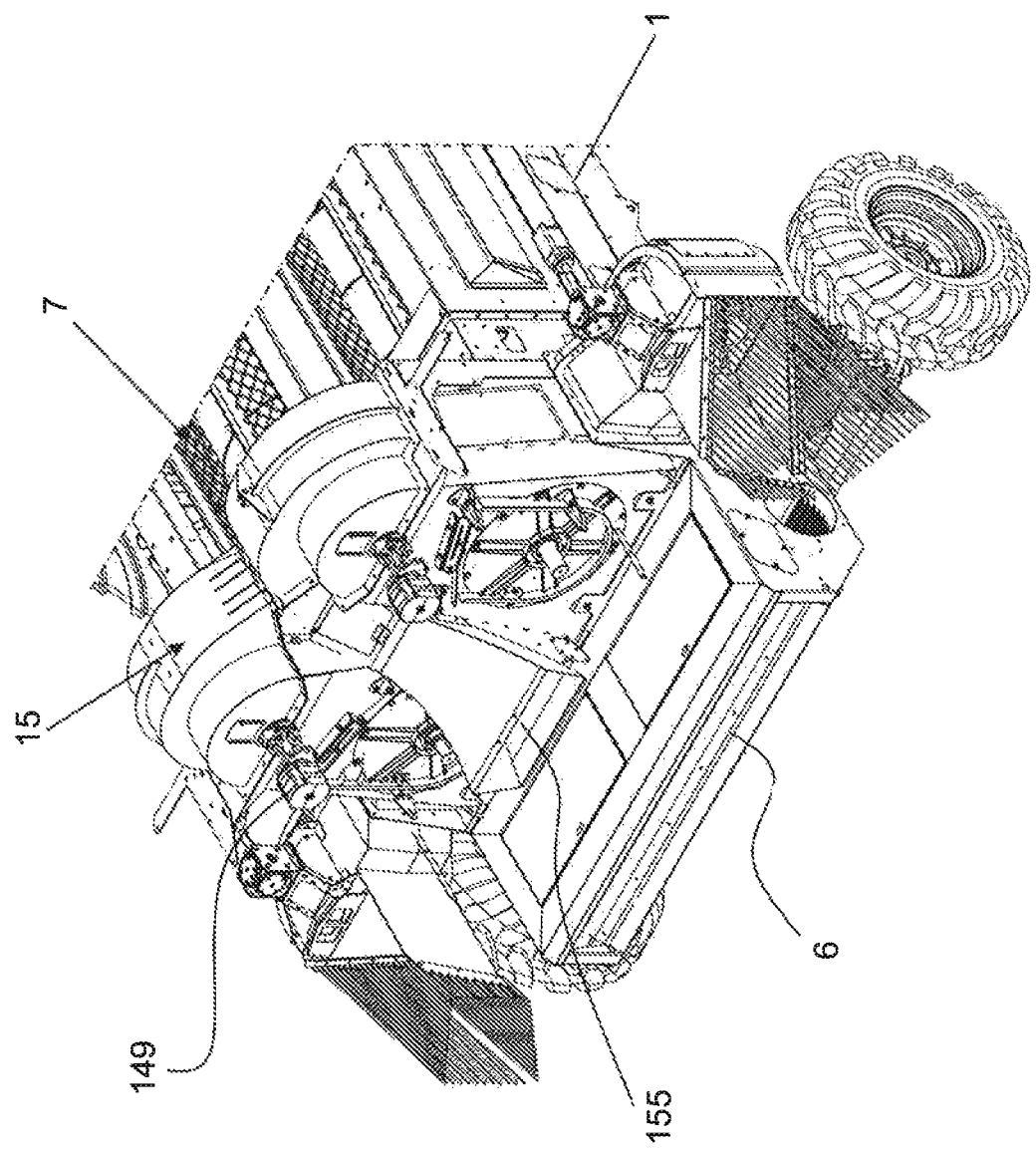
FIG. 29 shows an upper rear angle partial perspective view of the rear part of the motor vehicle, highlighting details of the ventilation box.
Figure 30:
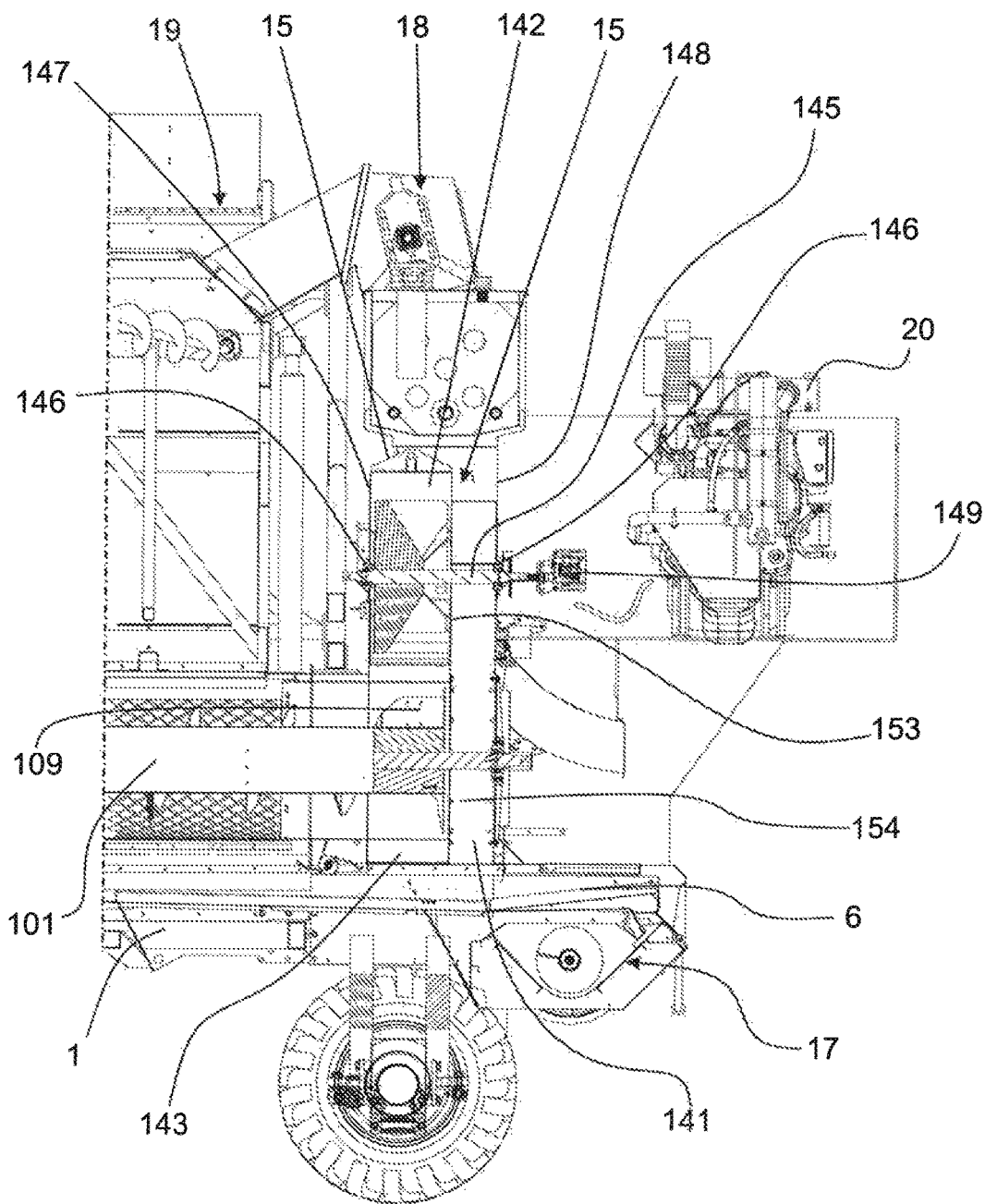
FIG. 30 shows an enlarged detail of the cut of FIG. 5, highlighting details of the ventilation box.
Figure 31:
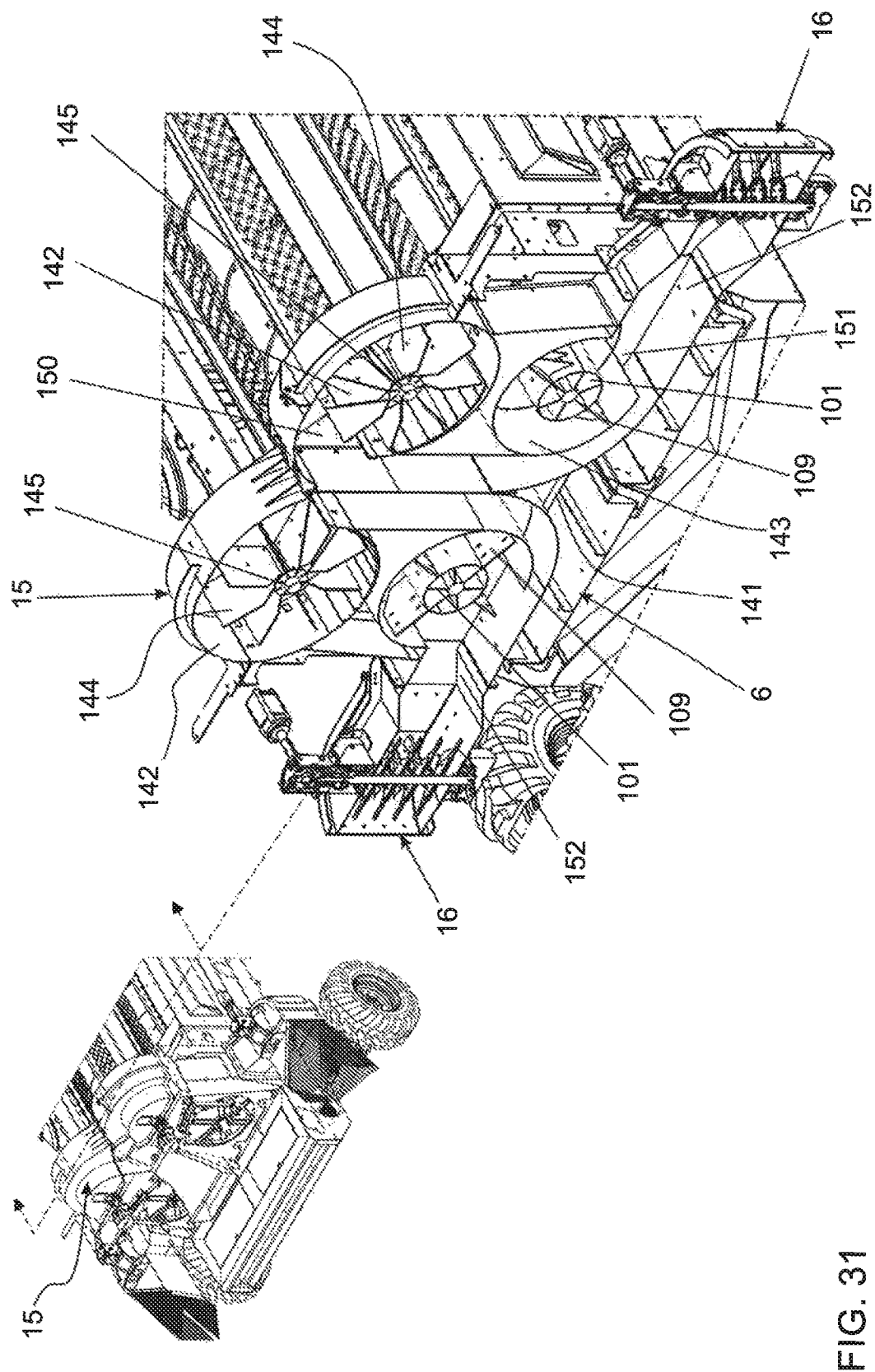
FIGS. 31 to 33 show a perspective view of various enlarged details of the ventilation box.
Figure 32:
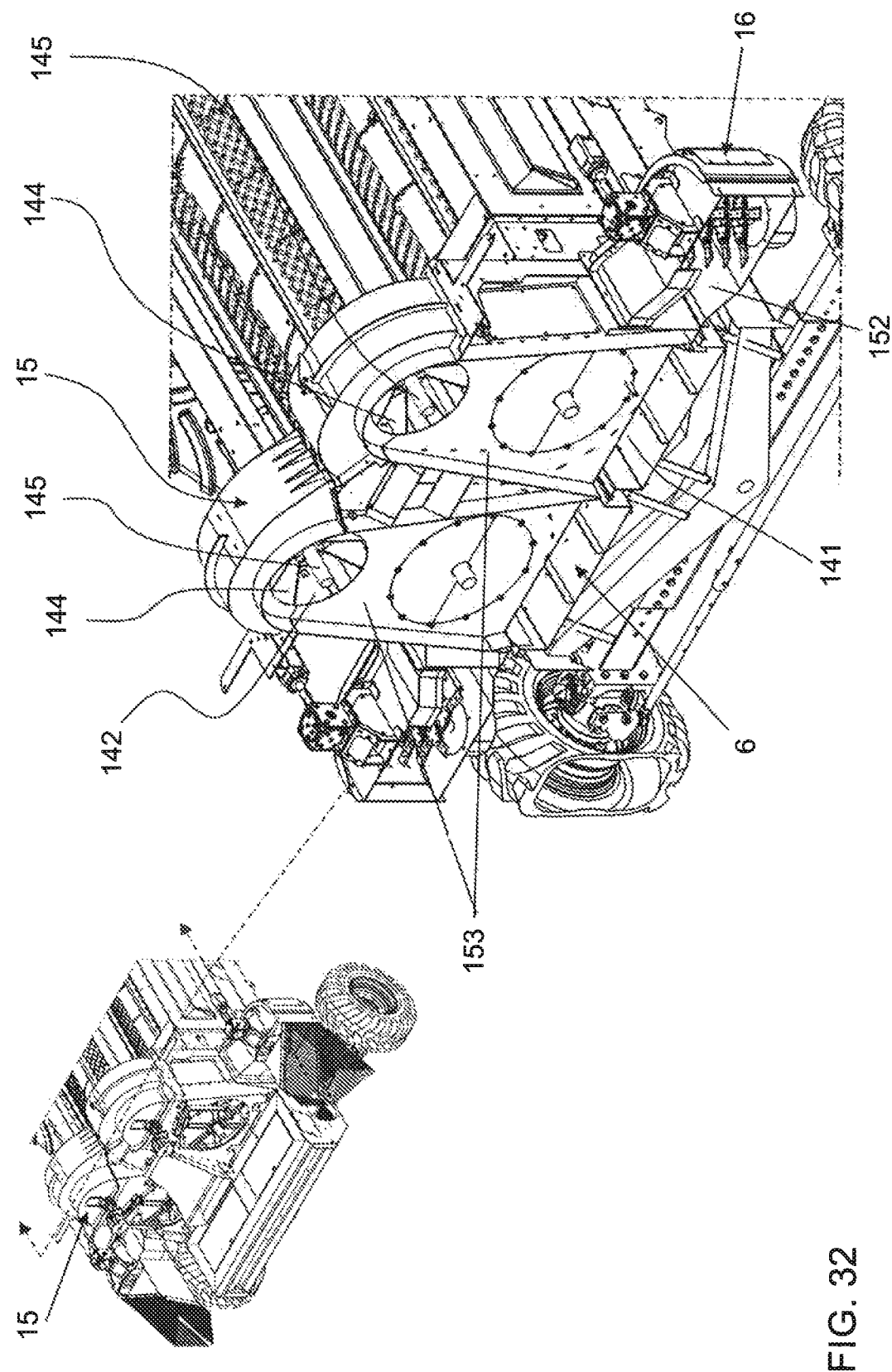
Figure 33:
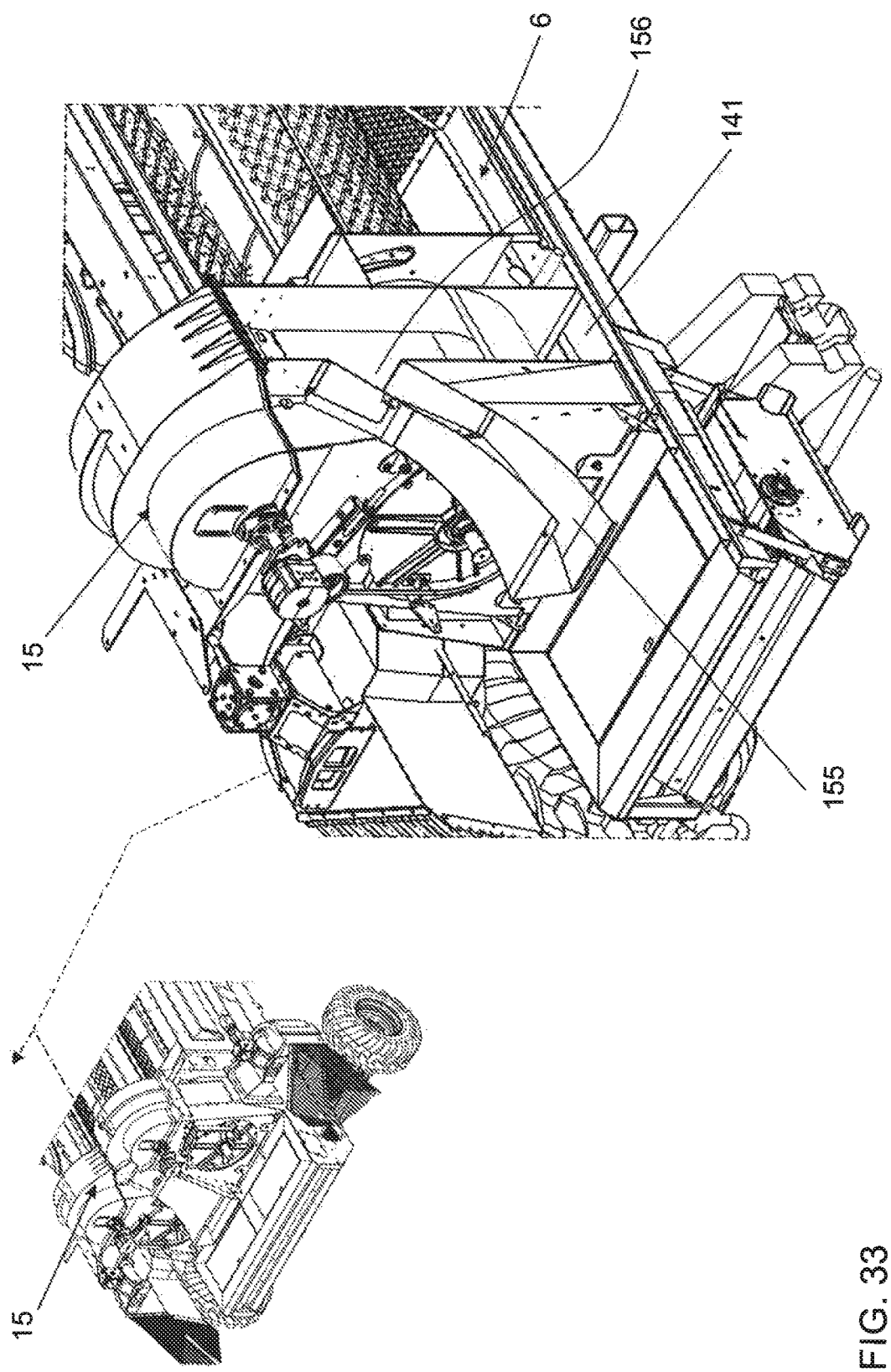

FIGS. 27 and 28 illustrate the hydraulic activation and transmission set (11), having a parallelepipedal structure (130) with various plate-shaped (131) and screen-shaped (132) closures forming a box, the rear side of which is open and has fixing supports (133) against the front face of the box housing for the concentrating guiding roller (115). The fixing supports include pins (134) for hinging agricultural implements to be coupled to the front part of the motor vehicle.

Inside the parallelepipedal structure (130), a first T-shaped gearbox (135) is assembled, having its first inlet axis (136) projected towards the front and coupled to a hydraulic engine (137), and two outlet axes (138), one on each side, and each coupled in an identical manner to a side gearbox at 90° (139). Each gearbox coupled to an outlet axis is provided with a cardan (140), which is coupled to the corresponding edge of the front axis (104) of the rollers (101) of the cleaning set (7). Therefore, only the hydraulic engine (137) and the T-shaped gearbox (135) and two side gearboxes (139) are responsible for activating the rotating cleaning set (7).

FIGS. 29 to 33 show the ventilation box (15) in detail, which is formed by a box with an aspiration nozzle (141) turned downwards, the aspiration nozzle located immediately above the vibrating screen (6) and covering its entire width. The box is also internally divided by multiple flat and curved walls to form various chambers, with the two first walls located on the top, creating two circular ventilation chambers (142) located side by side to each other, below which are located two other identical circular chambers defined as dragging chambers (143).

The ventilation chambers (142) house turbines (144) each having respective axes (145) with bearings (146) on the front (147) and rear (148) walls. Behind the rear walls, the axes (145) are coupled to hydraulic engines (149), serving to turn the turbines (144) to form cleaning air flows.

The dragging chambers (143) receive the edges of the striking rollers (101) on the corresponding paths of the radial paddles (109).

On each side of the vehicle, the upper ventilation chamber (142) and lower dragging chamber (143) have their respective tangential outlets (150) and (151) in communication with an outlet duct (152), the outlet duct curved and projected to the external side of the machine, where it is integrated to the corresponding impeller set for the outlet of residues (16).

Between the front (147) and rear (148) walls, there is an intermediate wall (153) defining a third aspiration chamber (154), the lower part of which comprises the aspiration nozzle (141) extending crosswise over the vibrating screen (6). This third aspiration chamber (154) is also interlinked to the upper ventilation chambers (142), and has an intermediate residue outlet (155) facing rearwardly, having its opening (156) located on the inner part between both turbines (144), where it receives the aspiration air flow coming from the lower part of the aspiration nozzle (141) section, such that dust and other residues are aspirated and thrown outside the machine.

Figure 34:
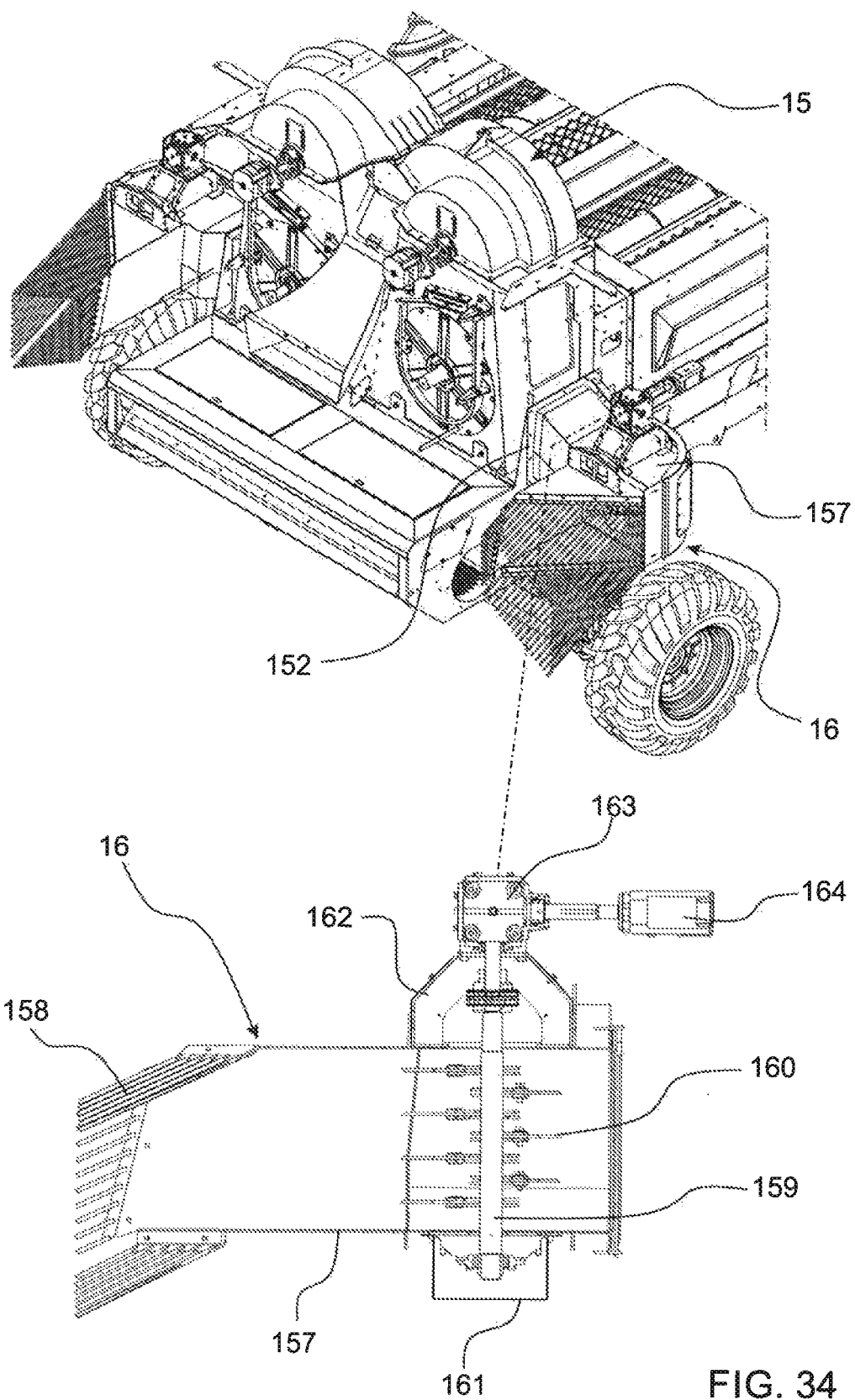
FIGS. 34 to 36 show various perspective views, some of which are exploded views and others in cut views, highlighting the details of one of the impeller sets for residue outlet.
Figure 35:
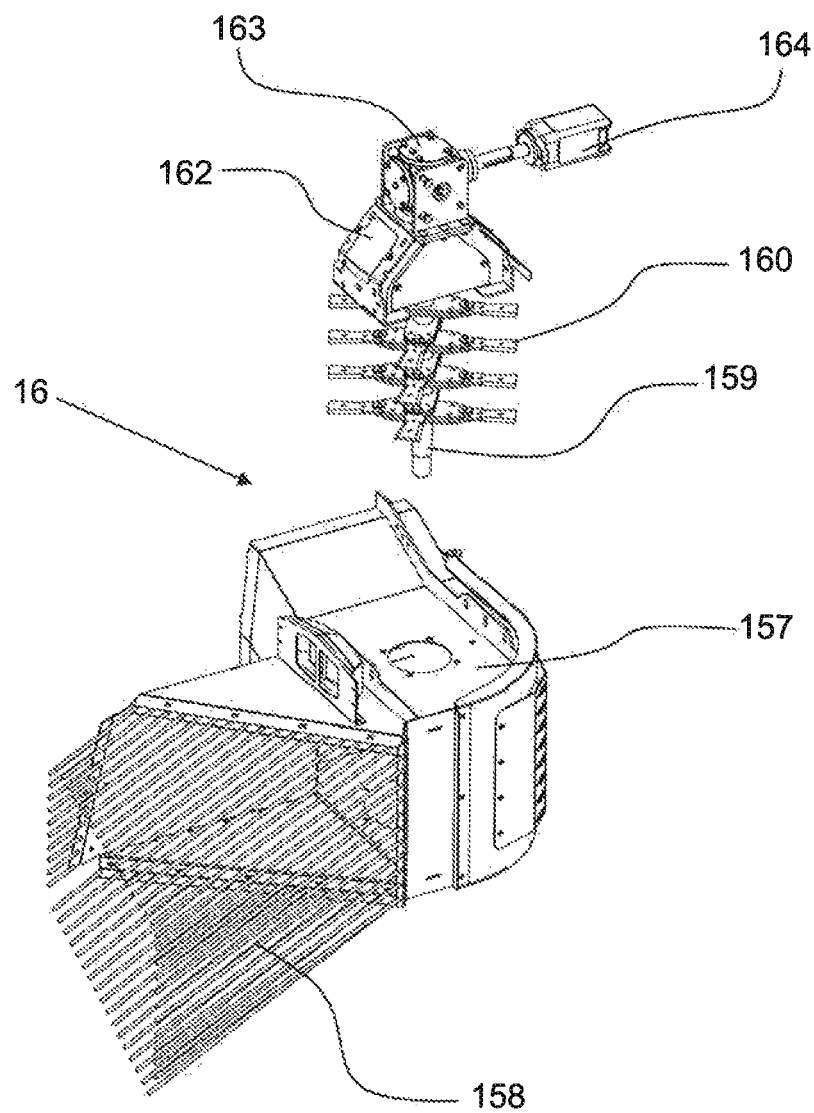
Figure 36:
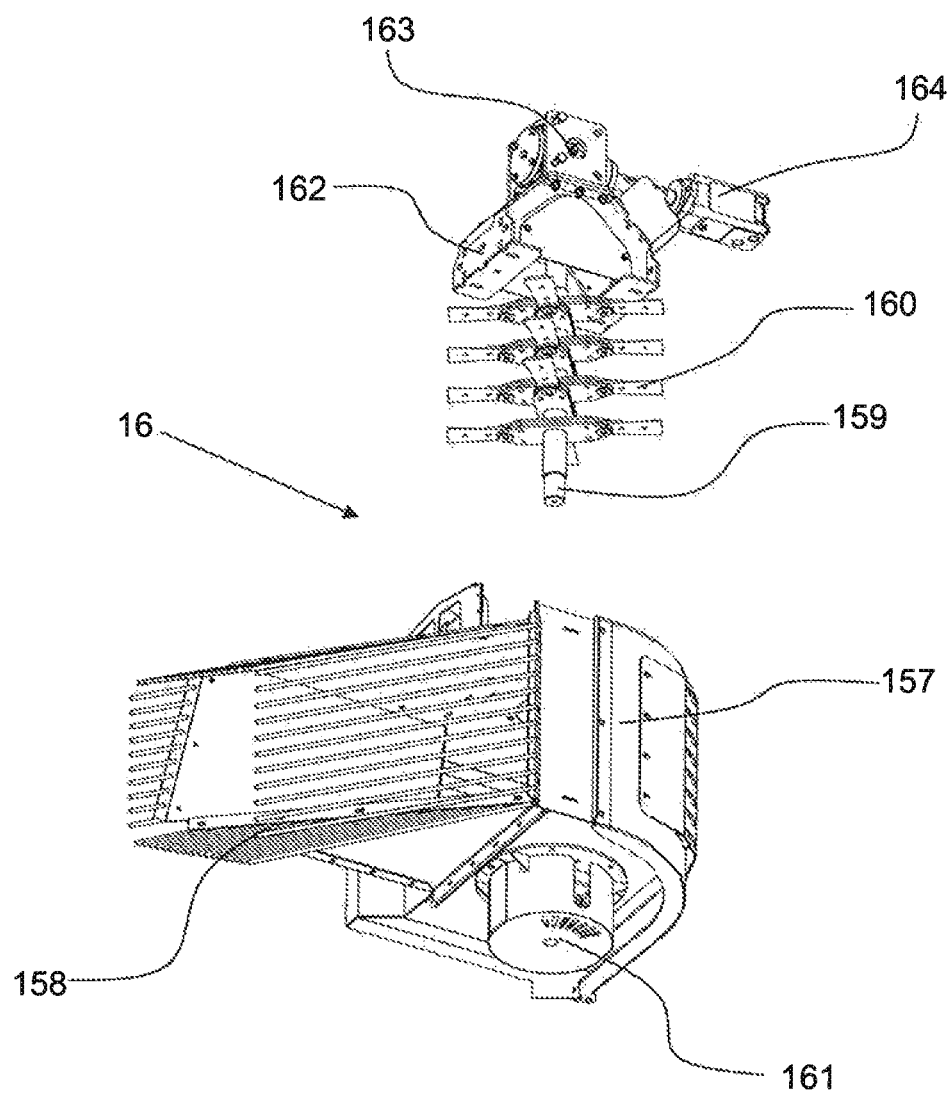
Figure 37:
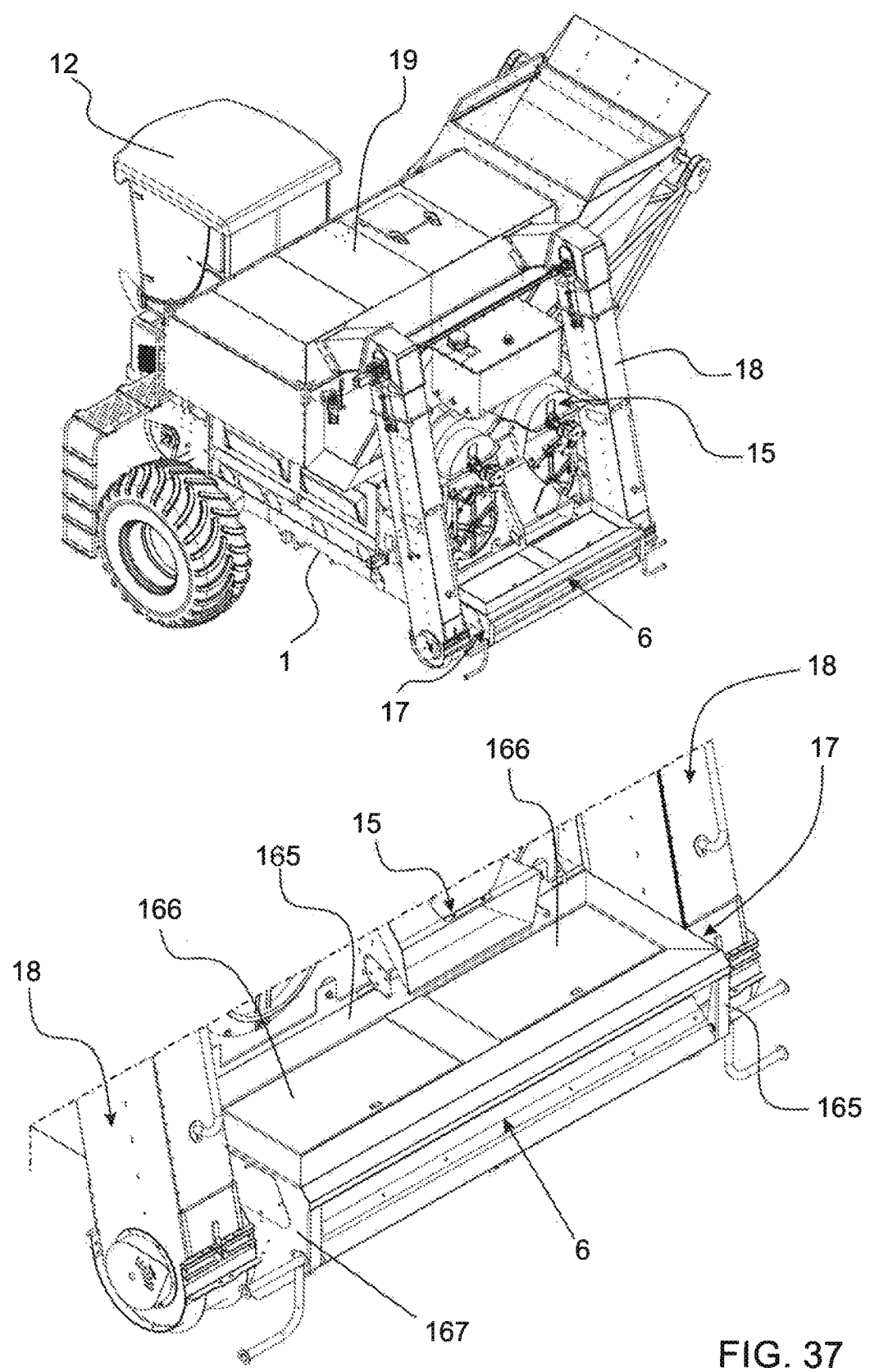
FIGS. 37 to 40 show perspective views, enlarged details in perspective, and also cut views, highlighting the collecting gutter for clean grain.
Figure 38:
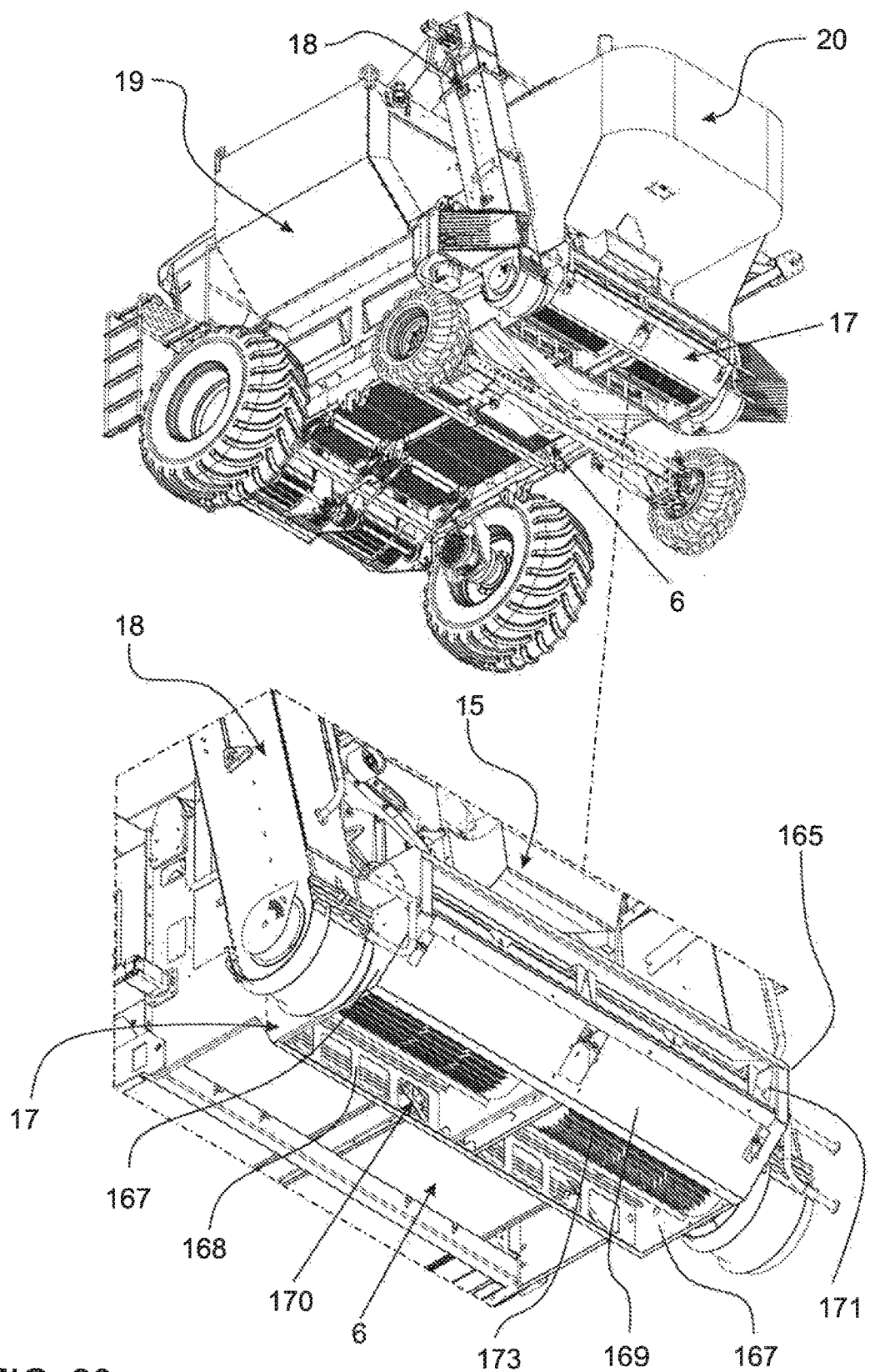
Figure 39:
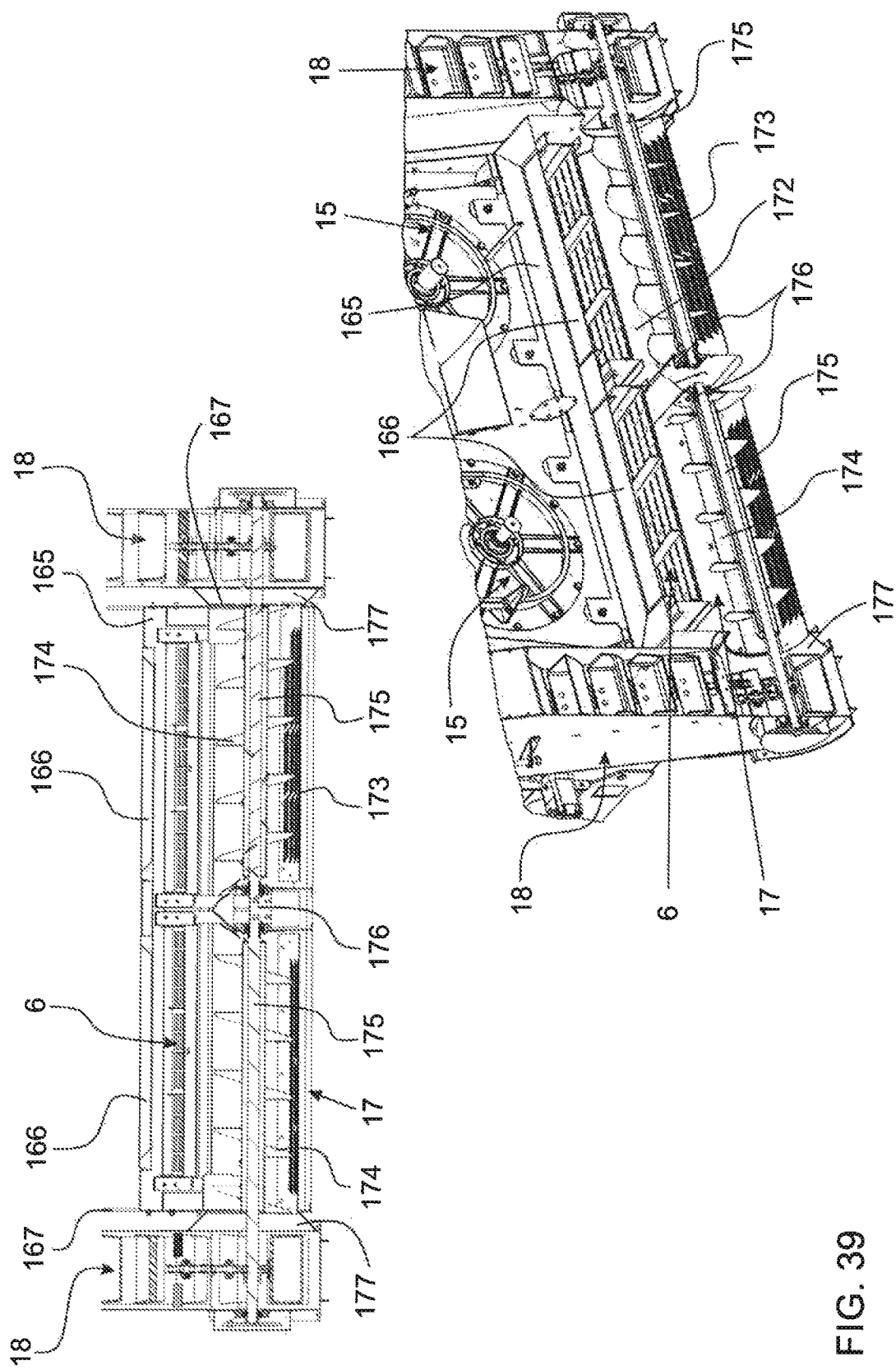
Figure 40:
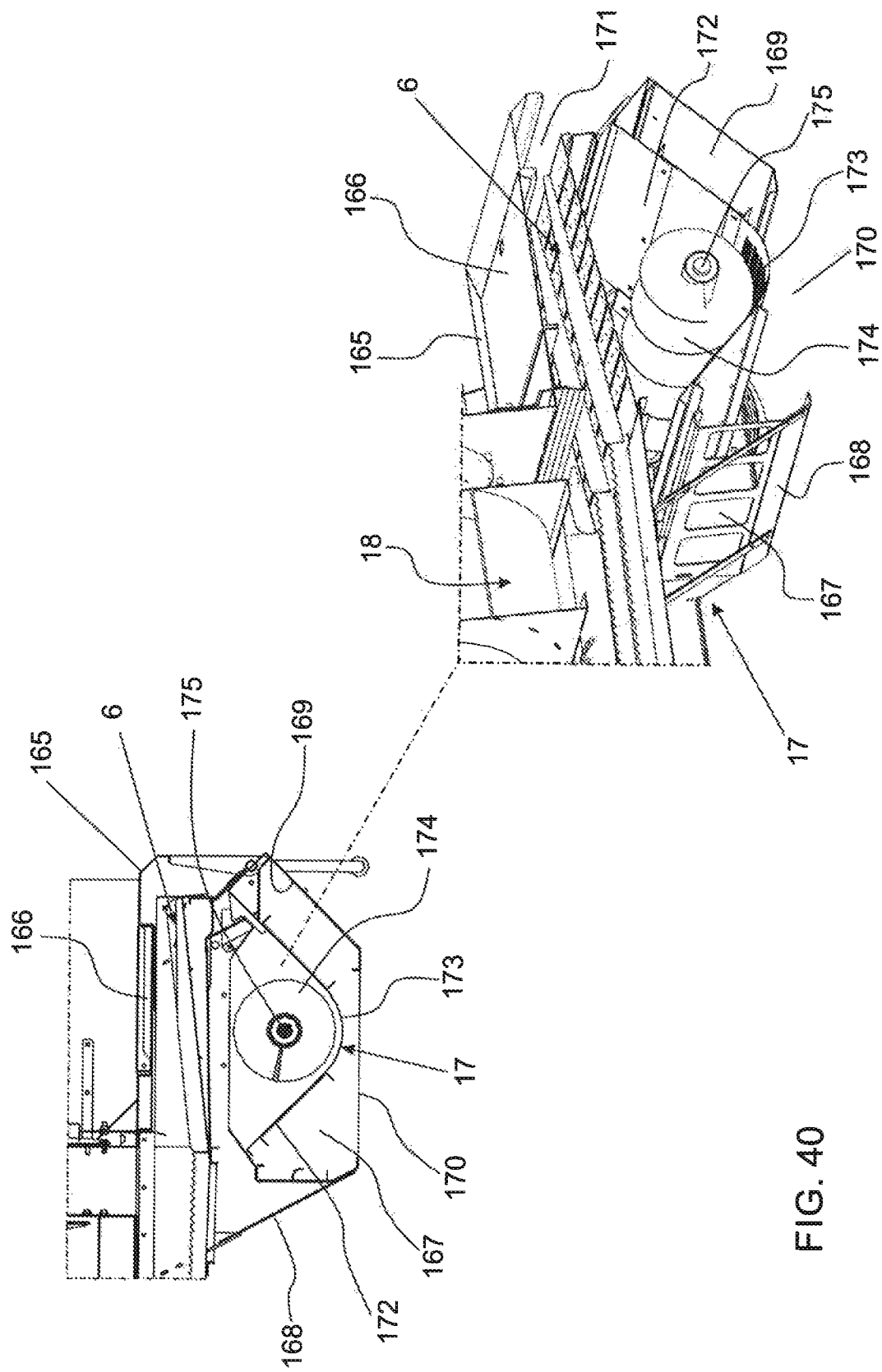

FIGS. 34, 35 and 36 illustrate one of the impeller sets for the outlet of residues (16), comprising an elbow-shaped duct complement (157) with an edge coupled to the outlet duct (152), while the other edge is turned to face behind the machine and its outlet provided with a stick curtain (158) to facilitate the quick expansion of the air flow. Consequently, this also facilitates the exit of residues which are impelled by a rotating set assembled inside the elbow-shaped duct complement (157). The rotating set is formed by a vertical axis (159) having multiple helices (160) with sharpened paddles, which, along with throwing residues outside, also crushes them. The edges of the vertical axis (159) are supported inside lower (161) and upper (162) boxes and, in the upper box, the axis is coupled at a 90° transmission (163) to a corresponding hydraulic engine (164).

FIGS. 37 to 40 show in detail the gutter for collection of clean grain (17), which is positioned crosswise underneath the final path of the vibrating screen (6), where the gutter receives the practically clean grain passing through the vibrating screen.

The collecting gutter (17) has a structure (165) integrated with the ventilation box (15). The structure (165) has an upper horizontal plane with inspection caps (166) located above the vibrating screen, and also has various closures, comprising two side plates (167), a front rugged closure (168) and a rear plate closure (169). In between the rear plate closure and the front closure there is a wide crosswise opening forming a lower outlet (170) for earth and other particles, the lower outlet extending the length of the collecting gutter (17). The collecting gutter also has an upper outlet opening (171) located between the upper plane with inspection caps (166) and the rear plate closure (169), the upper outlet opening (171) aligned with the end of the vibrating screen (6), forming an outlet for discharged materials, especially leaves and branches, which are then directly dispensed to the ground.

Among the front rugged closures (168) and rear plate closures (169) is assembled a V-shaped gutter (172) having a rounded vertex formed by a screen path (173) for the outlet of sand and other smaller particles and the retention of fully clean grains. Inside the V-shaped gutter (172), a helical transporter (174) is assembled in two inverse segments, each having an axis (175) and both intermediately interconnected by bearings and intermediate coupling (176). The opposed edges of the axes are supported inside the lower edges of the cup elevators (18), and the lower edges of the cup elevators are interconnected to the V-shaped gutter by means of transition nozzles (177). Thus, all clean grain is taken by the helical transporter (174) to the cup elevators (18), while particles smaller than grains, such as sand, earth and others, pass through the screen path (173) and are directly dispensed to the ground.

Figure 41:
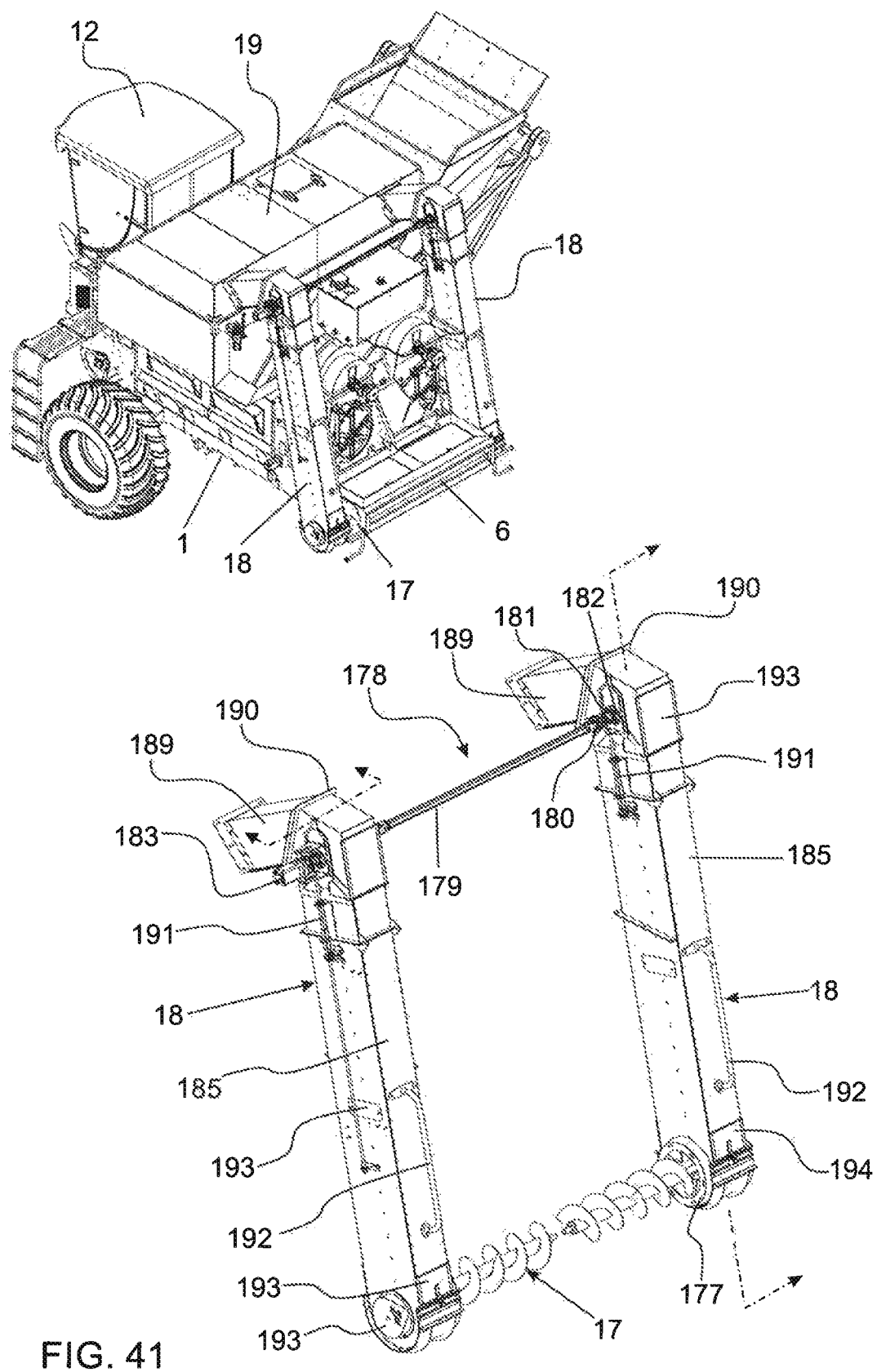
FIGS. 41 to 43 show perspective views and cut views, highlighting the details of the cup elevator.
Figure 42:
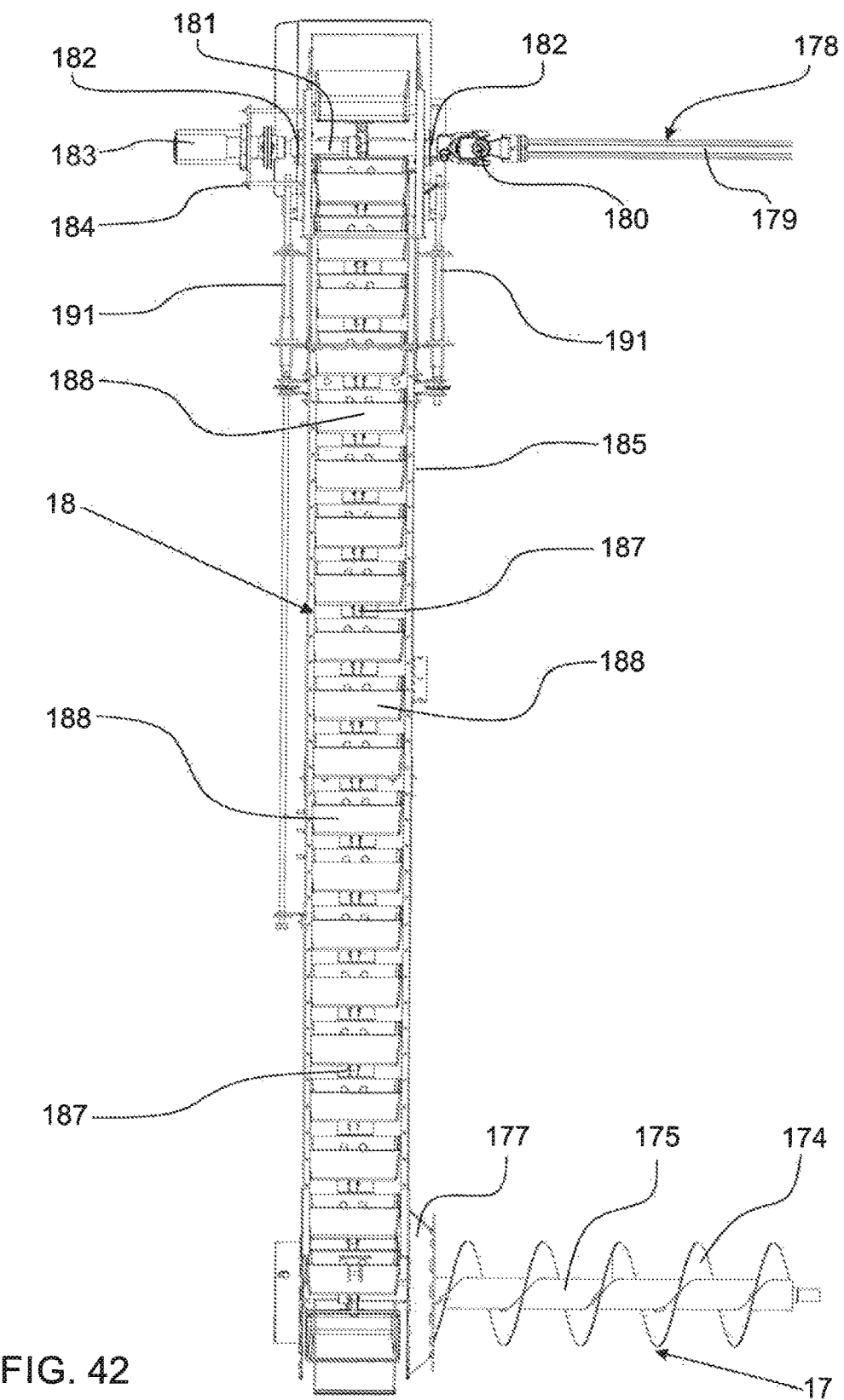
Figure 43:
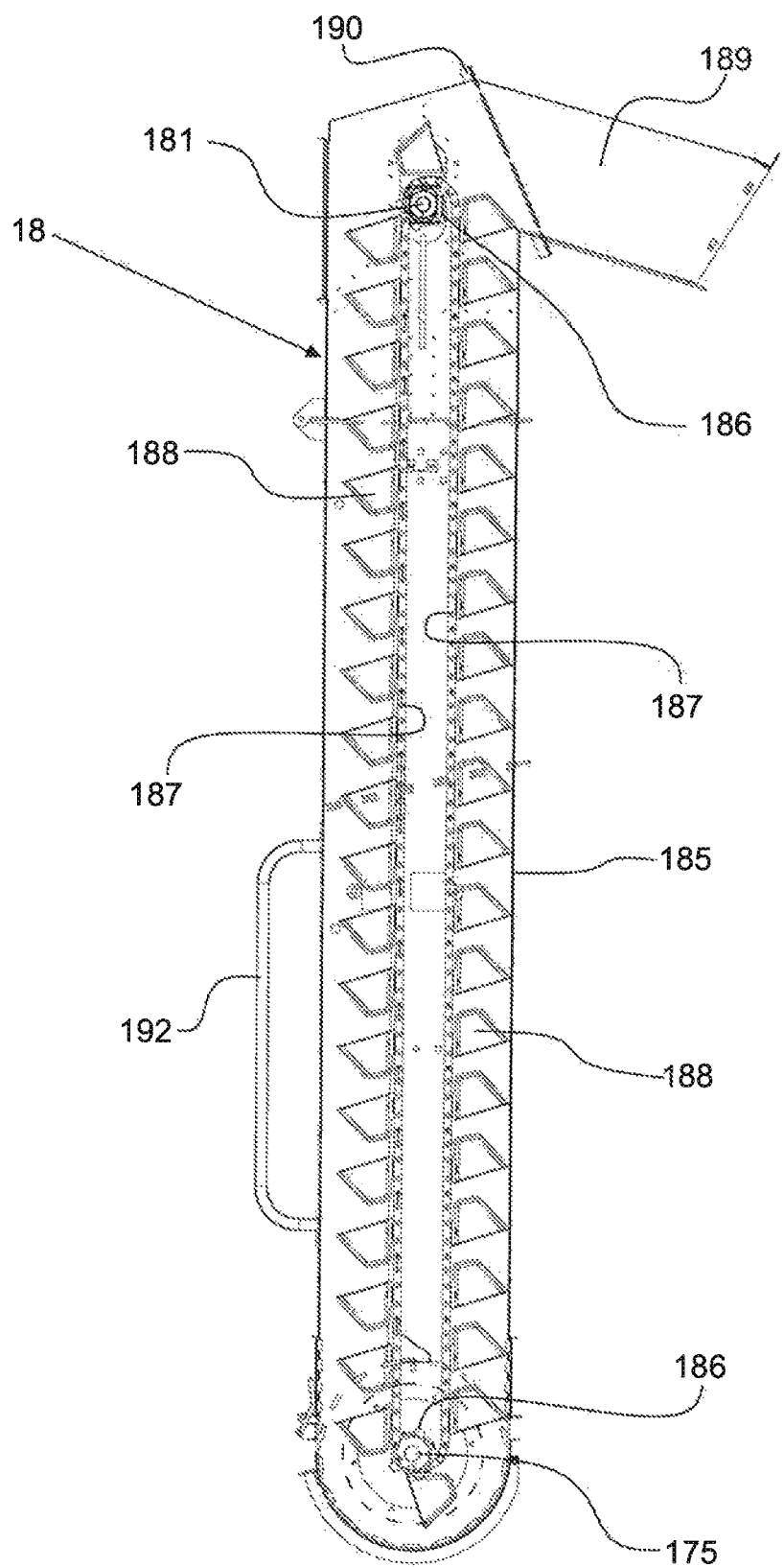

FIGS. 41 to 43 illustrate the details of the cup elevators (18), there being one cup elevator on each side of the machine, with both cup elevators synchronized by a single activation set (178). The activation set is comprised of an intermediate horizontal axis (179), each edge of the axis having a universal joint (180), after which are located axis edges (181), which pass through and have bearings (182) on the upper edges of each elevator (18). The upper left terminal axis is connected to a hydraulic engine (183) via a corresponding support (184) adjustably fixed to one of the plate bodies in the form of ducts, comprising sloped tubes (185). The lower edges of the ducts are rounded and identically pierced through the axes (175) of the helical transporter (174) of the collecting gutter (17).

On the upper and lower end of each cup elevator (18), the axes of the helical transporter (175) and the edges of axes of the intermediate axis (181) have gearings (186), interconnected by a chain (187) having a set of transporting cups (188) traveling along the duct (185), the transporting cups collecting clean grain at the lower rounded end of the duct and displacing it to the upper part of the duct (185). The upper part of the duct is fixed at one edge and connected to a downward sloping projecting path (189) leading to the inner part of the dumper (19), and located on the opposite side of the upper part of the duct of the cup elevator (18) is an adjustment trim (190), so that the projecting path (189) can be moved with the dumper (19) during its unloading (dumping), and, when unloading is completed, the projecting path returns and is once again aligned with the corresponding upper part of the duct of the elevator (18). On the external sides of the duct (185) are stretchers (191) to regulate the tension of the chains (187) and access caps (193), each duct also having a handle (192) on its rear facing side.

Figure 44:
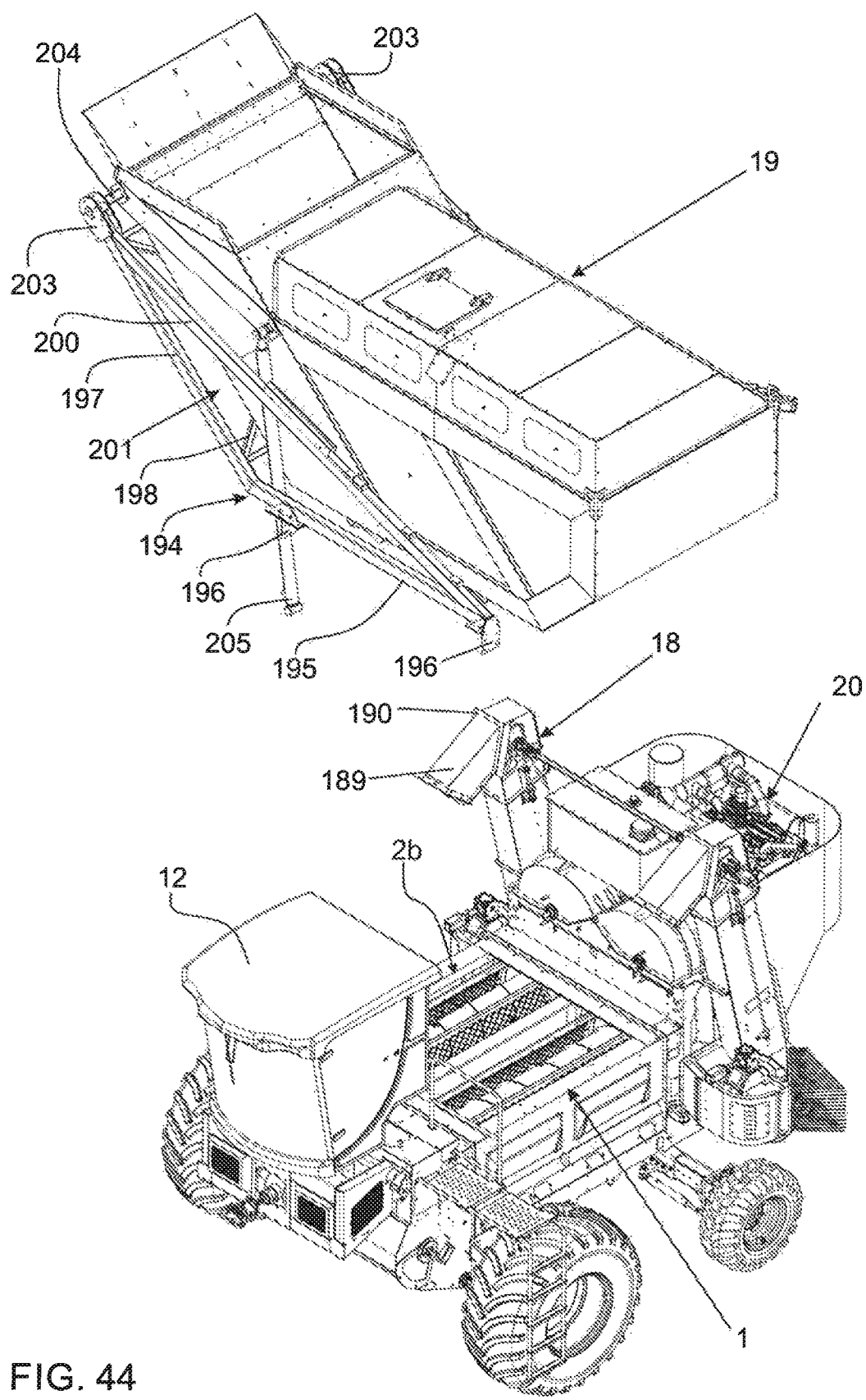
FIGS. 44 to 47 are exploded perspective views from different angles, highlighting the details of the dump truck.
Figure 45:
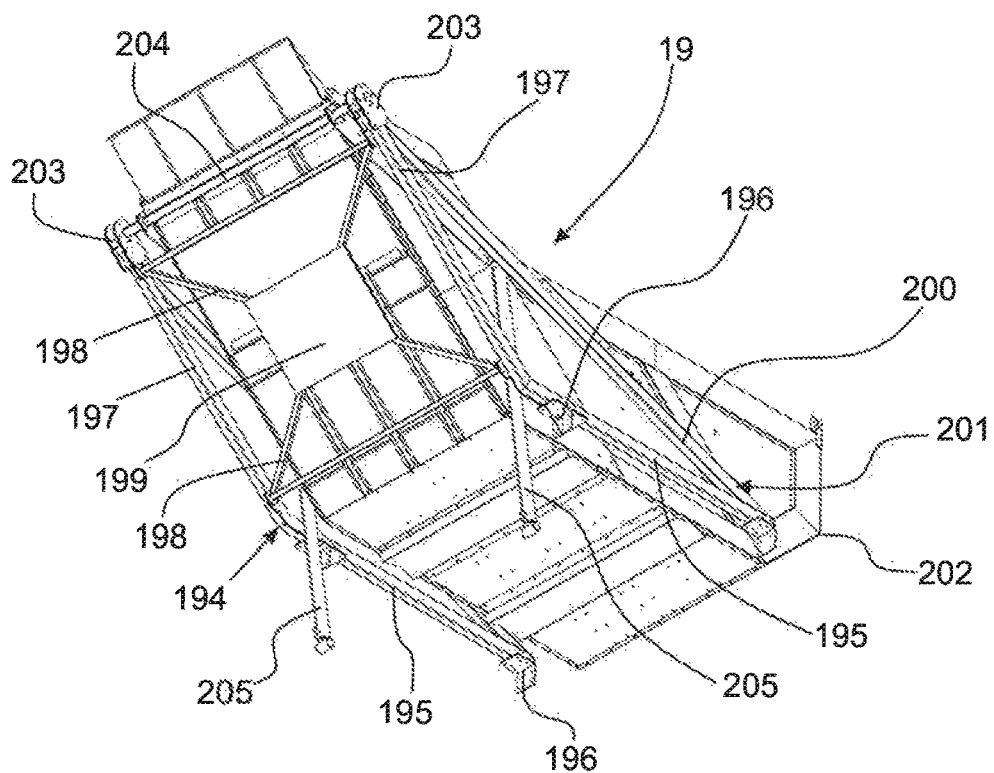
Figure 45:
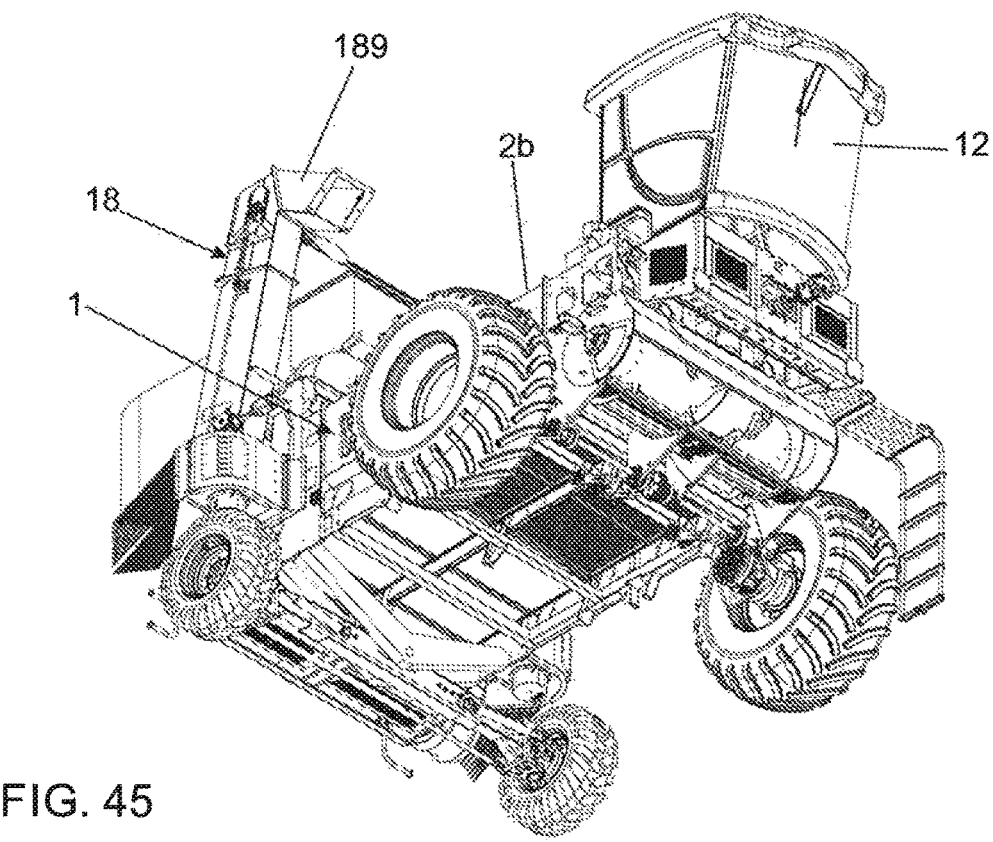

FIGS. 44 and 45 illustrate in detail the dumper (19), comprised of a fixed support structure (194), formed by two parallel arms (195) extending crosswise over the limits of the upper assembly plane (2b) of the chassis (1), at which they are fixed by corners (196). On the same side, both parallel arms (195) are further extended and project outwards and upwards, forming two equal and parallel sloping columns (197) interconnected by cross-shaped reinforcements (198) and a central plate (199), the upper edges of the sloping columns (197) structurally interconnected to the corresponding edges of the parallel arms (195) by diagonal tubes (200), forming a triangular structure (201) on each side, between which is located the dumper (202), which is also settled crosswise over the chassis (1).

The upper edges of the sloping columns (197) are connected to supports (203) configuring bearing points for an axis (204) where the upper right edge of the dumper (202) is hinged, with the internal volume of the dumper being defined by the fixed support structure (194).

The dumper (202) tilts itself around the axis (204) and, for that purpose, at the first third towards the axis and the upper side edges of the dumper (202) are hinged edges of hydraulic cylinders (205), with one on each side. The lower edges of the hydraulic cylinders are identically hinged and fixed to the lower side edges of the chassis (1), giving support when the hydraulic cylinders (205) are extended to activate the dumper (202), so that the sideways tilting of the dumper is sufficient for its unloading.

Figure 46:
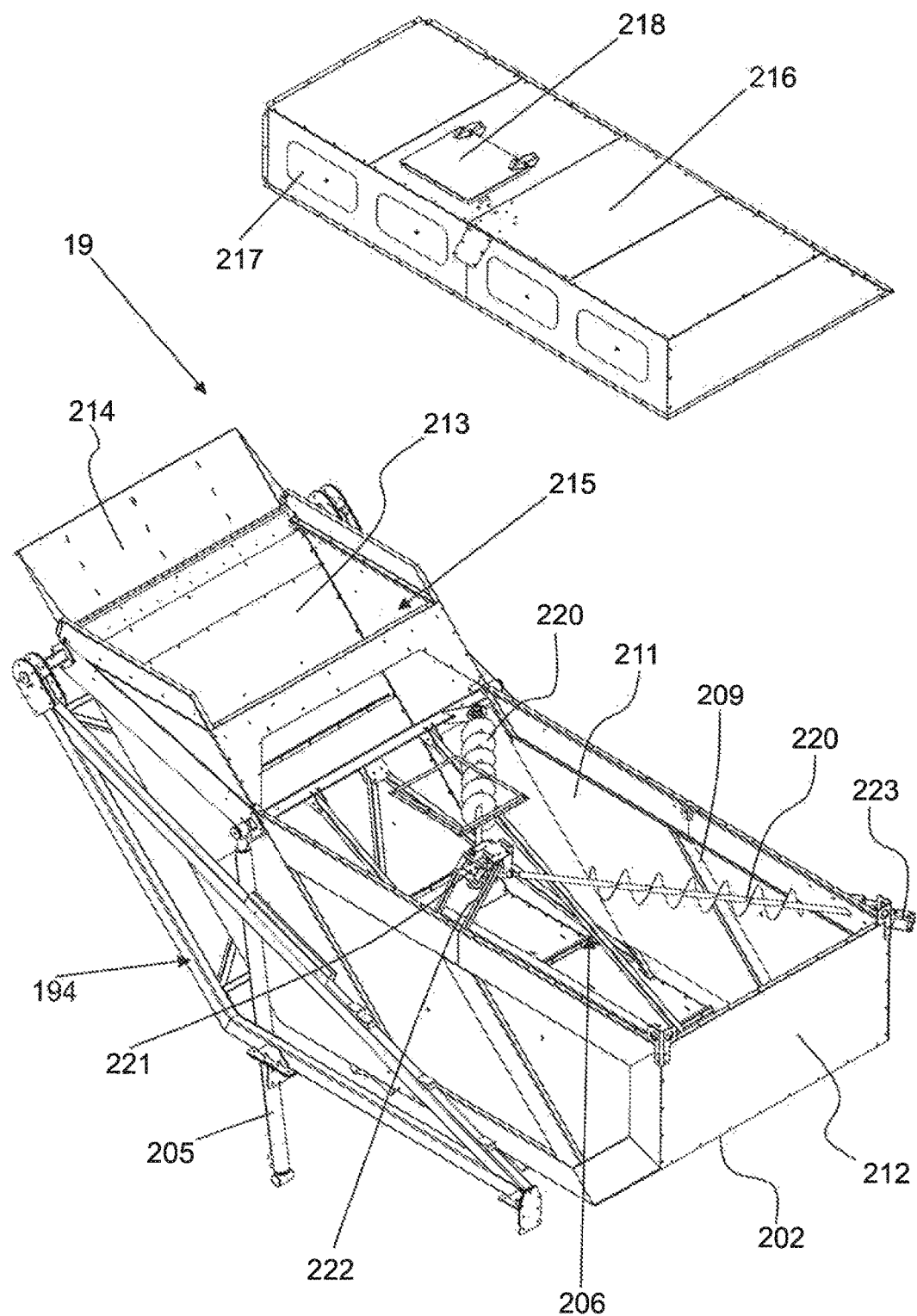
Figure 47:
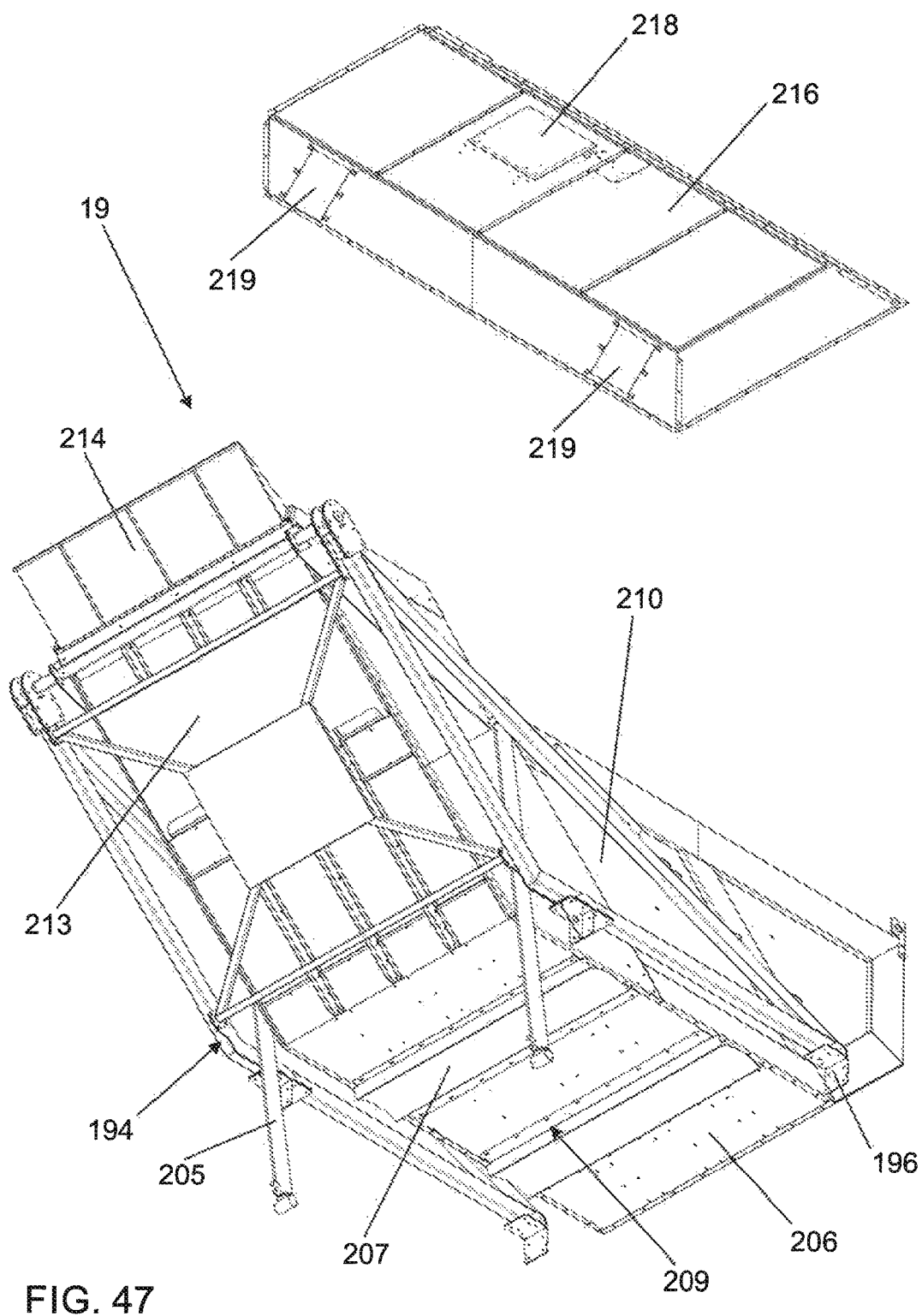

Further details of the dumper (202) are shown in FIGS. 46 and 47, the dumper comprising a flat-bottomed compartment (206) having wavy parts (207), the bottom of the dumper integrated with a structure (209) having plate closings defining the front (210), rear (211), left side (212) and sloped right side (213) walls. The sloped right side walls follow the slope of the fixed structure (194), the right side walls having a hinged ramp (214) located above the axis (204), allowing for the flow of the material, the upper latter part of the side walls having a wide unloading nozzle (215). The rest of the upper part of the dumper (202) has a closure (216) with multiple front screened windows (217) and an upper inspection hatch (218), and also includes two side openings (219) facing the rear end of the machine for coupling (see FIGS. 44 and 45) to the downward sloping projecting paths (189) of the cup elevators (18).

Below the closure (216), on the same horizontal plane as the upper edge of the dumper (202), is diagonally located two spreading screws (220), each having an edge interconnected to each other by a gearbox (221) and a corresponding support (222) intermediately assembled to the upper edge of the front wall (210), the other edge of the spreading screws having bearings located on the corresponding rear right and rear left corners of the dumper (202), the left bearing receiving a hydraulic engine (223), so that the rotation of the screws (220) uniformly distributes unloaded grain through the cup elevators (18) attached to the dumper (202).

Figure 48:
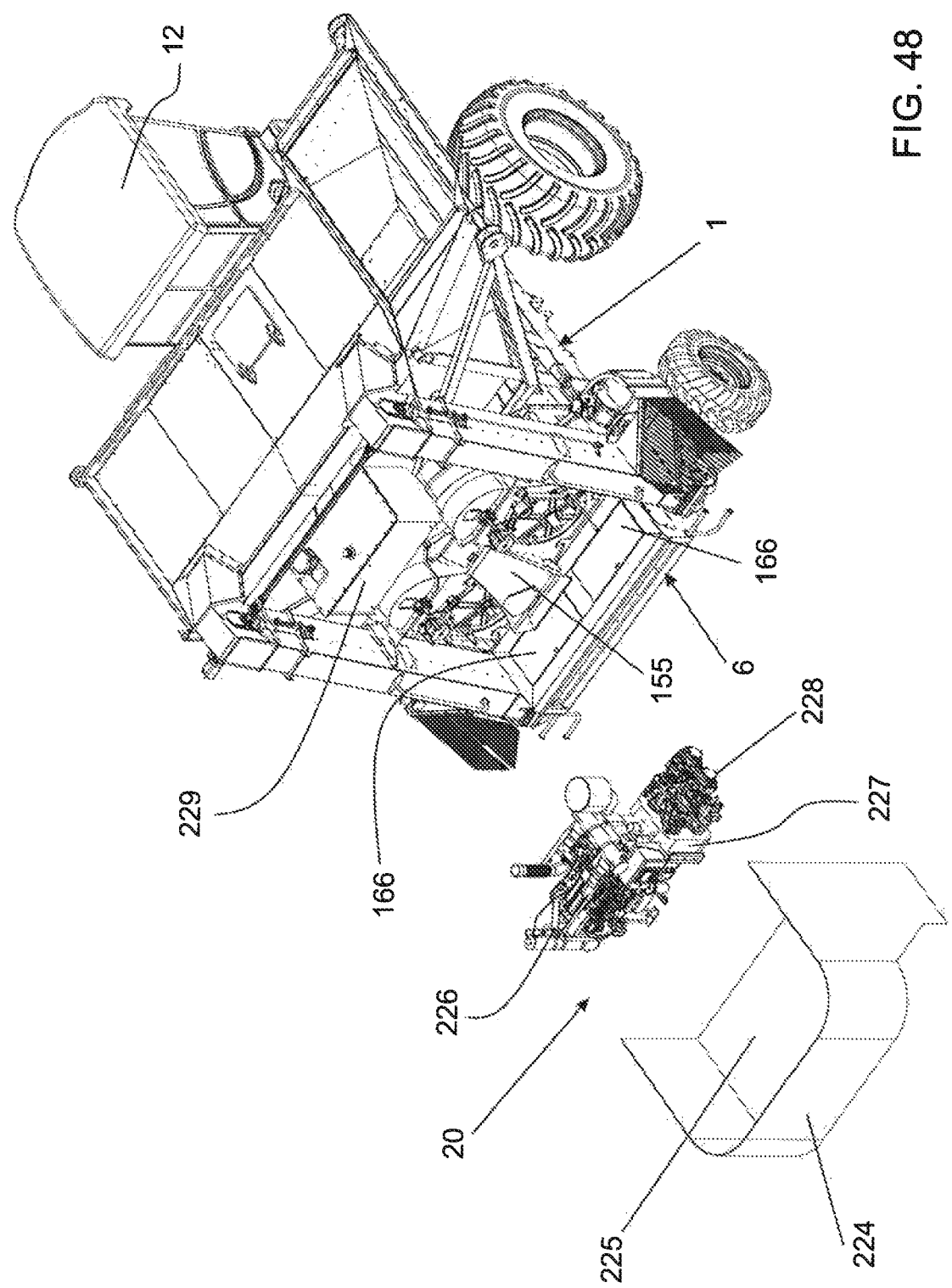
FIGS. 48 and 49 show partially exploded perspective views highlighting the motor power set.
Figure 49:
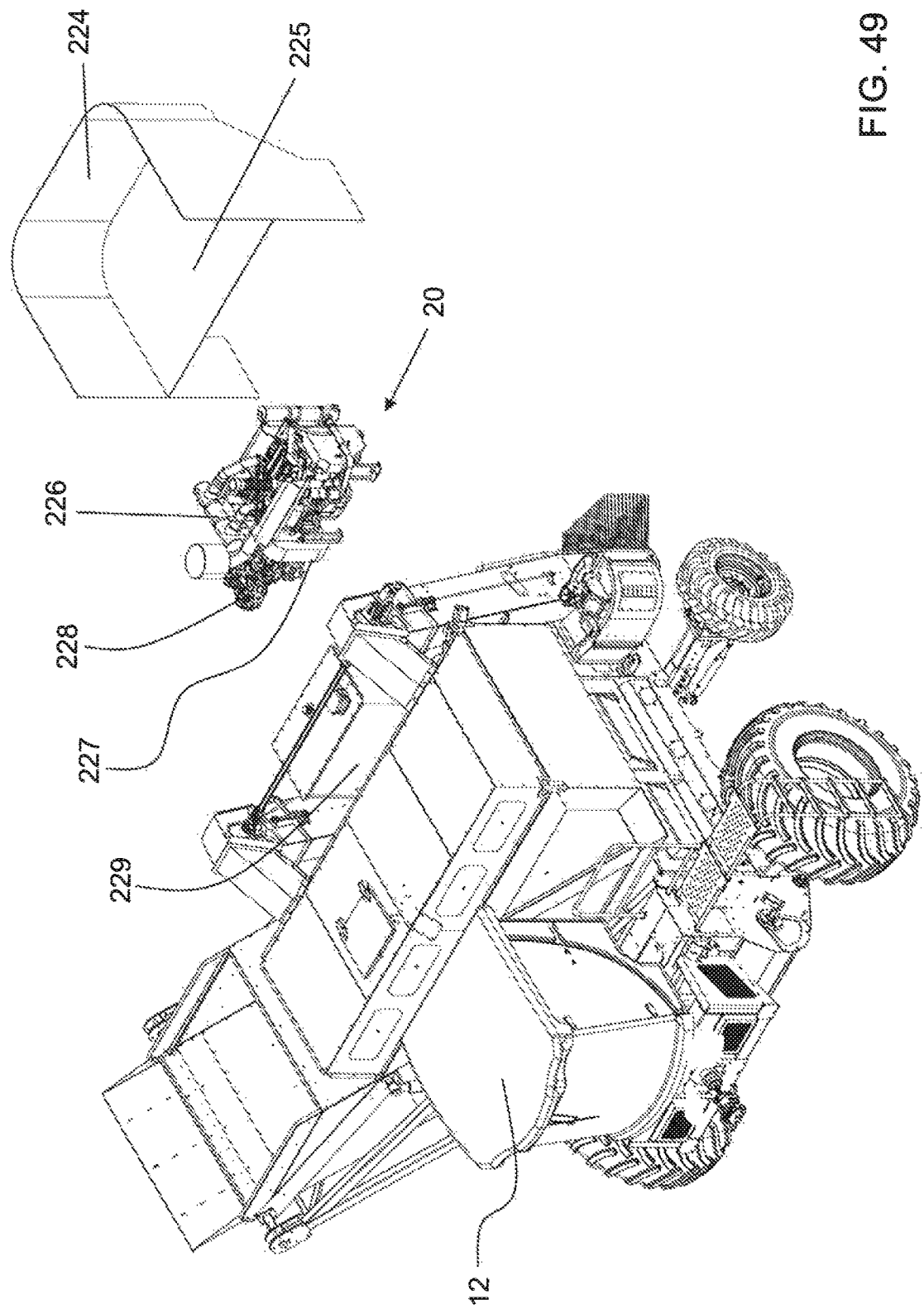

The motor power set (20) is shown by FIGS. 48 and 49, comprising a box-shaped structural complement formed by an enclosing protective housing (224) having, positioned internally and at mid-height, a horizontal base (225), the housing and base both comprising plates, and forming a set fixed at the rear part of the machine above the inspection caps (166) of the vibrating screen (6). The horizontal base (225) is also positioned above the intermediate residue outlet (155), with a crosswise combustion engine (226) fixed over the base, the combustion engine preferably having a diesel cycle. The outlet axis of the combustion engine is connected to a gearbox (227) having four outlet axes coupled to hydraulic pumps (228), all of which are interconnected by hoses (not shown) to a hydraulic reservoir (229), providing for other hoses to be interconnected to the engines and hydraulic cylinders at the pump outlets, with corresponding return hoses (not shown) also leading to the hydraulic reservoir (229).

The entire hydraulic system of hoses passes through a hub of controlled valves which are remotely controlled inside the cockpit (12), the cockpit also having other known controls, not only inherent to the vehicle's drivability, but also to control the engine and other parts of the motor vehicle and the connected implements.

Figure 50:
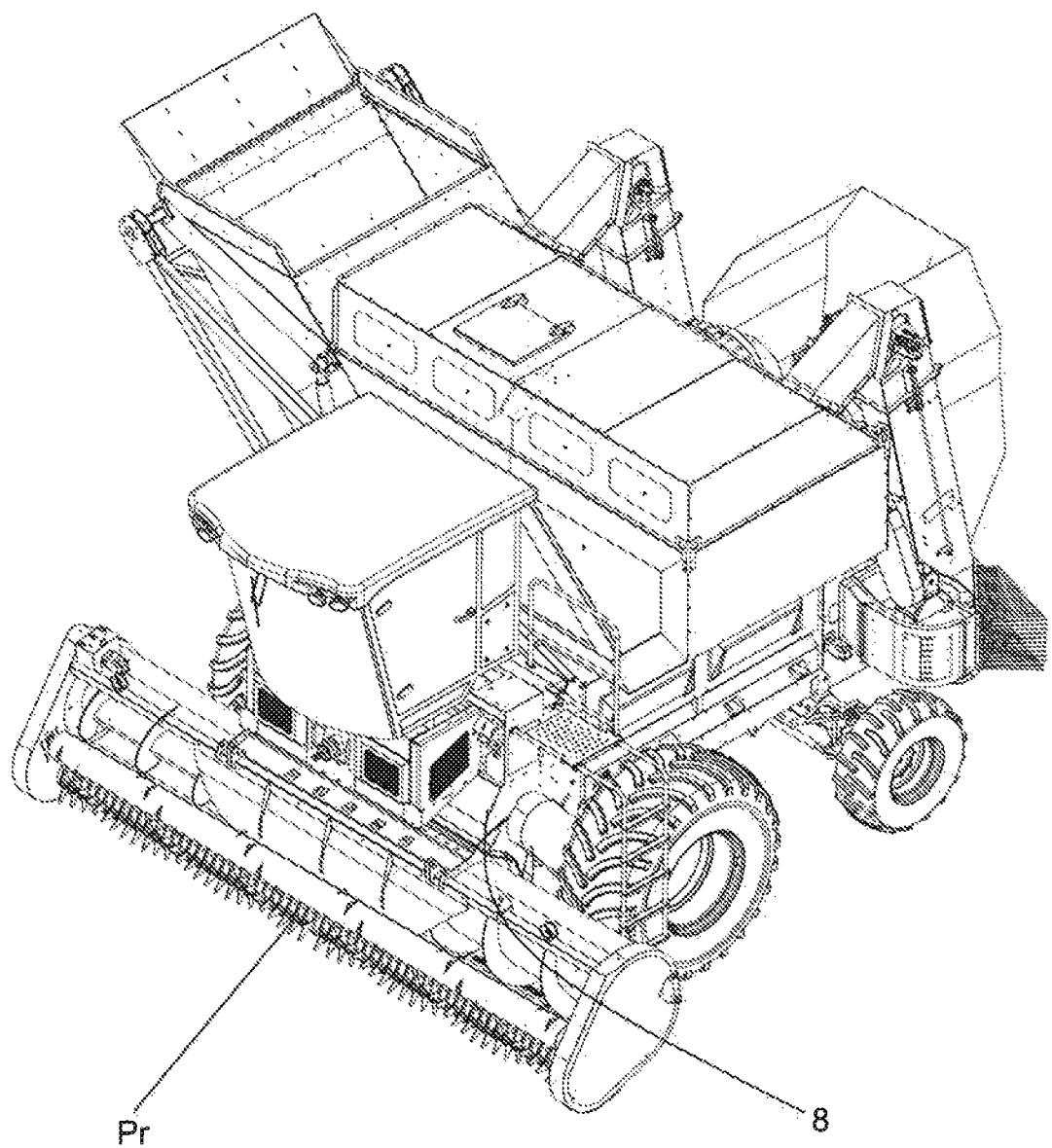
FIGS. 50 and 51 show perspective views of an example of the motor vehicle coupled to different agricultural implements.
Figure 51:
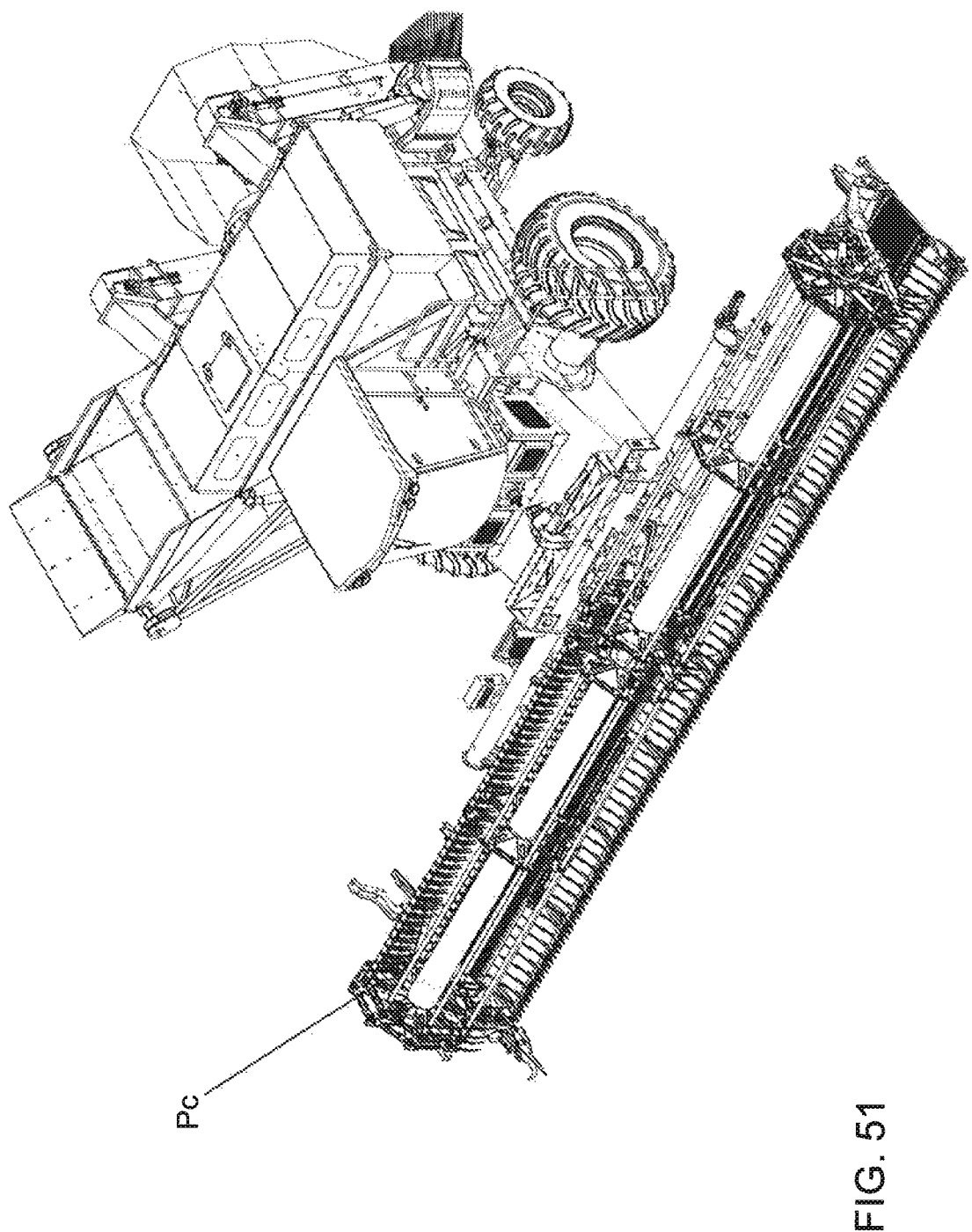

As illustrated in FIGS. 50 and 51, the front section of the motor vehicle may have a variety of embodiments to adapt it to receive different agricultural implements. In the example show in FIG. 50, the motor vehicle has a working front section which is a collecting platform (Pr), i.e. an implement especially created to collect different grain and cereal crops that are previously harvested and bundled up in lines. This implement collects the plants and guides them to the first rotating set, the concentrating guiding roller (8), the plants passing through the inlet opening (9) of the concentrating guiding roller.

A similar situation is shown with other implements, a second example of which is illustrated by FIG. 51 which shows a cutting platform (Pc) attached to the front section of the motor vehicle, the cutting platform simultaneously cutting the plants (soybeans, beans and/or other grains) and collecting and transporting them to the first rotating set, the concentrating guiding roller (8).

Figure 52:
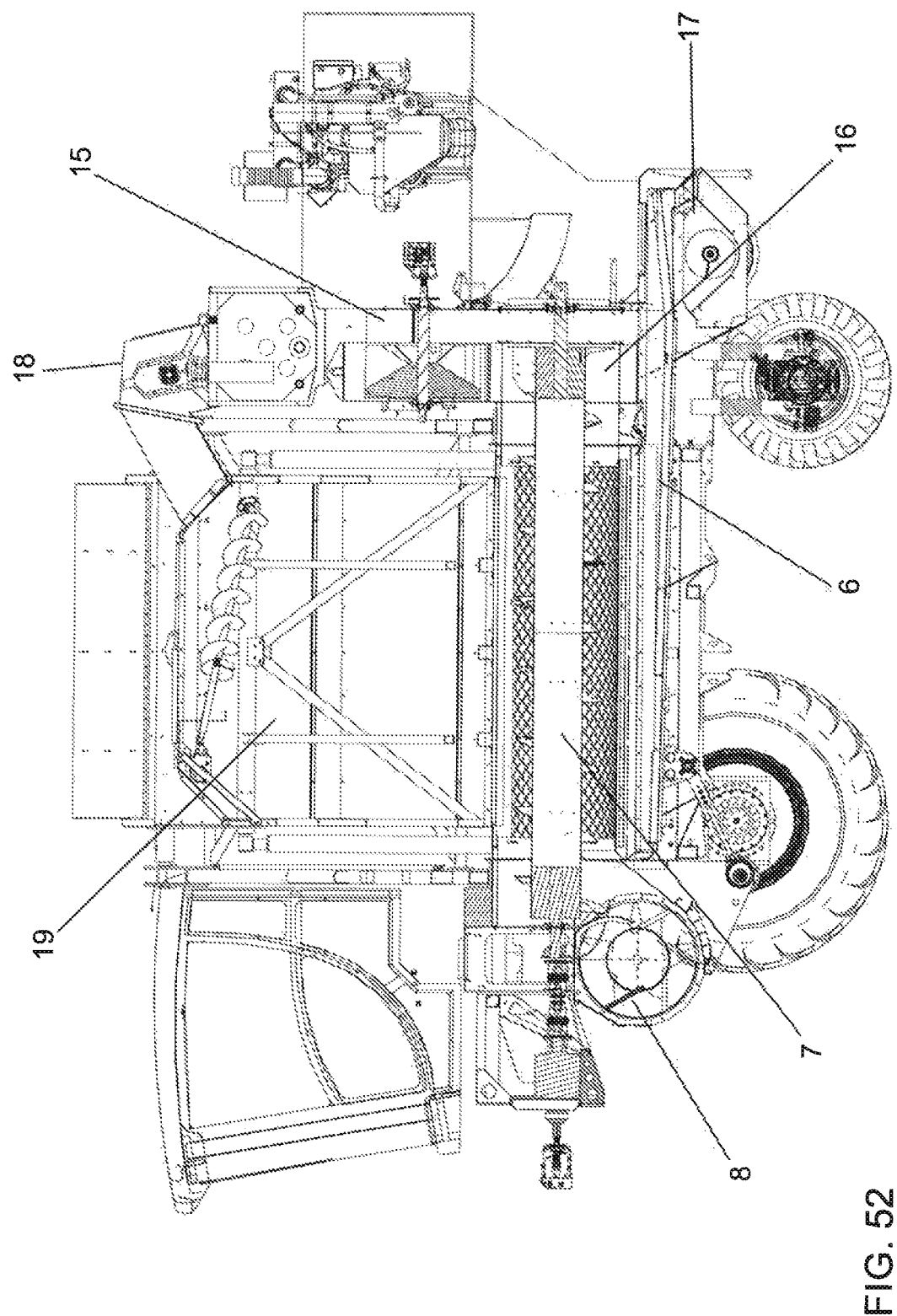
FIG. 52 shows a lengthwise cut view of the agricultural motor vehicle.

As shown by FIG. 52 all the material entering the machine via the concentrating guiding roller (8) is processed and initially passes inside the rotating cleaning set (7), where the screens have a sufficient mesh size to allow the passage of grain and other smaller material, which then falls directly over the vibrating screen (6), while larger residues are retained and displaced rearwards for discharge through the impeller sets for residue outlets (16). Grains falling over the vibrating screen (6) pass through another cleaning stage where particles smaller than grains, such as earth and sand, pass through the screen mesh and fall by gravity over the soil, while the grains continue their path rearwards and go through one more cleaning stage as performed by the ventilation box (15), at which point other light residues are aspirated and thrown outside the machine, while the grains arrive at the end of the vibrating screen (6) where the provided mesh allows them to fall inside the collecting gutter for clean grain (17). At this point, the flow of material is equally divided to both sides of the machine, where the cup elevators (18) displace the grains to inside of the dumper (19).

The invention claimed is:

1. An agricultural motor vehicle, comprising:
   a monoblock chassis (1), forming a rectangular box having a front section, a rear section; a front panel (21), a rear panel (22), two side panels (24), and a central intermediate panel (23) defining two intermediate spaces (2a); and having upper edges folded crosswise towards an inner side, forming complementary profiles (25) configuring an upper assembly plane (2b) and a lower assembly plane (2c); the chassis supported over four traction wheels, with a front wheel set having two larger independent front wheels (3) and a rear wheel set having two smaller rear wheels (4), the rear wheels having a corresponding axis (5);
   a vibrating screen (6) located at an internal lower side of the chassis, forming a platform, the vibrating screen extending along the entire lower assembly plane to an edge of the chassis (1);
   a first double rotating cleaning set (7), assembled above the vibrating screen, comprising two lengthwise tunnels extending along an entire length of the vibrating screen (6);
   a second rotating set forming a concentrating guiding roller (8), assembled crosswise upon the front section of the chassis (1), the guiding roller comprising a crosswise tunnel having a front inlet opening (9) and a rear outlet opening (10), wherein the rear outlet opening is connected to the rotating cleaning set (7);
   a hydraulic activation and transmission set (11), assembled above the concentrating guiding roller (8) and coupled for activation of the rotating cleaning set (7); comprising a support platform for a cockpit (12), the cockpit having a side door, with access to the cockpit provided by a passageway (13) and a ladder (14) located over and above the front left wheel;
   a ventilation box (15) for expelling of clean residues, assembled at a rear end of the rotating cleaning set (7);
   two impeller sets for an outlet of residues (16), one impeller set assembled along each lower side edge of the ventilation box (15);
   a collecting gutter for clean grain (17) assembled at a rear end of the vibrating screen (6), the collecting gutter extending crosswise along the entire rear length of the screen;
   two cup elevators (18), each cup elevator located next to and linked to a side edge of the collecting gutter for clean grain (17), the cup elevators slightly forwardly sloped and having upper edges leading to an inside of a dumper (19) for grain storage; the dumper located crosswise over and above the chassis (1); and
   a motor power set (20) assembled on a rear side of the ventilation box (15).

2. The agricultural motor vehicle of claim 1, wherein the front panel (21), the rear panel (22), the two side panels (24), and the central intermediate panel (23) on the lower side of the chassis project onto and combine with plate profiles, forming side stringers (26), a front crossbeam (27), a rear crossbeam (28) and an intermediate crossbeam (29); the crossbeams connected to a complementary structure (30) located along internal faces of the side panels (24), and;
   wherein, the two side panels further comprising:
      two casings (31) located lengthwise, one on each side, forming between them and the front (27), rear (28) and intermediate crossbeams (29), the lower assembly plane (2c) upon which sits the vibrating screen (6), and above the front crossbeam (27) and the rear crossbeam (28), the front panel (21) and the rear panel (22) further comprise multiple rectangular openings (32) extending throughout a width of the chassis (1) and combining with multiple supports (33) (34) (35) located over the side stringers (26) and front (27) and intermediate crossbeams (29), and;
   wherein above the rectangular openings (32), the front panel (21) and the rear panel (22) each have two side by side identical circular openings (36), each having a circular inner collar (37) extending towards an inner section of the chassis, forming an assembly fitting for the double cleaning rotating set (7).

3. The agricultural motor vehicle of claim 1, wherein the front wheel set further comprising a folded U-shaped plate support (40) for each independent front wheel (3), each plate support having two arms (41), wherein upper edges of the arms are fixed to the corresponding side stringer (26) of the chassis (1), and lower edges of the arms are interconnected by a vertical plate (42) having a hollow (43) housing a hub and respective axis (44), the hub coupled from an internal side to a hydraulic engine (45) and from an external side coupled to an arc (46) of the wheel (47).

4. The agricultural motor vehicle of claim 1, wherein the rear wheel set further comprising:
   a central rectangular tube (48) forming the axis (5) between each smaller rear wheel (4), the axis having a central hinging point (49) for a central hollow vertex (50) of a pair of V-shaped rocker arms (51), the rocker arms having upper edges fixed under corresponding parts of the chassis (1);
   two tips received telescopically by the central rectangular tube (48), the tips further comprising rectangular tubes (52) adjustably fixed to one another by rows of holes and screws (53), wherein a distal end of each tip (52) receives a vertical rectangular assembly plate (54) and a corresponding square reinforcement (55), upon which a fork (57) is fixed by bolts (56), the edges of the fork comprising hinged fixation points (58) for corresponding parts of a hydraulic engine (59) directly coupled to an arc (60) of the wheel (61);
   wherein the wheel set further comprises a stabilizing bar (62) connecting the rear wheels, having edges forming pivots (63) over rear supports (64) fixed to rear parts of a body integrating the hydraulic engine (59), and front parts of the body having supports (65) allowing pivoting (66) of edges of corresponding hydraulic cylinders (67), whose opposed edges are equally pivoted (68) on front supports (69) adjustably fixed to the rows of holes and screws (53).

5. The agricultural motor vehicle of claim 1, wherein the vibrating screen (6) further comprising a double screen comprising two identical side by side units, each unit comprising a plane defined by a set of double internal screens having different types of mesh (70) (71) and multiple internal lengthwise rulers (72), wherein the rulers located closest to centre double screen are shorter in length, all rulers located on a horizontal slope, and the internal screens located within a frame, the frame further comprising:
   two side walls (73) and a front wall (74), wherein underneath the screens and rulers (72), the walls (73) (74) receive lower lengthwise (75) and crosswise (76) structural complements, forming a lower structural frame (77) having numerous blade springs (78) projecting downwardly sloping and distributed solely or in pairs, the blade springs having upper edges fixed to upper supports (79) and lower edges fixed to the supports (34)

integrated with the chassis (1), and the lower structural frame further coupled to the chassis by a vibrating set (80).

6. The agricultural motor vehicle of claim 5, wherein the vibrating set (80) is assembled under and next to a front edge of the vibrating screen (6), the vibrating set further comprising:
two parallel and crosswise tubes (81), fixed to vertical supports (82), upper edges of the vertical supports fixed to the side walls (73) of the vibrating screen (6), and the vertical supports having bearings (83) on each side on a lower edge, to which upper edges of an adjustable length connecting rod (84) is coupled, wherein each connecting rod has a lower edge connected to an eccentric bearing (85) located along a motor axis (86), the motor axis comprising:
two segments interconnected by a flange (87), each end of the segment having an end bearing (89), and a terminal end of the motor axis coupled to a hydraulic engine (88), wherein the end bearings (89) on an internal end of the motor axis are fixed at an end to an internal support (90), and at an external end to an external support (90*a*) integrated along a side at a lower part of the concentrating guiding roller (8).

7. The agricultural motor vehicle of claim 1, wherein a pushing set (91) for branches and leaves is assembled over and above the vibrating screen (6), the pushing set comprising a crosswise rotating axis (92), having multiple helices (93) distributed along a length of the axis to push material rearwards during cleaning, the axis assembled jointly having bearings on a right (94) and left end (95) fixed to corresponding sides of the chassis (1); wherein one edge of the axis is also coupled to a hydraulic engine (96).

8. The agricultural motor vehicle of claim 2, wherein the double rotating cleaning set (7) further comprising:
two identical units, assembled within the intermediate spaces (2*a*) adjacent to the intermediate panel (23) of the chassis (1), each unit comprising:
a bipartite (98*a*) (98*b*) cylindrical screen (97), having two semicircular parts framed (99) and located one against another forming an upper opening (100), with edges of the bipartite cylindrical screen (97) located inside the circular inner collar (37) of the chassis (1), forming a housing tunnel for a striking roller (101), the striking roller comprising:
a tubular body (102) with blind flanges (103), front axis tips (104) and rear axis tips (105), an edge of the axes front axis (104) having a coupling (106) for connection to the hydraulic activation and transmission set (11), and an edge of the rear axis tip (105) having a bearing (107) on a corresponding internal wall of the ventilation box (15), the bearing (107) preceded by a disc (108) having radial paddles (109) on a lower internal part of the ventilation box (15), the tubular body further comprising:
an external diameter provided with a helical dragger (110) having a plurality of radial and angled fingers (111), each finger having a radial support (112) and a clamp (113) adjustably fixed by bolts, nuts and washers (114) to the helical dagger (110).

9. The agricultural motor vehicle of claim 8, wherein the concentrating guiding roller (8) further comprising:
a box housing (115) running along an entire crosswise length of the chassis (1), the box housing comprising two portions, an upper parallelepipedal portion (116) and a lower cylindrical portion (117), the upper portion comprising:
internal walls (118) forming two compartments, a front compartment (119) and a rear (120) compartment, the rear compartment housing the couplings (106) of the striking rollers (101) and the front compartment receiving a part of the hydraulic set for activation and transmission (11), the lower cylindrical portion (117) further comprising:
two openings, an inlet opening (9) for entry of material and a rear outlet opening (10), wherein the rear outlet having conversion walls (121) along a bottom side, the conversion walls sloping upwardly and ending in two circular nozzles, a nozzle aligned to each tunnel of the rotating cleaning set (7), each nozzle preceded by a fixed comb (122) which aligns with the lower cylindrical portion (117), and a tubular roller (123) assembled preceding the fixed combs, the roller closed by blind flanges (124) and their respective edges for a left axis (125) and a right axis (126), wherein the left axis is coupled to a hydraulic engine (127), and both axes are borne on side walls forming the lower cylindrical portion (117), the tubular roller (123) also having external inverse helicoids (128) and radial fingers (129), throwing all material entering through the inlet opening (9) behind the tubular roller towards an inner side of the rotating cleaning set (7).

10. The agricultural motor vehicle of claim 9, wherein the hydraulic activation and transmission set (11) further comprising:
a parallelepipedal structure (130) having multiple plate-shaped (131) and screen-shaped (132) closures forming a box having an open a rear side and having fixing supports (133) located against a front face of the box housing for the concentrating guiding roller (115), the fixing supports including pins (134) for hinging agricultural implements to a front part of the motor vehicle, and wherein inside the parallelepipedal structure (130) is assembled a first T-shaped gearbox (135) is assembled, comprising:
a first inlet axis (136) projected to the front and coupled to a hydraulic engine (137), and
two outlet axes (138) identically coupled to side gearboxes at 90° (139), each side gearbox having an outlet axis with a cardan (140), coupled to a corresponding edge of the front axis (104) of a roller (101) of the cleaning set (7).

11. The agricultural motor vehicle of claim 1, wherein the ventilation box (15) further comprising:
a box having an aspiration nozzle (141) turned downwards located above and covering an entire width of the vibrating screen (6), the box internally divided by multiple flat and curved walls, comprising multiple chambers, the two first walls are located on a top end, creating two circular side by side ventilation chambers (142), below which are two circular dragging chambers (143), the ventilation chambers (142) housing turbines (144) and axes (145) with bearings (146) on front (147) and rear (148) walls,
wherein behind the rear walls, the axes (145) are coupled to hydraulic engines (149), and the dragging chambers (143) receiving the edges of the striking rollers (101) on the corresponding paths of the radial paddles (109); and wherein on each side of the vehicle, the upper ventilation chamber (142) and lower dragging chamber (143) have respective tangential outlets (150) and (151) connected to an outlet duct (152), the outlet duct curved and projected to an external side of the motor vehicle and integrated to a corresponding impeller set for the outlet of residues (16);

the box further comprising an intermediate wall (153) between the front (147) and rear (148) walls, the intermediate wall defining a third aspiration chamber (154), having a lower part comprising the aspiration nozzle (141) extending crosswise over the vibrating screen (6), the third aspiration chamber (154) also interlinked to the upper ventilation chambers (142), and having a rearward facing intermediate residue outlet (155) with an opening (156) located internally between the two turbines (144).

12. The agricultural motor vehicle of claim 1, wherein the impeller sets for the outlet of residues (16) further comprising:

an elbow-shaped duct complement (157) having an edge coupled to the outlet duct (152), and another edge turned rearwardly with an outlet covered by a stick curtain (158), and wherein a rotating set is assembled inside the elbow-shaped duct complement, the set comprising:

a vertical axis (159) having multiple helices (160) with sharpened paddles, an edge of the axis supported upon bearings inside lower (161) and upper (162) boxes, and wherein within the upper box, a 90° transmission (163) is coupled to a corresponding hydraulic engine (164).

13. The agricultural motor vehicle of claim 1, wherein the collecting gutter for clean grain (17) further comprising:

a structure (165) integrated with the ventilation box (15) and having an upper horizontal plane with inspection caps (166) located above the vibrating screen, and closures, comprising two side plates (167), a front rugged closure (168) and a rear plate closure (169), wherein between the rear plate closure and the front closure is a crosswise opening forming a lower outlet (170) for earth and other particles, the lower outlet extending along a length of the collecting gutter (17) having an upper outlet opening (171) between the upper plane with inspection caps (166) and the rear plate closure (169), the upper outlet opening (171) aligned with the end of the vibrating screen (6), the structure further comprising:

a V-shaped gutter (172) assembled between the front rugged closures (168) and rear plate closures (169), having a rounded vertex formed by a screen path (173) for the outlet of sand and particles and the retention of clean grains, wherein a helical transporter (174) is assembled inside the V-shaped gutter in two inverse segments, each segment having an axis (175) and the segments intermediately interconnected by a bearing and an intermediate coupling (176), while opposed edges of the axes have bearings inside the lower edges of the cup elevators.

14. The agricultural motor vehicle of claim 13, wherein both cup elevators (18) are synchronized by a single activation set (178), the activation set comprising:

an intermediate horizontal axis (179), each edge having a universal joint (180) after which are located axis edges (181), piercing and having bearings (182) at an upper edge of each elevator (18), wherein one axis is connected to a hydraulic engine (183) by a support (184) adjustably fixed to ducts (185), the ducts comprising sloped tubes (185) having lower rounded edges and pierced through the axes (175) of the helical transporter (174) of the collecting gutter;

gearings (186) interconnected by a chain (187) having a set of transporting cups (188), located on each side of a cup elevator (18) along the axes (175) and the edges of the axes (181) at an upper and lower end, the transporting cups moving along the duct (185) and at the lower rounded edge of the duct, collecting clean grains and displacing them upwardly to an upper part of the duct (185), fixed at one edge and connected to a downward sloping projecting path (189) leading to an inner part of the dumper (19), and on an opposite side of the upper part of the duct, having an adjustment trim (190), the duct having stretchers on an external side for regulating tension of the chains (187), handles (192) and access caps (193).

15. The agricultural motor vehicle of claim 14, wherein the dumper (19) further comprising:

a fixed support structure (194), comprising two parallel arms (195) extending crosswise over the upper assembly plane (2b) of the chassis and fixed by corners (196), and, on a same side at an end, both parallel arms (195) extend and project outwards and upwards as two equal parallel sloping columns (197) interconnected by cross-shaped reinforcements (198) and a central plate (199), upper edges of the sloping columns (197) structurally interconnected to corresponding edges of the parallel arms (195) by diagonal tubes (200), forming a triangular structure (201) on each side, between which is located the dumper (202) settled crosswise over the chassis (1), the sloping columns further comprising:

supports (203) configuring bearing points for an axis (204) at upper edges, upon which the upper right edge of the dumper (202) is hinged, the dumper (202) having on upper side edges hinged edges of side by side hydraulic cylinders (205), having lower edges fixed to lower side edges of the chassis (1);

a flat-bottomed compartment (206) having wavy parts (207), the bottom of the dumper integrated with a structure (209) having plate closings defining the front (210), rear (211), left side (212) and sloped right side (213) walls, the sloped right side walls follow the slope of the fixed structure (194), the right side walls having a hinged ramp (214) located above the axis (204), allowing for the flow of the material, the upper latter part of the side walls having a wide unloading nozzle (215), while the remaining upper part of the dumper (202) having a closure (216) with multiple front screened windows (217) and an upper inspection hatch (218), and also includes two side openings (219) facing the rear end of the machine for coupling to the downward sloping projecting paths (189) of the cup elevators (18);

wherein below the closure (216), on the same horizontal plane as the upper edge of the dumper (202), are two spreading screws (220) diagonally located, each screw having an edge interconnected to one other by a gearbox (221) and a corresponding support (222) intermediately assembled to the upper edge of the front wall (210), an other edge of the spreading screws having bearings located on corresponding rear corners of the dumper (202), and one bearing having an attached hydraulic engine (223).

16. The agricultural motor vehicle of claim 13, wherein the motor power set (20) further comprising a box-shaped structural complement formed by an enclosing protective housing (224), having internally at mid-height a horizontal base (225), the housing and base both comprising plates, and forming a set fixed at a rear part of the motor vehicle above the inspection caps (166) of the vibrating screen (6), the horizontal base located above an intermediate residue outlet (155), wherein a crosswise combustion engine (226) is fixed over the base having an outlet axis connected to a gearbox (227) having four outlet axes coupled to hydraulic pumps (228), all interconnected by hoses to a hydraulic reservoir (229), allowing at pump outlets, other hoses to be interconnected to the engines and hydraulic cylinders, having corresponding return hoses leading to the hydraulic reservoir (229).

\* \* \* \* \*